United States Patent [19]
Yamashita et al.

[11] Patent Number: 5,964,208
[45] Date of Patent: Oct. 12, 1999

[54] ABNORMALITY DIAGNOSING SYSTEM FOR AIR/FUEL RATIO FEEDBACK CONTROL SYSTEM

[75] Inventors: Yukihiro Yamashita; Jun Hasegawa; Hisashi Iida; Wakichi Kondo, all of Kariya; Yasuo Sagisaka, Komaki; Masahiko Yamaguchi, Obu, all of Japan

[73] Assignee: Denso Corporation, Kariya, Japan

[21] Appl. No.: 08/878,064

[22] Filed: Jun. 18, 1997

Related U.S. Application Data

[63] Continuation-in-part of application No. 08/623,787, Mar. 29, 1996, Pat. No. 5,758,632.

[30] Foreign Application Priority Data

Mar. 31, 1995 [JP] Japan .................................. 7-76336
Apr. 14, 1995 [JP] Japan .................................. 7-89651
Jun. 18, 1996 [JP] Japan ................................ 8-156907
Dec. 13, 1996 [JP] Japan ................................ 8-333664

[51] Int. Cl.⁶ ............................. F02D 41/14; F02D 41/22
[52] U.S. Cl. .......................................... 123/674; 123/688
[58] Field of Search ................................... 123/479, 688, 123/674; 701/107, 109; 73/118.1

[56] References Cited

U.S. PATENT DOCUMENTS

| 4,724,814 | 2/1988 | Mieno et al. | 123/688 |
| 4,915,081 | 4/1990 | Fujimoto et al. | 123/682 |
| 5,048,490 | 9/1991 | Nakaniwa | 123/688 X |
| 5,058,556 | 10/1991 | Fukuma et al. | 123/682 |
| 5,065,728 | 11/1991 | Nakaniwa | 123/688 X |
| 5,396,765 | 3/1995 | Maruyama et al. | 123/688 X |
| 5,485,382 | 1/1996 | Seki et al. | 123/688 X |
| 5,568,725 | 10/1996 | Uchikawa | 123/688 X |

FOREIGN PATENT DOCUMENTS

| 61-200348 | 9/1986 | Japan . |
| 62-32237 | 2/1987 | Japan . |
| 1-110853 | 4/1989 | Japan . |
| 2-122140 | 10/1990 | Japan . |
| 4-109051 | 4/1992 | Japan . |
| 4-365952 | 12/1992 | Japan . |

Primary Examiner—Tony M. Argenbright
Attorney, Agent, or Firm—Pillsbury Madison & Sutro LLP

[57] ABSTRACT

An air/fuel ratio control system controls the supply of fuel to an internal combustion engine to achieve a target air/fuel ratio, based on the output of an air/fuel ratio sensor. The system may determine whether there is an abnormality in the air/fuel ratio sensor based on a comparison between a change of an air/fuel ratio correction coefficient, used to drive the air/fuel ratio to the target value, and a change of the target air/fuel ratio if the target air/fuel ratio has sharply changed. Alternatively, the diagnosis operation may be performed based on a comparison between a total air/fuel ratio correction amount and a change of the air/fuel ratio detected by the air/fuel ratio sensor, a phase difference calculation between peaks of the air/fuel ratio or the air/fuel ratio correction coefficient, or by accumulating the differences between the air/fuel ratio and the target air/fuel ratio, and the differences between the air/fuel ratio correction coefficient and a reference value, and comparing the accumulated values. In addition, the system may detect a sensor abnormality based on the deviation in phase of the air/fuel ratio from the air/fuel ratio correction coefficient. These diagnosis operations can precisely and easily detect the occurrence of an abnormality in the air/fuel ratio sensor. As a result, the air/fuel ratio control system will not use an imprecise output from the sensor for air/fuel ratio control, thus achieving highly precise and highly reliable air/fuel ratio control.

34 Claims, 48 Drawing Sheets

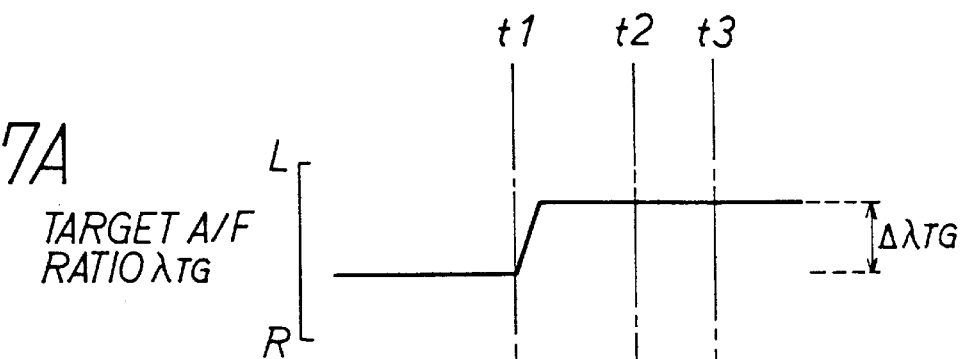
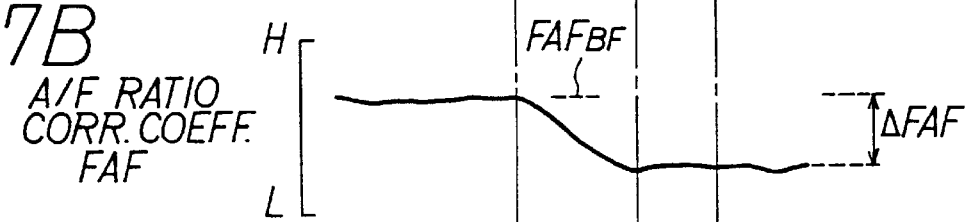
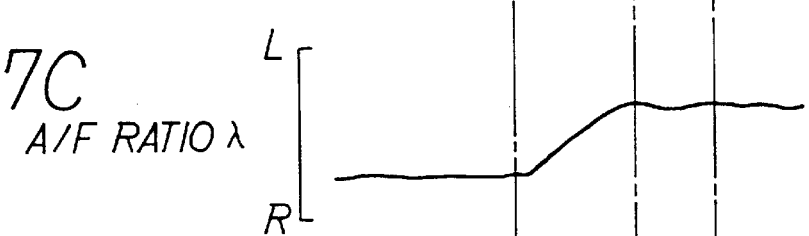
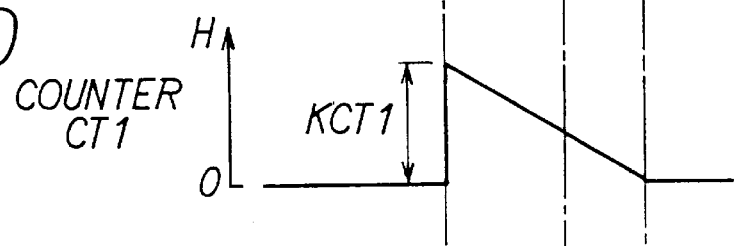
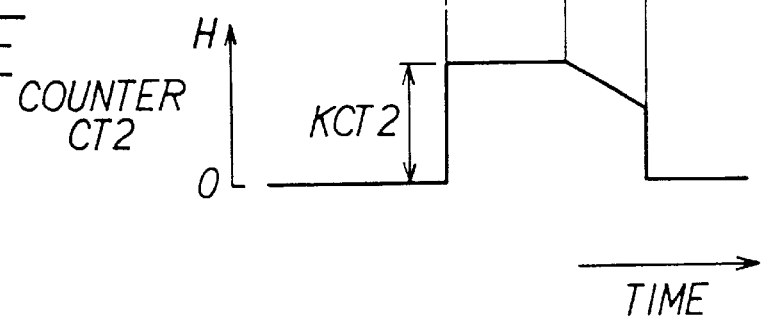

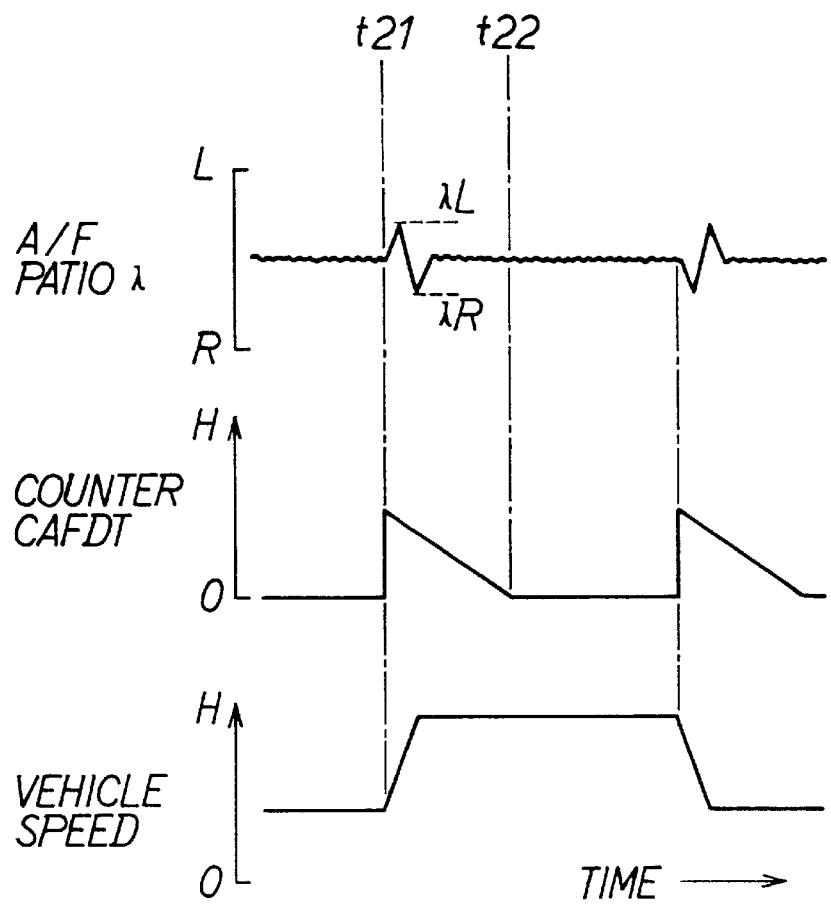
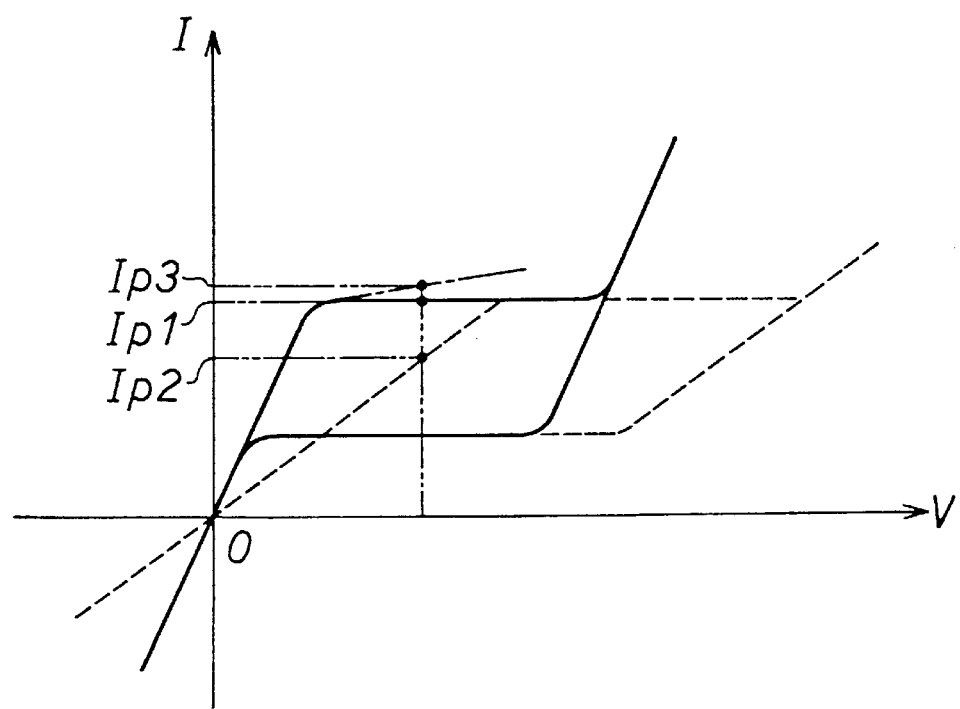

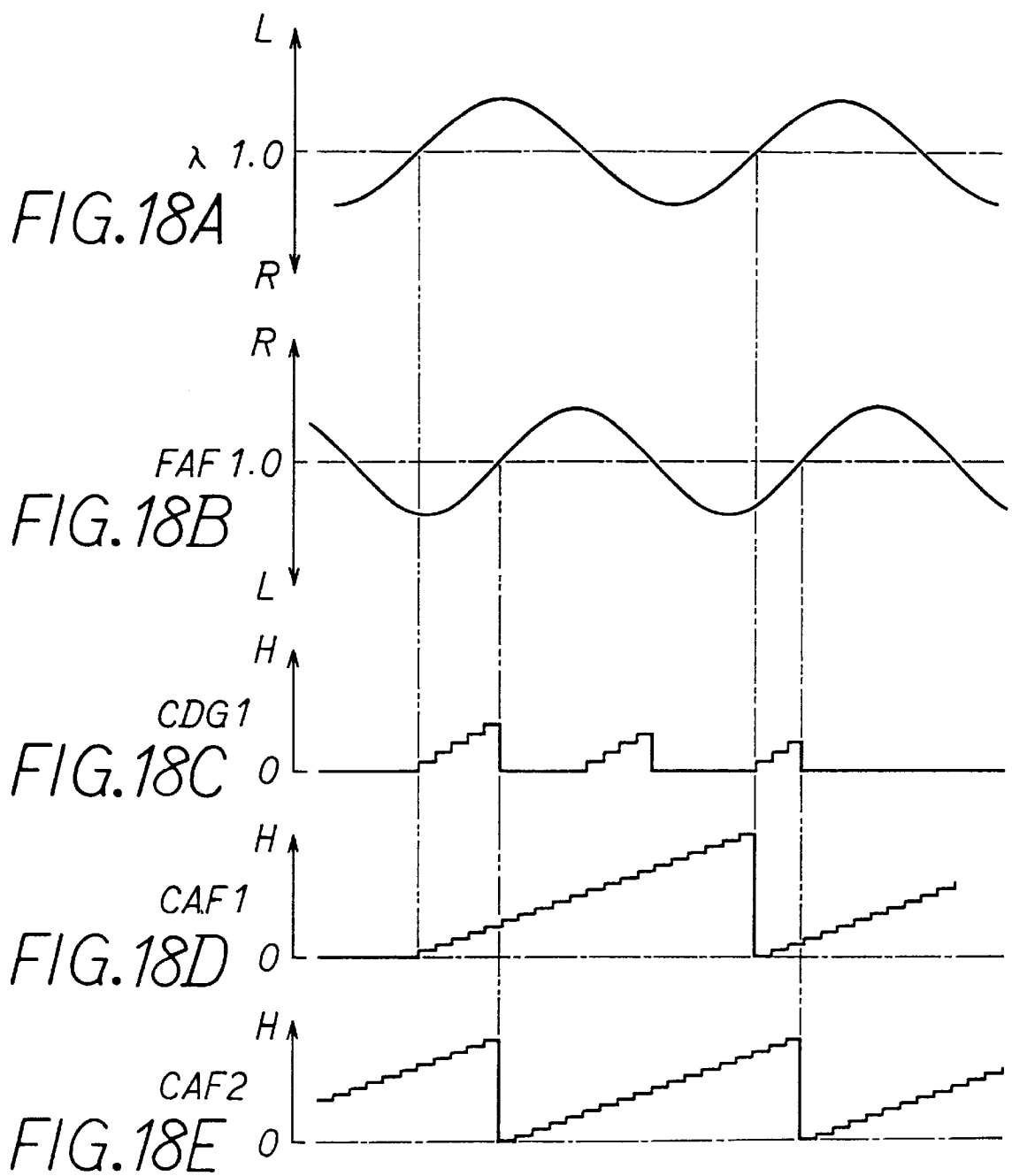

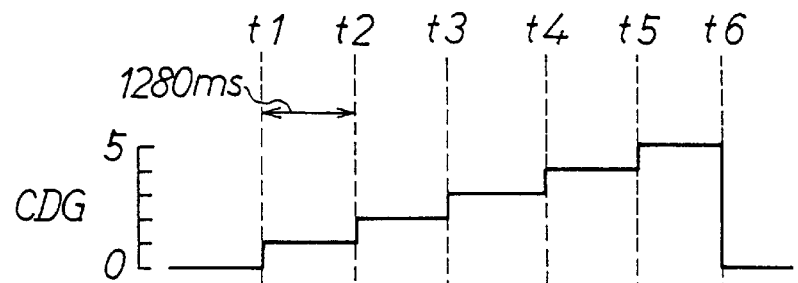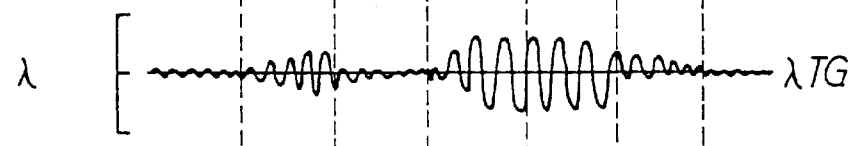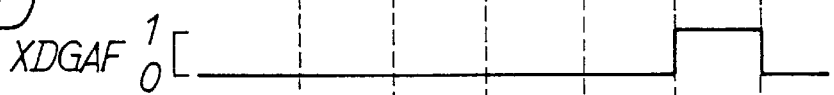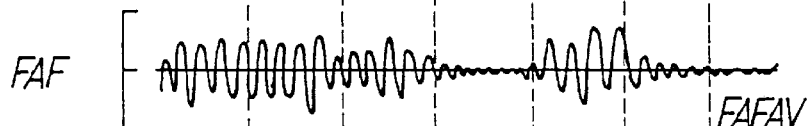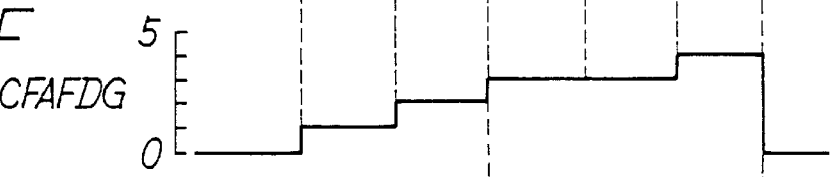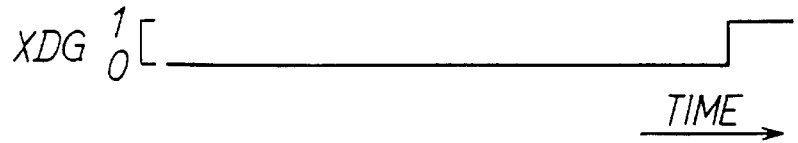

ABNORMALITY DIAGNOSING SYSTEM FOR AIR/FUEL RATIO FEEDBACK CONTROL SYSTEM

CROSS-REFERENCE TO RELATED APPLICATIONS

This application is related to and claims priority under 35 U.S.C. § 119 from Japanese Patent Application Nos. Hei 8-156907 and 8-333664, incorporated herein by reference. This application is also a continuation-in-part of and claims priority under 35 U.S.C. § 120 from U.S. patent application Ser. No. 8/623,787filed Mar. 29, 1996, now U.S. Pat. No. 5,758,632, incorporated herein by reference.

BACKGROUND OF THE INVENTION

1. Field of the Invention

The present invention relates to an air/fuel ratio feedback control system including an air/fuel ratio sensor which varies its output linearly in correspondence with the air/fuel ratio of an internal combustion engine so that air/fuel ratio feedback control may be executed on the basis of the detection result of that sensor by an electronic control unit composed of a microprocessor or the like. More particularly, the invention is related to an abnormality diagnosing system for such an air/fuel ratio feedback control system.

2. Description of Related Art

In an air/fuel ratio feedback control system of recent years, an air/fuel ratio sensor (e.g., a limit current type oxygen sensor0 has been used to linearly detect the air/fuel ratio of an engine in accordance with the oxygen concentration in an exhaust gas. A microprocessor obtains the detection result of the air/fuel ratio by the sensor to control the fuel injection rate into the internal combustion engine. In this case, the microprocessor calculates the air/fuel ratio correction coefficient on the basis of the air/fuel ratio detection result from the air/fuel ratio sensor to correct the fuel injection rate with the air/fuel ratio correction coefficient. As a result, optimal combustion is realized in the internal combustion engine to reduce the content of noxious by-products (e.g., CO, HC, NOx and so on) in the exhaust gas.

In the air/fuel ratio feedback control system, on the other hand, as the reliability of the air/fuel ratio to be detected by the air/fuel ratio sensor decreases, the control accuracy of the system seriously deteriorates. Therefore, the prior art has desired a technique for performing an abnormality diagnosis of the air/fuel ratio sensor highly accurately. Herein, an abnormality of the air/fuel ratio sensor or a control abnormality due to the electronic control unit (e.g., the microprocessor) will be defined as an abnormality of the air/fuel ratio feedback control system.

The characteristic abnormality of the sensor output will be described with reference to FIG. 46A. In normal sensor operation, the detected air/fuel ratio (i.e., the detected $\lambda$) and the real air/fuel ratio (i.e., the real $\lambda$) are substantially identical, as shown by the solid line in FIG. 46A. At the abnormal sensor time, the detected $\lambda$ is smaller or larger than the real $\lambda$, as shown by broken lines. This characteristic abnormality is thought to occur from aging such as electrode aggregation or separation or element cracking (e.g., the cracking of a diffused resistance layer or a solid electrolyte layer) or from a conduction or insulation defect.

The abnormality in which the responsiveness of the sensor output drops will be described with reference to FIG. 46B. When the responsiveness of the sensor output drops, the transition of the detected $\lambda$ is delayed from that of the real $\lambda$ when the fuel injection rate changes from the lean side to the rich side, as shown. This drop in the responsiveness is thought to occur from blockage of a cover or a porous electrode layer due to the contamination of the sensor or from insufficient activity due to heater trouble.

As described above, problems with the air/fuel ratio sensor output may be caused by a number of factors, and a technique for making an abnormality diagnosis of the air/fuel ratio sensor highly accurately has been desired. To this end, a system for diagnosing the sensor abnormality on the basis of the behavior of the detected air/fuel ratio by the air/fuel ratio sensor or the behavior of the value FAF has been developed.

In the feedback control of the air/fuel ratio, generally speaking, the evaporated fuel (or evaporated gas) in the fuel tank, for example, is to be released to the engine intake system, and the value FAF may deviate erratically or at a transient runnin ime from a target value ag., a reference value=1.0). Even when, moreover, a learned air/fuel ratio value is cleared immediately after the battery was exchanged, an error may occur in the value FAF in accordance with the individual difference in the engine. As a result, if the diagnosis of the existing sensor abnormality is executed at the varying time of the value FAF, there is a problem that an erroneous diagnosis is liable to occur.

Further, prior art documents such as Japanese Patent Publication Laid-Open No. 62-225943 entitled "Method of Detecting Abnormality of Oxygen Concentration Sensor", disclose an abnormality diagnosing procedure for detecting an abnormality of a connection system in the limit current type oxygen concentration sensor in accordance with an applied voltage and a detected current.

The prior art described above can detect an abnormality in the circuit construction such as a breakage or short-circuit of the connection system. However, when the air/fuel ratio sensor degrades, the symptom of a resultant abnormality cannot be detected. In other words, it is impossible to determine the accuracy of the air/fuel ratio detected by the air/fuel ratio sensor (whether or not the sensor output is normal), that is, to determine the reliability of the sensor output. Further, it is not possible to diagnose the reliability of the electronic control system of the air/fuel ratio feedback by using the detection result of the air/fuel ratio sensor.

SUMMARY OF THE INVENTION

The present invention has been conceived in view of the above problems of the prior art, and one object of the present invention is to provide an abnormality diagnosing system for an air/fuel ratio feedback control system which can highly accurately diagnose an abnormality of the air/fuel ratio feedback control system, such as an abnormality of the air/fuel ratio sensor or a control abnormality due to a malfunction of an electronic control unit composed of a microprocessor or the like, thereby contributing to improvements in the control accuracy of the control system.

An air/fuel ratio feedback control system of the present invention includes a air/fuel ratio sensor for varying an output linearly with respect to the air/fuel ratio of an internal combustion engine, and the air/fuel ratio, as detected by the air/fuel ratio sensor, is inputted to an electronic control unit composed of a microprocessor or the like. The electronic control unit determines an air/fuel ratio correction coefficient according to the difference between the detected air/fuel ratio and a target air/fuel ratio and corrects the amount of fuel to be fed to the internal combustion engine thereby to realize the air/fuel ratio feedback control (as air/fuel ratio correction coefficient determining means and air/fuel ratio feedback control means).

The above objects are achieved according to a first aspect of the present invention by providing a system which additionally includes fuel correction determining means for determining that an instruction to provide an air-fuel ratio correction amount that exceeds a predetermined amount in accordance with a change of the operating conditions of an engine to which the controller is connected has been outputted with respect to a basic fuel supply amount calculated by the basic air-fuel ratio control apparatus, and sensor diagnostic means for, if the fuel correction determining means determines that an instruction to provide an air-fuel ratio correction amount that exceeds a predetermined amount in accordance with a change of the operating conditions of the engine has been outputted with respect to the basic fuel supply amount, checking for an abnormality of the air-fuel ratio sensor by comparing a change of the target air-fuel ratio and a change of the air-fuel ratio correction amount.

The above object is achieved according to a second aspect of the present invention by providing an air-fuel ratio control system similar to the one described above in which the system determines whether there is abnormality in the air-fuel ratio sensor based on a comparison between a total correction amount and the change of the air-fuel ratio detected by the air-fuel ratio sensor, thereby providing similar advantageous effects.

The above object is achieved according to a third aspect of the present invention by providing an air-fuel ratio control system similar to the one described above in which the diagnosis operation is performed based on a phase difference calculation between peaks of the air-fuel ratio or the air-fuel ratio correction coefficient. In this way, the system executes precise diagnosis even if the amplitude center of the air-fuel ratio or the air-fuel ratio correction coefficient shifts to the lean or rich side to a large extent.

The above object is achieved according to a fourth aspect of the present invention by providing an air-fuel ratio control system similar to the one described above in which the system determines the occurrence of a sensor abnormality by accumulating differences between the air-fuel ratio and the target air-fuel ratio and the differences between the air-fuel ratio correction coefficient and a reference value, and comparing the accumulated values. The diagnosis based on such accumulations makes it possible to perform a diagnosis that is hardly affected by external disturbances, such as temporary fluctuations of the sensor output or correction coefficients.

The above object is achieved according to a fifth aspect of the present invention by providing an air-fuel ratio control system similar to the one described above in which the system performs sensor diagnosis based on the deviation in phase of the air-fuel ratio from the air-fuel ratio correction coefficient. In this way, similarly beneficial results are obtained.

According to a sixth aspect of the invention, the above-described object of achieving improved sensor abnormality detection is achieved by using the CPU to compare the ratio between an accumulated value of the second derivative of the air/fuel ratio and an accumulated value of the second derivative of the correction coefficient to a predetermined abnormality deciding value to perform abnormality diagnosis.

The prior art control systems cannot continue the proper air/fuel ratio feedback control if an abnormality occurs due to the deterioration or breakage of the air/fuel ratio sensor or if an abnormality of the controllability by the microprocessor occurs. According to a seventh aspect of the present invention, therefore, the abnormality of the air/fuel ratio sensor and the control abnormality of the microprocessor are defined together as an abnormality of the air/fuel ratio feedback control system so that the abnormality can be highly accurately detected. This is done by using the CPU to calculate not only the difference between the air/fuel ratio and the target air/fuel ratio but also the difference between the air/fuel ratio correction coefficient and its average value.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 7A–7E are timing charts illustrating a diagnosis operation according to the first embodiment;

FIGS. 8, 8A and 8B are flowcharts of a sensor diagnosis routine according to the first embodiment;

FIGS. 13A–13C are timing charts illustrating the diagnosis operation according to a third embodiment of the present invention;

FIG. 16 is a voltage-current characteristic diagram illustrating the output from the air-fuel ratio sensor when the sensor has abnormality;

FIGS. 17, 17A and 17B are flowcharts illustrating a first sensor diagnosis routine;

FIGS. 18A–18E are timing charts indicating the operations of various counters;

FIGS. 28, 28A and 28B are a flowchart illustrating a phase deviation determination routine according to a fourth embodiment of the present invention;

FIGS. 54A–54H are graphs more specifically showing the abnormality deciding action of the air/fuel ratio feedback control system;

DETAILED DESCRIPTION OF THE PRESENTLY PREFERRED EXEMPLARY EMBODIMENTS

Figure 1:
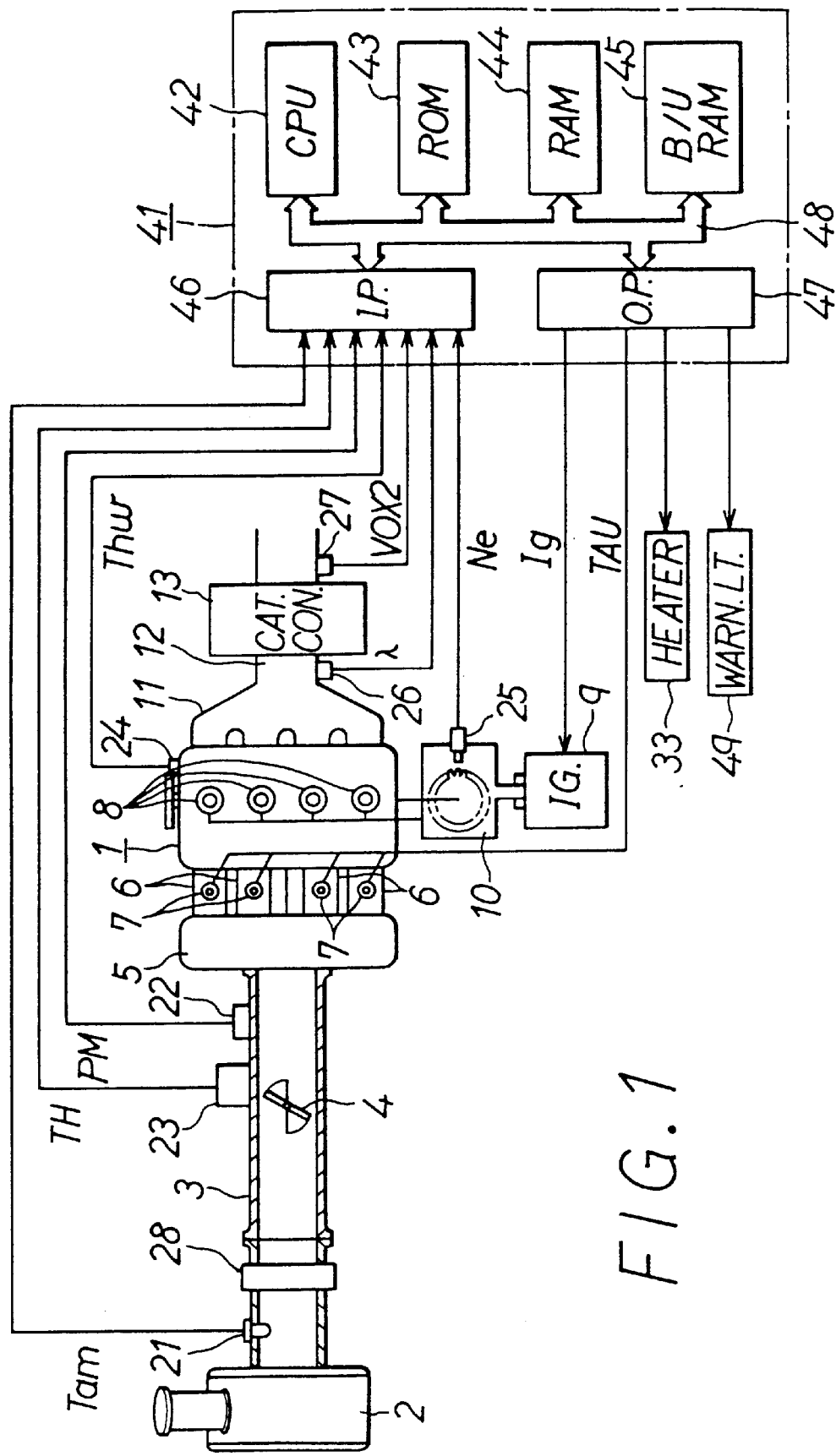
FIG. 1 illustrates the overall construction of an air-fuel ratio control apparatus for an internal combustion engine according to a first embodiment of the present invention.

FIG. 1 shows an internal combustion engine equipped with an air/fuel ratio control system and peripheral devices of the internal combustion engine. As shown in FIG. 1, an internal combustion engine 1 is a spark ignition type engine of four cylinders and four cycles. The intake air flows from the upstream through an air cleaner 2, an intake pipe 3, a throttle valve 4, a surge tank 5 and an intake manifold 6 and is mixed with fuel injected from each fuel injection valve 7 in the intake manifold 6 so that a mixture at a predetermined air/fuel ratio is fed to each cylinder. A high voltage, as supplied from an ignition circuit 9, is distributed and fed to an ignition plug 8, as attached to each cylinder of the internal combustion engine 1, so that the ignition plug 8 ignites the air/fuel mixture of each cylinder at a predetermined timing. The burned exhaust gas flows through an exhaust manifold 11 and an exhaust pipe 12 and is cleaned of its noxious contents (e.g., CO, HC and NOx) by a three-way catalytic converter 13, disposed in the exhaust pipe 12, and discharged to the atmosphere.

The intake pipe 3 is equipped with an intake air temperature sensor 21 and an intake air pressure sensor 22, of which the temperature sensor 21 detects the temperature (i.e., intake air temperature Tam) of the intake air, and the pressure sensor 22 detects the pressure (i.e., intake air pressure PM) of the intake air downstream of the throttle valve 4. The throttle valve 4 is equipped with a throttle sensor 23 for detecting the degree of opening (i.e., throttle opening TH) of the valve 4. This throttle sensor 23 outputs not only an analog signal according to the throttle opening TH but also a detection signal indicating that the throttle valve 4 is substantially fully closed. The engine block of the internal combustion engine 1 has a water temperature sensor 24 for detecting the temperature (i.e., cooling water temperature Thw) of the cooling water in the internal combustion engine 1. The distributor 10 is equipped with a rotational speed sensor 25 for detecting the number of revolutions (i.e., engine RPM Ne) of the internal combustion engine 1. This rotational speed sensor outputs twenty four pulse signals at an equal interval for every two revolutions, i.e., 720 degrees CA, of the internal combustion engine 1.

An A/F sensor (or air/fuel ratio sensor) 26 which is constituted by a limit current type oxygen sensor for outputting a lined air/fuel signal over a wide range in proportion to the oxygen concentration in the exhaust gas discharged from the internal combustion engine 1 is disposed in the exhaust pipe 12 upstream of the three-way catalytic converter 13. A downstream $O_2$ sensor 27 for outputting a voltage VOX2 in accordance with the whether or not the air/fuel ratio λ is rich or lean with respect to the stoichiometric air/fuel ratio (λ=1) is disposed downstream of the three-way catalytic converter 13. The air/fuel ratio is expressed by the air excess ratio "λ" with the stoichiometric air/fuel ratio (=1.47) being expressed as λ=1.

Further, a canister 52 which is charged with active carbon for adsorbing evaporated fuel from a fuel tank 50 is connected via a tank port passage 51 to the fuel tank 50 containing fuel, e.g., gasoline, to be fed to the internal combustion engine 1. The canister 52 is provided with a vent hole 53 for introducing ambient air. The canister 52 is connected via a release passage 54 to an intake pipe 3 downstream of a throttle valve 4 so that the evaporated gas to be fed from the canister 52 is released into the trunk portion (as located upstream of the not-shown intake manifold) of the intake pipe 2.

A purge vacuum switching valve (VSV) 55 for controlling the purge flow rate in accordance with a control signal coming from the ECU 41 is disposed in the middle of the release passage 54. In other words, the control signal is fed to the purge VSV 55 from the ECU 41 thereby to establish the communication between the canister 52 and the intake pipe 2 via the release passage 54 so that fresh air is introduced from the atmosphere through the vent port 53. Since the fresh air thus refreshes the inside of the canister 52 and comes into the intake pipe 2 of the internal combustion engine 1, the canister 52 restores its adsorbing function. The purge flow rate, as based on the amount of introduced fresh air, at this time is adjusted by changing the duty ratio of a pulse signal to be fed from the ECU 41 to the purge VSV 55. In short, the degree of opening of this purge VSV 55 is adjusted by the duty ratio signal, as based upon the pulse width modulation from the ECU 41, to adjust the purge flow rate of the air, as containing the evaporated fuel, from the canister 52.

Figure 2:
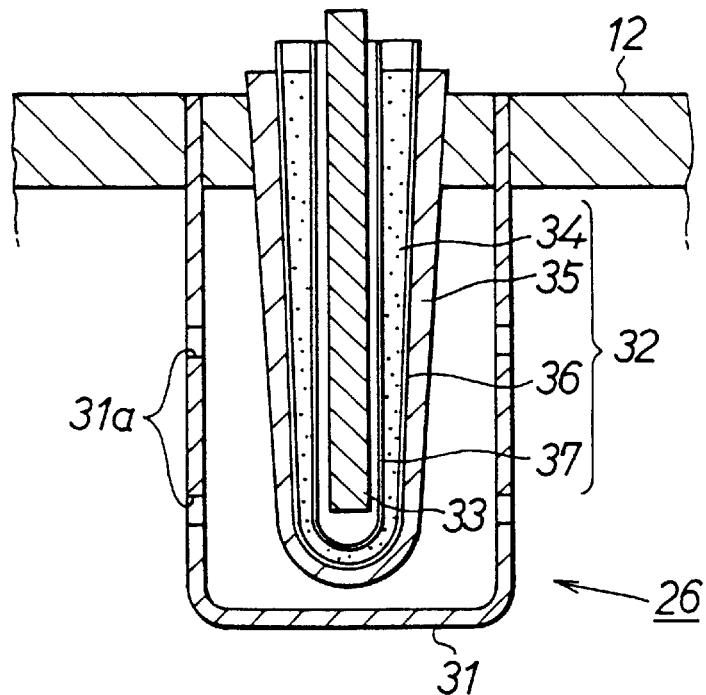
FIG. 2 is a detailed sectional view of an air-fuel ratio sensor.

FIG. 2 is a cross-sectional view of the A/F sensor 26. In FIG. 2, the A/F sensor 26 includes a cover 31, a sensor body 32 and a heater 33. The cover 31 has a generally U-shaped section, and its peripheral wall has a number of pores 31a providing the communication between its inside and outside. The sensor body 32 generates a limit current corresponding to either the oxygen concentration in a lean region of the air/fuel ratio or the concentration of the unburned gas (e.g., CO, HC and $H_2$) in a rich region of the air/fuel ratio.

In the sensor body 32, an exhaust gas side electrode layer 36 is fixed on the outer surface of a solid electrolyte layer 34 formed to have a cup-shaped section, and an atmosphere side electrode layer 37 is fixed on the inner surface. A diffused resistor layer 35 is formed by a plasma spray coating method on the outer side of the exhaust gas side electrode layer 36. The solid electrolyte layer 34 is made of a sintered substance of an oxygen ion conductive oxide which is prepared by solid-dissolving CaO, MgO, $Y_2O_3$ or $Yb_2O_3$ as a stabilizer into $ZrO_2$, $HfO_2$, $ThO_2$ or $Bi_2O_3$. The diffused resistor layer 35 is made of a refractory inorganic substance of alumina, magnesia, quartzite, spinel or mullite. Both the exhaust gas side electrode layer 36 and the atmosphere side electrode layer 37 are made of a precious metal having a high catalytic activity such as platinum and are chemically plated on their surfaces with a porous material. The exhaust gas side electrode layer 36 has an area of about 10 to 100 $mm^2$ and a thickness of about 0.5 to 2.0 microns, and the atmosphere side electrode layer 37 has an area of 10 $mm^2$ or larger and a thickness of about 0.5 to 2.0 microns.

The heater 33 is mounted in the atmosphere side electrode layer 37 and heats the sensor body 32 (including the atmosphere side electrode layer 37, the solid electrolyte layer 34, the exhaust gas side electrode layer 36 and the diffused resistor layer 35) with its heating energy. The heater 33 is given a sufficient heating capacity for activating the sensor body 32.

In the A/F sensor 26 thus constructed, the sensor body 32 generates a limit current in accordance with the oxygen concentration in a leaner region than the stoichiometric air/fuel ratio. In this case, the limit current corresponding to the oxygen concentration is determined by the area of the exhaust gas side ectrode layer 36, the sickness of the diffused resistor layer 35, the porosity and the average pore size. The sensor body 32 can detect the oxygen sensor linearly. However, since a high temperature of about 650° C. or higher is needed for activating the sensor body 32 and since the activation temperature range of the sensor body 32 is relatively narrow, the activation range cannot be controlled by heating with only the exhaust gas of the engine 1. Therefore, the heater 33 is controlled by a later-described ECU 41 so that the sensor body 32 is retained at a predetermined activation temperature. Within a rich region with respect to the hstoichiometric air/fuel ratio, the temperature of the unburned gas such as carbon monoxide (CO) changes substantially linearly with respect to the air/fuel ratio so that the sensor body 32 generates a limit current in accordance with the concentration of CO or the like.

Figure 3:
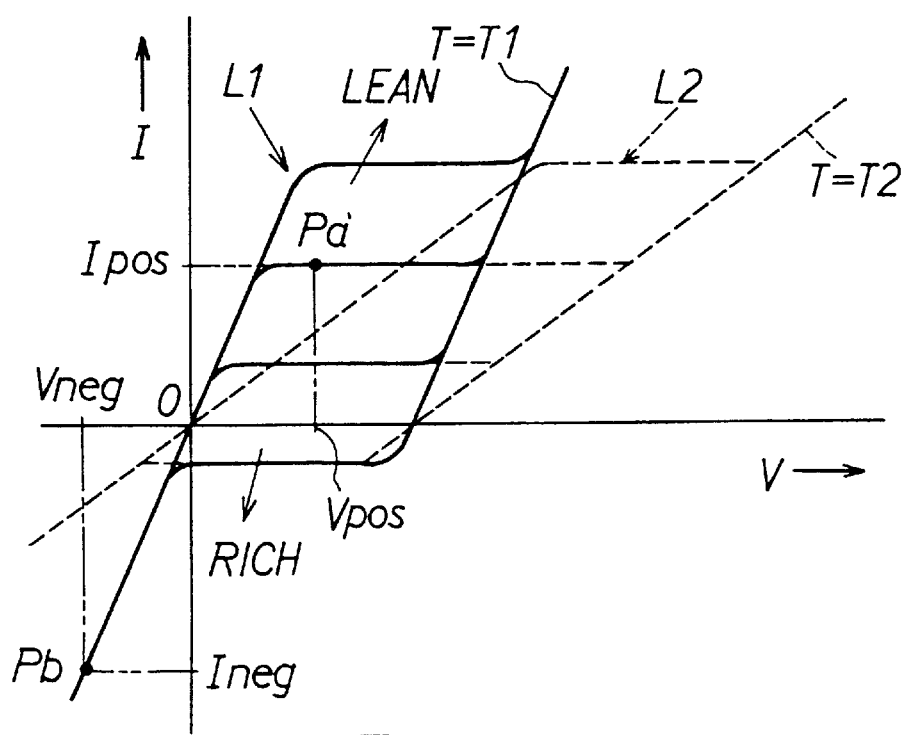
FIG. 3 is a graph indicating the voltage-current characteristics of the air-fuel ratio sensor of FIG. 2.

The voltage-current characteristics of the sensor body 32 will be described with reference to FIG. 3. The current-voltage characteristic curves in FIG. 3 indicate that the current flowing into the solid electrolyte layer 34 of the sensor body 32 in proportion to the oxygen concentration (or air/fuel ratio) detected by the air/fuel sensor 26 is linear with respect to the voltage applied to the solid electrolyte layer 34. When the sensor body 32 is in the activated state at a temperature T=T1, a stable state is indicated by a characteristic curve L1 represented by a solid curve in FIG. 3. In this case, the straight segments of the characteristic curve L1 in parallel with a voltage axis V specify the limit currents of the sensor body 32. The variation of the limit current corresponds to that of the air/fuel ratio (i.e., leanness or richness) such that the limit current increases as the air/fuel ratio shifts to the lean side and decreases as the same shifts to the rich side.

The region of the voltage-current characteristic curve where the voltage is lower than the levels corresponding to the straight segments parallel to the voltage axis V is a resistance-dominant region. The slope of the characteristic curve L1 within the resistance-dominant region is specified by the internal resistance of the solid electrolyte layer 34 in the sensor body 32. Since the internal resistance of the solid electrolyte layer 34 changes with the temperature so that the resistance increases, as the temperature of the sensor body 32 lowers, to reduce the slope. When the temperature T of the sensor body 32 is T2 lower than T1, the current-voltage characteristics is defined by a characteristic curve L2, as represented by broken lines in FIG. 3. The straight segments of the characteristic curve L2 parallel to the voltage axis V specify the limit currents of the sensor body 32 at T=T2. The limit currents are substantially equal to those determined by the characteristic curve L1.

On the characteristic curve L1, moreover, the current flowing through the sensor body 32 becomes a limit current Ipos (as indicated at point Pa in FIG. 3) if a positive voltage Vpos is applied to the solid electrolyte layer 34 of the sensor body 32. If a negative Vneg is applied to the solid electrolyte layer 34 of the sensor 32, on the other hand, the current flowing through the sensor body 32 is not dependent upon the oxygen concentration but proportional solely to the temperature (as indicated at Pb in FIG. 3).

An electronic control unit ("ECU") for controlling the running of the internal combustion engine 1 of FIG. 1 includes a logic operation circuit including a CPU (central Processing Unit) 42, a ROM (Read Only Memory) 43, a RAM (Random Access Memory) 44 and a backup RAM 45. The CPU 41 is connected through a bus 48 with an input port 46 for inputting detection signals of the aforementioned individual sensors and an output port 47 for outputting control signals to individual actuators. The ECU 41 receives the intake air temperature Tam, the intake air pressure PM, the throttle opening TH, the cooling water temperature THw, the engine rotational speed Ne, the air/fuel ratio signal and so on through the input port 46 from the individual sensors. On the basis of these values, the ECU 41 computes control signals regarding a fuel injection rate TAU, an ignition timing Ig and so on and outputs these control signals through the output port 47 to the fuel injection valve 7, the ignition circuit 9 and so on. The ECU 41 executes the later-described abnormality deciding procedure to diagnose whether or not there is an abnormality in the air/fuel feedback control system. If abnormal, the ECU 41 turns on a warning light 49 to notify the driver of the abnormality that has occurred.

A procedure, as designed to perform the air/fuel ratio control in the aforementioned fuel injection control system, will be described below. The following design procedure has been disclosed in Japanese Patent Publication Laid-Open No. 1-110853.

(1) Modeling of Control Object

A first degree self-recurrent moving average model incorporating a dead time P=3 is employed for controlling the air/fuel ratio λ of the internal combustion engine 1, and an external disturbance d is considered for approximation.

The model of the system using the self-recurrent moving average model to control the air/fuel ratio λ can be approximated by Equation (1):

$$\lambda(k)=a\cdot\lambda(k-1)+b\cdot FAF(k-3) \tag{1}$$

wherein FAF is an air/fuel ratio correction coefficient, a and b represent coefficients for determining the responsiveness of the model, and k is the number of control operations, as performed after the start of the first sampling.

Considering the external disturbance d, the control system model can then be approximated by Equation (2):

$$l(k)=a\cdot l(k-1)+b\cdot FAF(k-3)+d(k-1) \tag{2}$$

For the model thus approximated, it is easy to determine the model constants a and b, i.e., a transfer function G of the system for controlling the air/fuel ratio λ, by discretely sampling at a revolution cycle (360° CA) using a step response.

(2) Method of Expressing Quantity of State Variable X (wherein X: Vector Quantity)

Using a state variable quantity $X(k)=[X1(k), X2(k), X3(k), X4(k)]^T$, Equation (2) can be rewritten into matrix Equation (3) and then into Equations (4a)–(4d). Here, T represents a transposed matrix.

$$\begin{bmatrix} X1(k+1) \\ X2(k+2) \\ X3(k+3) \\ X4(k+4) \end{bmatrix} = \begin{bmatrix} a & b & 0 & 0 \\ 0 & 0 & 1 & 0 \\ 0 & 0 & 0 & 1 \\ 0 & 0 & 0 & 0 \end{bmatrix} \begin{bmatrix} X1(k) \\ X2(k) \\ X3(k) \\ X4(k) \end{bmatrix} + \begin{bmatrix} 0 \\ 0 \\ 0 \\ 1 \end{bmatrix} FAF(k) + \begin{bmatrix} 1 \\ 0 \\ 0 \\ 0 \end{bmatrix} d(k) \tag{3}$$

and $$X1(k+1) = aX1(k) + bX2(k) + d(k) = \lambda(k+1) \tag{4a}$$

$$X2(k+1) = FAF(k-2) \tag{4b}$$

$$X3(k+1) = FAF(k-1) \tag{4c}$$

$$X4(k+1) = FAF(k) \tag{4d}$$

(3) Design of Regulator

When a regulator is designed based on Equations (3) and (4a)–(4d), the air/fuel ratio correction coefficient FAF can be expressed by Equation (5) using the optimum feedback gain K=[K1, K2, K3, K4] and a state variable quantity $X^T(k)=[1(k), FAF(k-3), FAF(k-2), FAF(k-1)]$:

$$FAF(k) = K \cdot X^T(k) \tag{5}$$
$$= K1 \cdot (k) + K2 \cdot FAF(k-3) + K3 \cdot FAF(k-2) +$$
$$K4 \cdot FAF(k-2)$$

By adding to Equation (5) an integration term ZI(k) for absorbing errors, the air/fuel ratio correction coefficient FAF can be given by Equation (6):

$$FAF(k)=K1\cdot(k)+K2\cdot FAF(k\cdot 3)+K3\cdot FAF(k-2) +K4\cdot FAF(k-2)+ZI(k) \tag{6}$$

The integration term ZI(k) is a value determined by a difference between a target air/fuel ratio λ TG and an actual air/fuel ratio λ(k) and by an integration constant Ka, as given by Equation (7):

$$ZI(k)=ZI(k-1)+Ka\cdot(\lambda TG-\lambda(k)) \tag{7}$$

Figure 4:
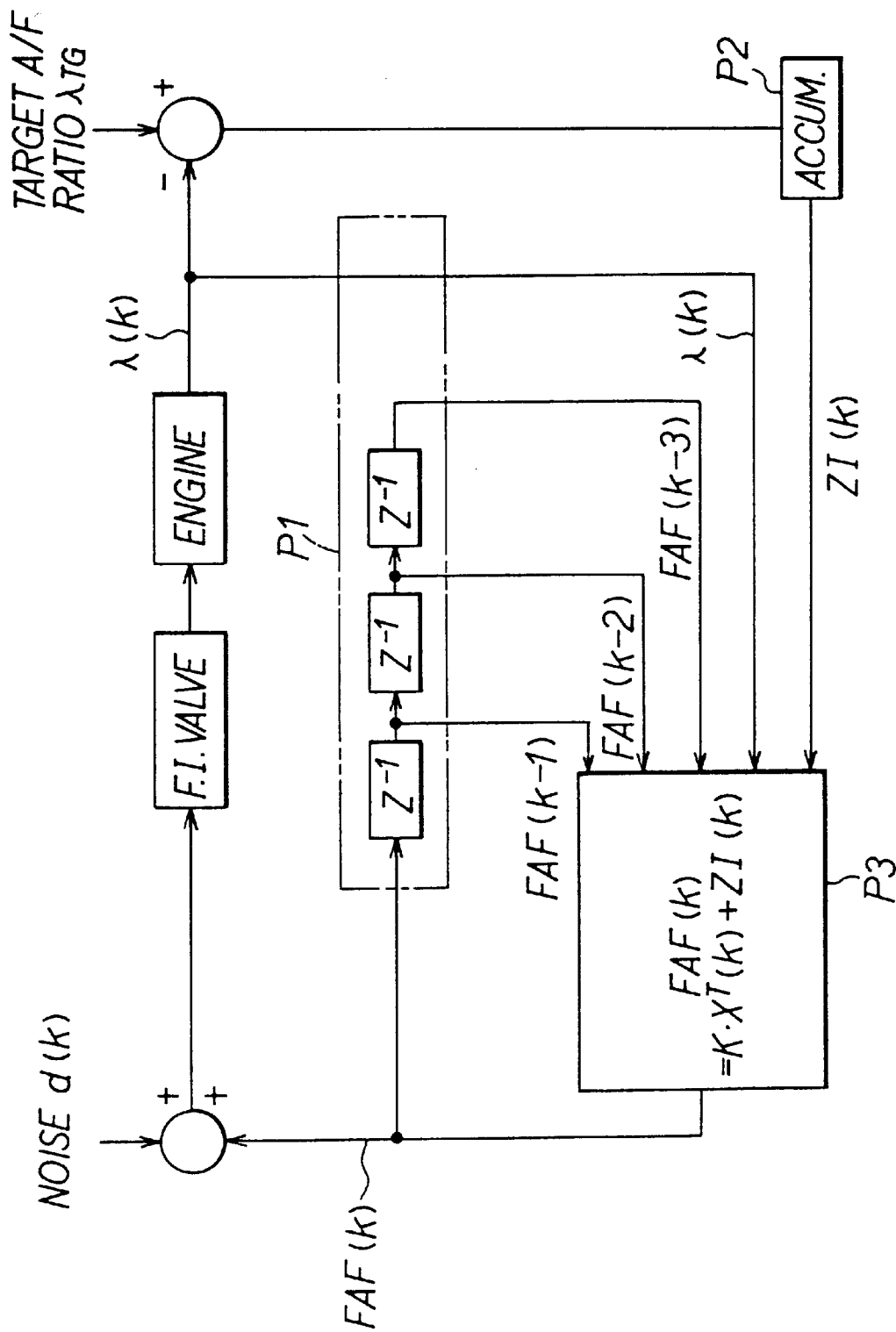
FIG. 4 is a block diagram of an air-fuel ratio control system, illustrating its operational principles.

FIG. 4 is a block diagram of an air/fuel ratio λ control system for which the aforementioned model has been designed. As shown in FIG. 4, the model uses a $Z^{-1}$ transformation to deduce an air/fuel ratio correction coefficient FAF(k) from FAF(k−1). For this operation, the previous air/fuel ratio correction coefficient FAF(k−1) is stored in the RAM 44 and then read out at the following control timing. Incidentally, the term "FAF(k−1)" represents the last air/fuel ratio correction coefficient; the term "FAF(k−2)" represents the air/fuel ratio correction coefficient immediately preceding the term FAF(k−1); and the term "FAF(k−3)" represents the air/fuel ratio correction coefficient immediately preceding the term "FAF(k−2)".

The block P1, as enclosed by the double-dotted line in FIG. 4, indicates a section for determining the state variable quantity X(k) while the air/fuel ratio λ(k) is being feedback-controlled to the target air/fuel ratio λTG. The block P2 indicates a section (or accumulating section) for determining the integration term ZI(k). The block P3 indicates a section for calculating the present air/fuel ratio correction coefficient FAF(k) based on the state variable quantity X(k), as determined in the block P1, and the integration term ZI(k), as determined in the block P2.

(4) Determination of Optimum Feedback Gain K and Integration Constant Ka

The optimum feedback gain K and the integration constant Ka can be determined, for example, by minimizing an evaluation function J, as expressed by Equation (8):

$$J = \sum_{k=0}^{\infty} \{Q(\lambda(k) - \lambda TG)^2 + R(FAF(k) - FAF(k-1))^2\} \quad (8)$$

In Equation (8), however, the evaluation function J is intended to restrict the behavior of the air/fuel ratio correction coefficient FAF(k) and minimize the difference between the air/fuel ratio λ(k) and the target air/fuel λTG. The weighting of the restriction of the air/fuel ratio correction coefficient FAF(k) can be adjusted by changing the values of the weight parameters Q and R. Thus, the optimal feedback gain K and the integration constant Ka can be determined by repeating simulations with changes of the weight parameters Q and R until the optimum control characteristics are obtained.

The optimum feedback gain K and integration constant Ka are also dependent upon the model constants a and b. In order to ensure sufficient stability (or robustness) of the system despite the fluctuation (of the parameters) of the system for controlling the actual air/fuel ratio λ, the variation of the model constants a and b have to be estimated to determine the optimum feedback gain K and integration constant Ka. Thus, the simulation is performed considering the actually possible variation of the model constants a and b, thereby to determine the optimum feedback gain K and integration constant Ka that provide sufficient stability.

The system described so far assumes that (1) the modeling of the control object, (2) the method of expressing the quantity of state variable, (3) the design of the regulator, and (4) the determination of the optimum feedback gain and integration constant have already been determined. The ECU 41 is also assumed to use only Equations (6) and (7) to execute the air/fuel ratio control in the fuel injection control system.

Figure 5:
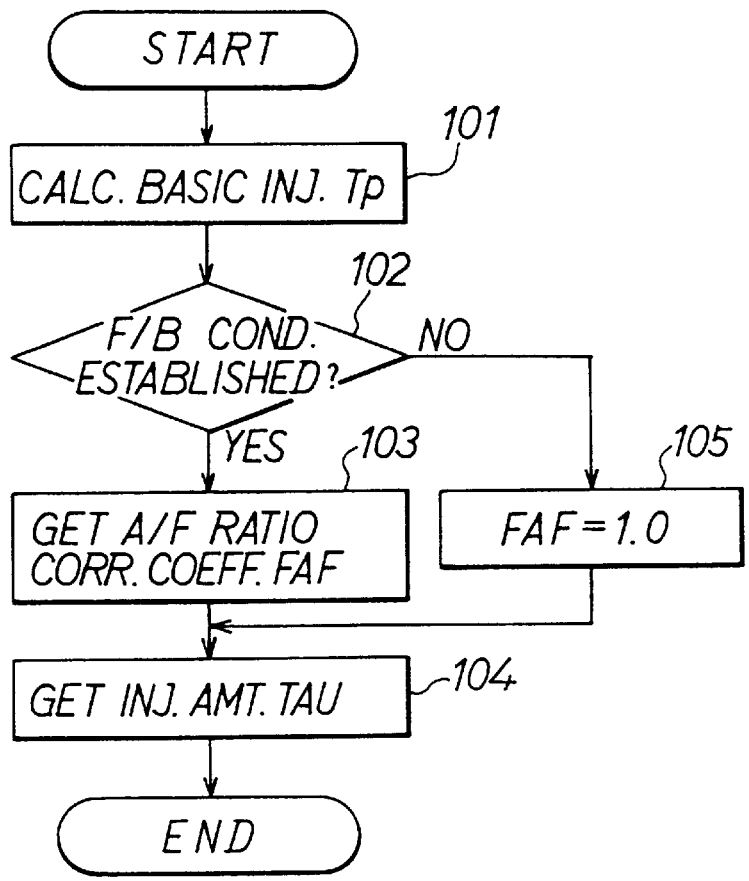
FIG. 5 is a flowchart illustrating a fuel injection amount calculating routine.
Figure 6:
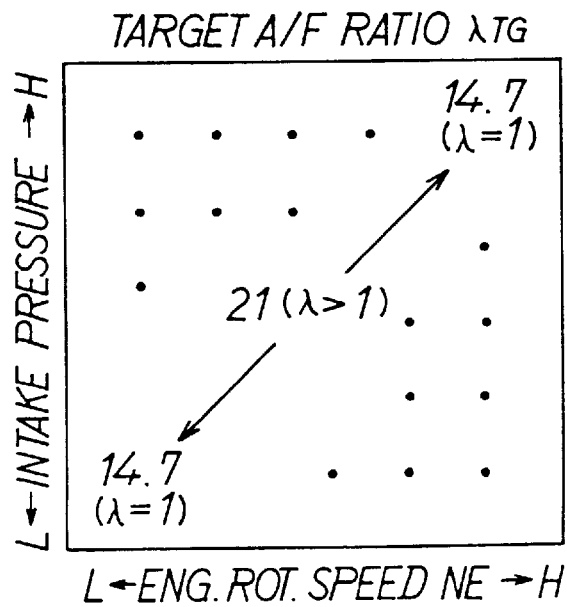
FIG. 6 illustrates a map for determining a target air-fuel ratio.

FIG. 5 is a flowchart showing the fuel injection rate calculating routine to be executed by the CPU 42 in the ECU 41. This routine is executed synchronously with the revolutions of the internal combustion engine 1, that is, at every 360° CA. The procedure of FIG. 5 corresponds to air/fuel correction coefficient determining means and air/fuel feedback control means.

The CPU 42 calculates at Step 101 a basic fuel injection rate TP based on the intake air pressure PM, the engine RPM Ne and so on, and at Step 102 decides whether or not the conditions for the feedback of the air/fuel ratio λ have been satisfied. The feedback conditions, as is well known, are satisfied if the cooling water temperature Thw is not lower than a predetermined level and if the engine operation is not in a high speed region or a high load region. If the feedback conditions are met, the CPU 42 proceeds to Step 103, where the air/fuel ratio correction coefficient FAF is determined for converting the air/fuel ratio λ into the target air/fuel ratio λTG (for the stoichiometric air/fuel ratio λ=1), and then proceeds to Step 104. At Step 103, more specifically, the air/fuel ratio correction coefficient FAF is calculated by using Equations (6) and (7) on the basis of the target air/fuel ratio λTG and the air/fuel ratio λ(k), as detected by the air/fuel ratio sensor 26.

If the feedback conditions are not satisfied at Step 102, the CPU 42 proceeds to Step 105, where the air/fuel ratio correction coefficient FAF is set to "1.0", and further to Step 104. Here, FAF=1.0 means no correction of the air/fuel ratio λ, so that the so-called "open-loop control" is executed.

At Step 104, the CPU 42 determines the fuel injection rate TAU based on the basic fuel injection rate TP, the air/fuel ratio correction coefficient FAF and another correction coefficient FALL in accordance with Equation (9):

$$TAU=Tp \cdot FAF \cdot FALL \quad (9)$$

Then, a control signal, based upon the fuel injection rate TAU, is outputted to the fuel injection valve 7 to control the valve opening duration, i.e., the actual fuel injection duration of the fuel injection valve 7 so that the air/fuel ratio λ is adjusted to the target air/fuel ratio λTG.

Determination of the air/fuel ratio correction coefficient FAF in accordance with the difference between the air/fuel ratio λ and the target air/fuel ratio λTG (i.e., λTG=1.0) has been described above. However, the air/fuel ratio feedback control system does not function normally if the A/F sensor 26 becomes abnormal or if a control abnormality (or an abnormality of the feedback gain) is caused by the CPU 42. Therefore, whether or not the air/fuel ratio feedback control system is abnormal is diagnosed on the basis of an abnormality deciding element which is derived from the air/fuel ratio λ, as detected by the A/F sensor 26, and the air/fuel ratio correction coefficient FAF.

First Embodiment

The sensor diagnosis executed by the CPU 42 will be described below with reference to the timing charts shown in FIGS. 7A–7E and the flowcharts shown in FIGS. 8A and 8B.

The sensor diagnosis operation according to this embodiment will be briefly described with reference to the timing charts of FIGS. 7A–7E. When the target air-fuel ratio λTG suddenly changes to the lean side at time t1, the air-fuel ratio correction coefficient FAF varies to the quantity reduction side. As the fuel injection amount is reduced in accordance with the variation of the air-fuel ratio correction coefficient FAF, the air-fuel ratio detected by the air-fuel ratio sensor 26 changes to the lean side. Moreover, when the target air-fuel ratio λTG suddenly changes, counters CT1, CT2 are set to predetermined values KCT1, KCT2. The value of the counter CT1 is decremented as time progresses following the time point t1. The value of the counter CT2 is decremented following time point t2 at which the air-fuel ratio correction coefficient FAF converges to a predetermined value. At time point t3 when the value of the counter CT1 reaches 0, the CPU 42 performs diagnosis on the basis of a determination of whether the ratio between a change ΔλTG of the target air-fuel ratio λTG and a change λFAF of the air-fuel ratio correction coefficient FAF is within a predetermined range.

Since the air-fuel ratio correction coefficient FAF is determined to make the actual air-fuel ratio correspond to the target air-fuel ratio λTG, the air-fuel ratio correction coefficient FAF varies in accordance with the change ΔλTG of the target air-fuel ratio λTG. If the air-fuel ratio sensor 26 has no abnormality, the output from the sensor 26 corresponds to the variation of the target air-fuel ratio λTG (that is, the output corresponds to the air-fuel ratio) and, based on such output, an appropriate air-fuel ratio correction coefficient FAF for achieving the target air-fuel ratio λTG can be set. If the air-fuel ratio sensor 26 has an abnormality, the output from the sensor 26 does not correspond to the target air-fuel ratio λTG and, accordingly, an appropriate air-fuel ratio correction coefficient FAF cannot be set. In this case, it is determined that an abnormality has occurred in the sensor 26.

Figure 9:
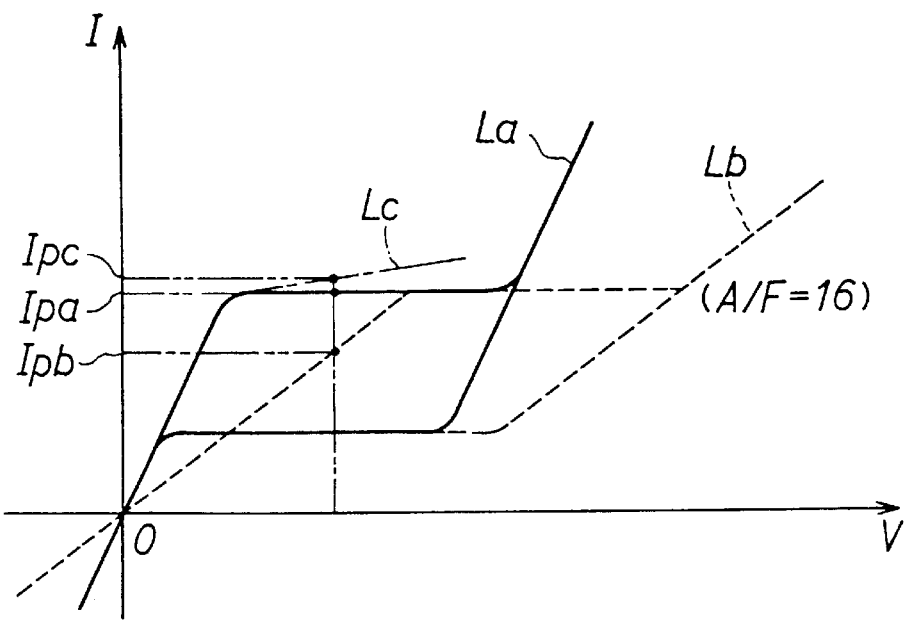
FIG. 9 is a voltage-current characteristic diagram illustrating the output from the air-fuel ratio sensor when the sensor has an abnormality.
Figure 10:
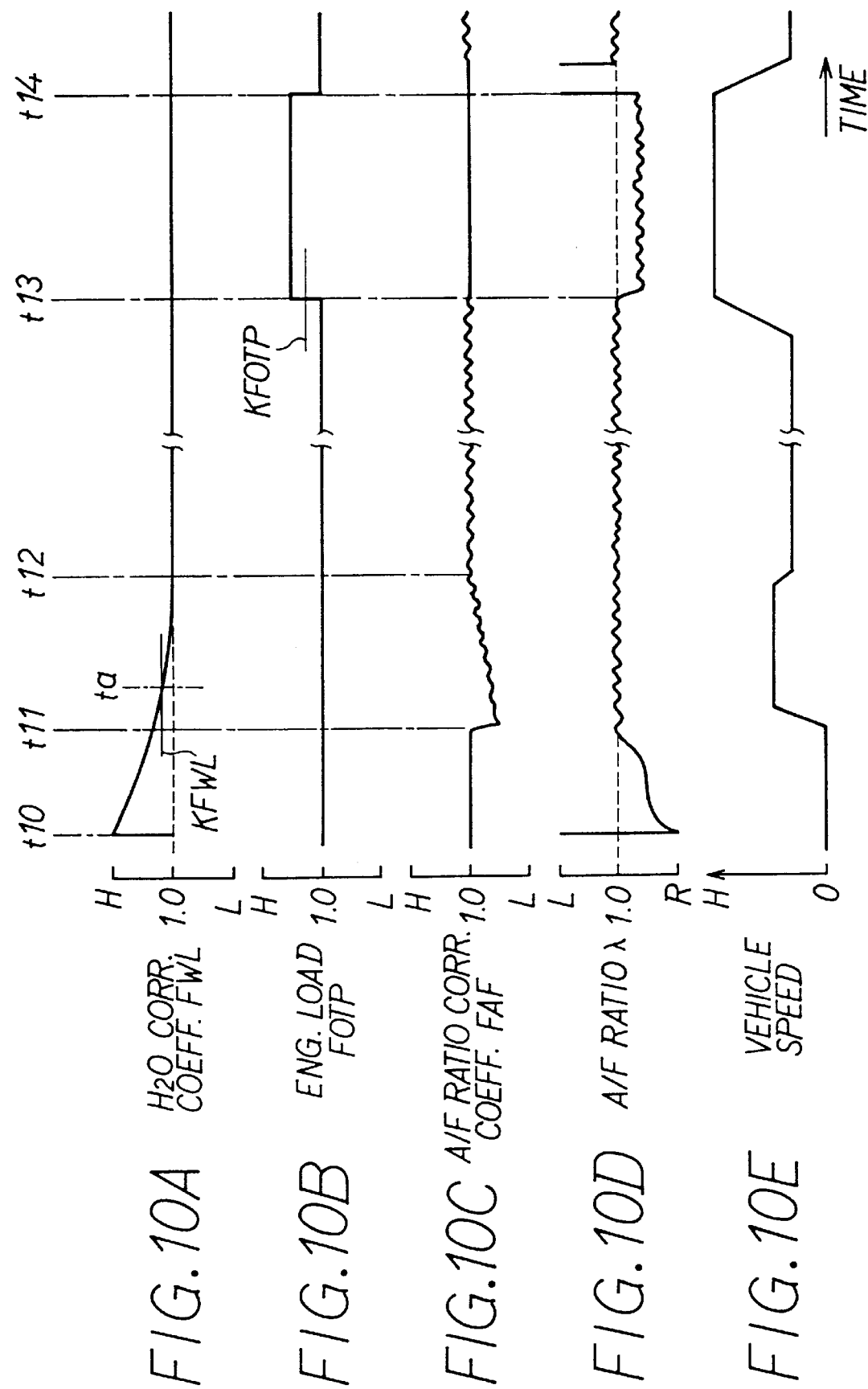
FIGS. 10A–10E are timing charts illustrating the diagnosis operation according to a second embodiment of the present invention.

FIG. 9 illustrates the outputs from the sensor 26 when the sensor 26 has abnormality. The characteristics of the sensor 26 when the sensor 26 is normal are indicated by curve La. The characteristics resulting from abnormality of the sensor 26, such as deterioration of devices or abnormality of the heater, are indicated by curves Lb and Lc. Assuming that the actual air-fuel ratio is 16, when the sensor 26 is normal, the limit current Ipa becomes the output from the sensor 26, and this output corresponds to the actual air-fuel ratio (A/F=16). On the other hand, when the sensor 26 is abnormal, the limit current Ipb, Ipc does not equal the limit current Ipa produced when the sensor 26 is normal, thus failing to detect the actual air-fuel ratio.

The sensor diagnosis routine executed by the CPU 42 synchronously with the fuel injection by the fuel injection valve 7 will be described with reference to FIGS. 8A and 8B.

Figure 8A:
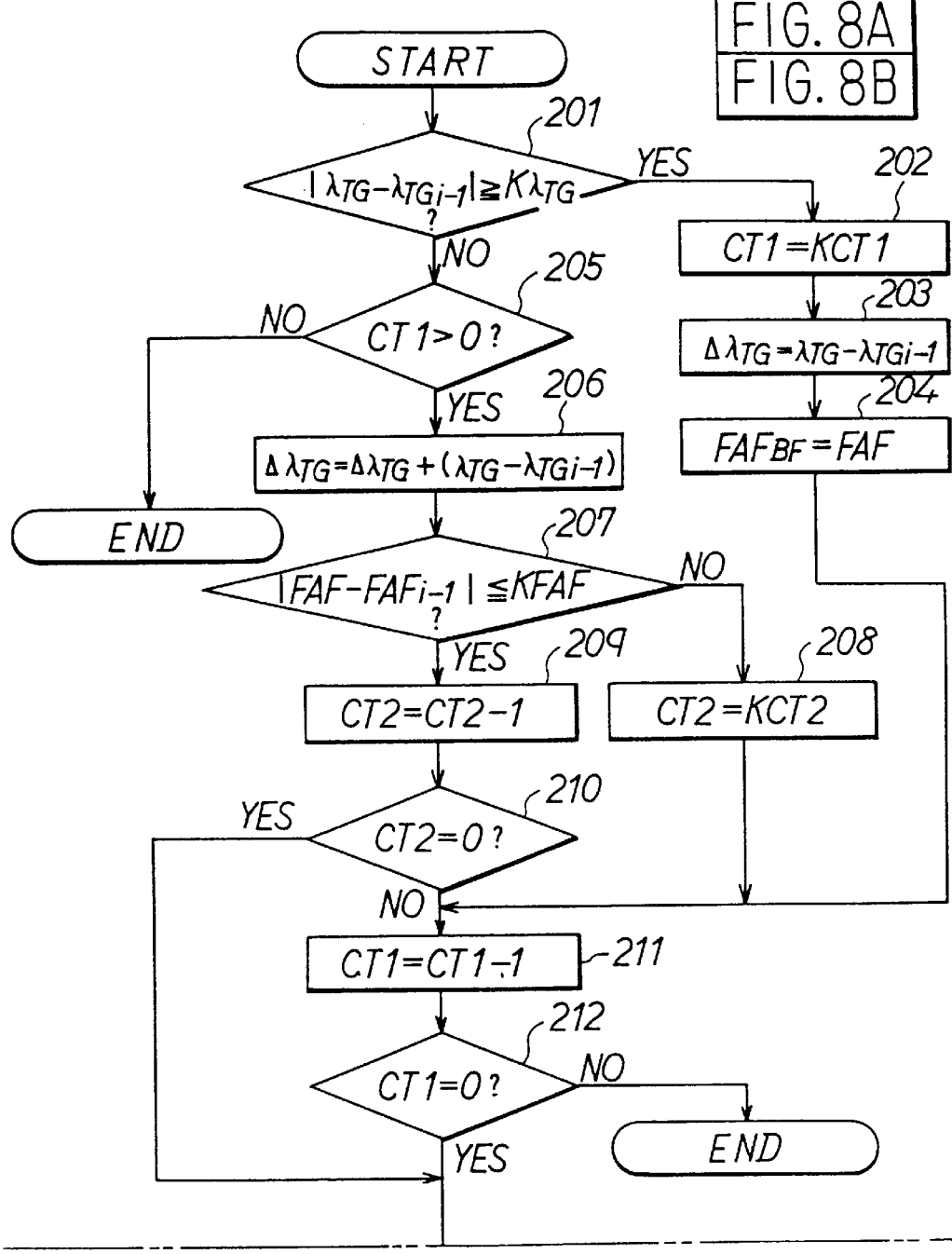

The CPU 42 determines in Step 201 of FIG. 8A whether the difference between the present target air-fuel ratio and the previous target air-fuel ratio λTi−1 is within a predetermined criterion λTG, that is, whether the present target air-fuel ratio λTG has sharply changed. If |λTG−λTi−1|<KλTG, then Step 201 makes a negative determination, and the operation proceeds to Step 205 to determine whether the value of the counter CT1 is greater than 0. If the target air-fuel ratio λTG is maintained at a predetermined value as in the case preceding the time t1 indicated in FIGS. 7A–7E, the CPU 42 holds counter CT1 at CT1=0 (initial value), and then ends the routine.

On the other hand, if |λTG−λTi−1|≧KλTG so that Step 201 makes an affirmative determination (the time t1 in FIGS. 7A–7E), the CPU 42 proceeds to Step 202 to set the counter CT1 to a predetermined value KCT1 (KCT1 is, for example, a value corresponding to 15 injections). Then, the CPU 42 in Step 203 subtract the previous target air-fuel ratio λTi−1 from the present target air-fuel ratio λTG to determine a change ΔλTG of the present target air-fuel ratio λTG (ΔλTG=λTG−λTi−1). Then, Step 204 stores the current air-fuel ratio correction coefficient FAF as a before-change correction coefficient FAFBF.

Subsequently, the CPU 42 proceeds to Step 211 to decrement the counter CT1 by 1, and then to Step 212 to determine whether the value of the counter CT1 is 0. In earlier rounds of this routine, the CPU 42 makes a negative determination in Step 212, and immediately finishes the routine. The counter CT1 is decremented in Step 211 every round of the routine until Step 212 determines that CT1=0.

If Step 201 makes a negative determination after the sharp change of the target air-fuel ratio λTG (following the time t1 in FIG. 7A–7E), the CPU 42 proceeds to Step 205. If CT1>0, then the CPU 42 proceeds to Step 206 to add the difference between the present target air-fuel ratio λTG and the previous target air-fuel ratio λTi−1 to the old "ΔλTG", thus updating "ΔλTG".

Then, the CPU 42 determines in Step 207 whether the difference between the present air-fuel ratio correction coefficient FAF and the previous air-fuel ratio correction coefficient FAFi−1 has become equal to or less than a predetermined value KFAF, that is, whether the air-fuel ratio correction coefficient FAF has converged to a predetermined value. If |FAF−FAFi−1|>KFAF, that is, if the air-fuel ratio correction coefficient FAF has not converged yet (time t1 to t2 in FIGS. 7A–7E), the CPU 42 makes a negative determination in Step 207 and then proceeds to Step 208 to set the counter CT2 to a predetermined value KCT2 (KCT2 is, for example, a value corresponding to fifteen injections). On the other hand, if |FAF−FAFi−1|≦KFAF, that is, if the air-fuel ratio correction coefficient FAF has converged (after time t2 in FIG. 7A–7E), the CPU 42 makes an affirmative determination in Step 207 and then proceeds to Step 209 to decrement the counter CT2 by 1. Subsequently, Step 210 determines whether the value of the counter CT2 is 0. If CT2≠0, then the CPU 42 proceeds to Step 211. The counters CT2 is decremented in Step 209 every round of the routine until Step 210 determines that CT2=0.

Figure 8B:
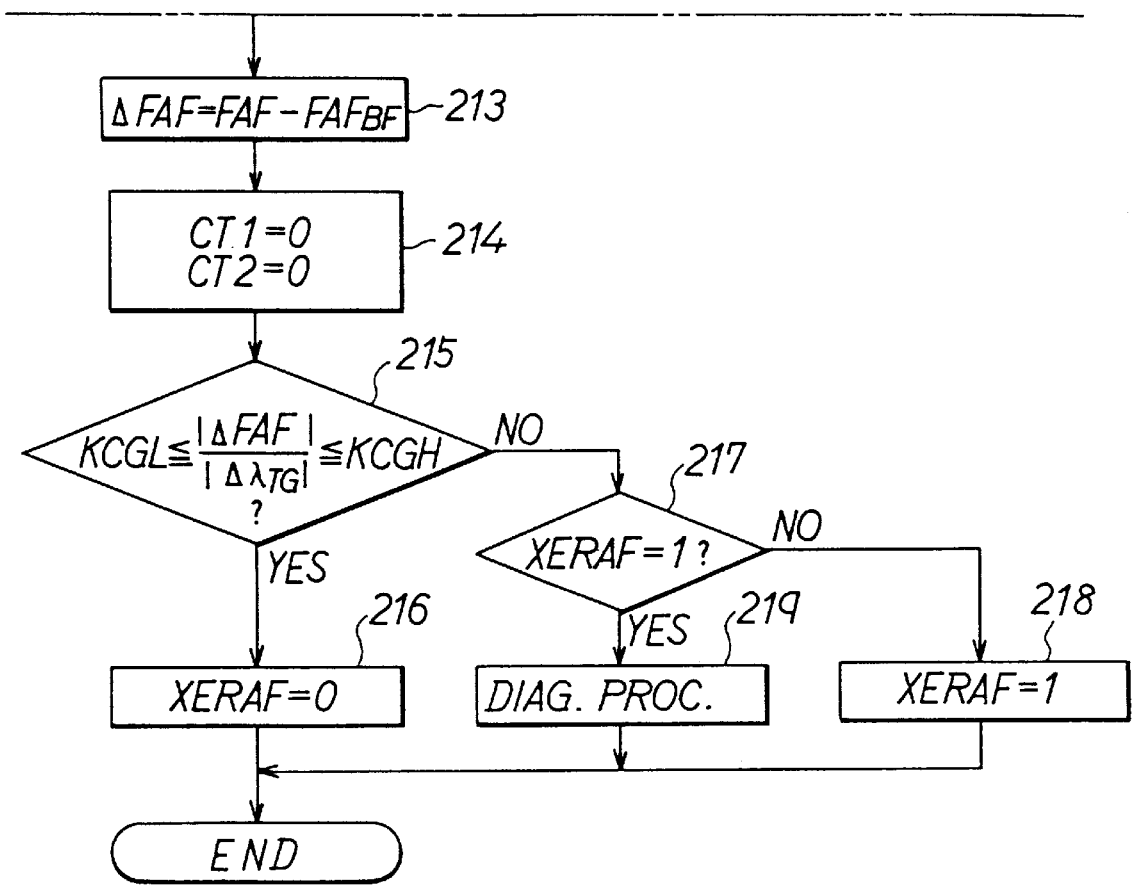

When the counter CT1 or CT2 reaches 0 (time t3 in FIG. 7A–7E), the CPU 42 proceeds to Step 213 in FIG. 8B to subtract the before-change correction coefficient FAFBF stored in Step 204 from the present air-fuel ratio correction coefficient FAF to determine a change ΔFAF of the air-fuel ratio correction coefficient FAF (ΔFAF=FAF−FAFBF). Then, Step 214 resets the counters CT1 and CT2 to "0".

The CPU 42 determines in Step 215 whether the ratio between the absolute value of ΔFAF and the absolute value of ΔλTG is within a predetermined range KCGL-KCGH (for example, KCGL=0.9, KCGH=1.1). Step 215 makes an affirmative determination if the air-fuel ratio correction coefficient FAF has varied in accordance with changes of the target air-fuel ratio λTG. That is, if the air-fuel ratio sensor 26 outputs normal signals in accordance with changes of the target air-fuel ratio λTG, the output from the sensor 26 is involved in the change of the air-fuel ratio correction coefficient FAF. Thus, the CPU 42 determines that the air-fuel ratio sensor 26 is normal, and in Step 216 clears the abnormality determination flag XERAF to "0" before finishing the routine.

On the other hand, if the change of the air-fuel ratio correction coefficient FAF is excessively larger or smaller than the change of the target air-fuel ratio λTG, Step 215 makes a negative determination, that is, the CPU 42 determines that the output from air-fuel ratio sensor 26 is abnormal. The CPU 42 then proceeds to Step 217 to determines whether the abnormality determination flag XERAF has been set to "1". If XERAF=0, then the CPU 42 establishes XERAF=1 in Step 218. If an abnormality determination is made again in the next diagnosis operation, the CPU 219 performs a predetermined procedure for the diagnosis (for example, the turning on of the warning light 49, or the stopping of the air-fuel ratio feedback).

As described in detail above, this embodiment determines whether there is a need to output a correction instruction (Step 201 in FIG. 8A), and determines whether there is an abnormality in the air-fuel ratio sensor 26 on the basis of the comparison between the change λFAF of the air-fuel ratio correction coefficient FAF and the change λTG of the target air-fuel ratio λTG if the target air-fuel ratio λTG has sharply changed (Step 215 in FIG. 8B). This diagnosis operation can precisely and easily detect the occurrence of an abnormality in the air-fuel ratio sensor 26. As a result, the air-fuel ratio control system employing a linear air-fuel ratio sensor 26 as in this embodiment will not use an imprecise output from the sensor 26 for air-fuel ratio control, thus achieving highly precise and highly reliable air-fuel ratio control.

Second Embodiment

A second preferred embodiment will be described with the description thereof mainly focused on the features thereof that distinguish the second embodiment from the first embodiment. The second embodiment detects abnormality of the air-fuel ratio sensor 26 on the basis of the behavior of the signals outputted from the air-fuel ratio sensor 26 when the fuel injection amount is increased depending on the coolant temperature or high-load engine operation. According to this embodiment, the CPU 42 constitutes means for correcting injection amount and means for calculating total correction amount as recited in the appended claims.

FIGS. 10A–10E are timing charts indicating the operation of the sensor diagnosis according to the second embodiment. This timing chart will be first described in detail. The internal combustion engine 1 is started at time point t10 with the switching-on operation using the ignition key. Since the coolant is at a low temperature during this period, a coolant temperature correction coefficient FWL is set to a value larger than 1.0 to perform a coolant temperature-dependent increase correction operation. The coolant temperature then gradually rises, and the air-fuel ratio feedback is started at time point t11 when the coolant temperature reaches 40° C. With the air-fuel ratio feedback, the air-fuel ratio correction coefficient FAF is set to a relatively small value (i.e., on the amount reduction side) for the current coolant temperature-dependent increasing correction. The air-fuel ratio correction coefficient FAF is increased as the coolant temperature-dependent correction coefficient FWL is reduced. At time point t12 when the engine 1 is sufficiently warmed up and the coolant temperature-dependent increasing correction is ended, the air-fuel ratio correction coefficient FAF converges to approximately to 1.0.

During the period from t10 to t11, the air-fuel ratio λ (detected by the air-fuel ratio sensor 26) is shifted to the rich side by the coolant temperature-dependent increasing correction. Thus, the diagnosis of the air-fuel ratio sensor 26 is performed on the basis of the behavior of the air-fuel ratio λ relative to the coolant temperature-dependent increasing correction. In the period t11-t12, the coolant temperature-dependent increasing correction is continued while the air-fuel ratio correction coefficient FAF is set to values that will reduce the fuel injection amount. The air-fuel ratio λ is thereby maintained approximately at the target air-fuel ratio λTG (λTG=1.0 in FIGS. 10A–10E) in this period. Therefore, the diagnosis of the air-fuel ratio sensor 26 is performed on the basis of the behavior of the air-fuel ratio λ relative to the coolant temperature-dependent increasing correction and the air-fuel ratio correction using the coefficient FAF in this period.

At time point t13 when the vehicle is traveling, high-load increasing correction is performed for acceleration. For this correction, the air-fuel ratio feedback is temporarily switched to open control, and the air-fuel ratio correction coefficient FAF is maintained substantially at 1.0. Further, a load-dependent correction coefficient FOTP is set to values that will increase the fuel injection amount, so that the air-fuel ratio (detected by the air-fuel ratio sensor 26) is shifted to the rich side. During a period t13-t14, the diagnosis of the air-fuel ratio sensor 26 is performed on the basis of the behavior of the air-fuel ratio λ relative to the high-load increasing correction.

Then, at time point t14 when the vehicle starts to slow down, the high-load increasing correction is ended, and the load-dependent correction coefficient is set back to 1.0. At this timing, a fuel cut is performed so that the air-fuel ratio λ is temporarily shifted further to the lean side. Following the fuel cut, the air-fuel ratio feedback is restarted.

Figure 11:
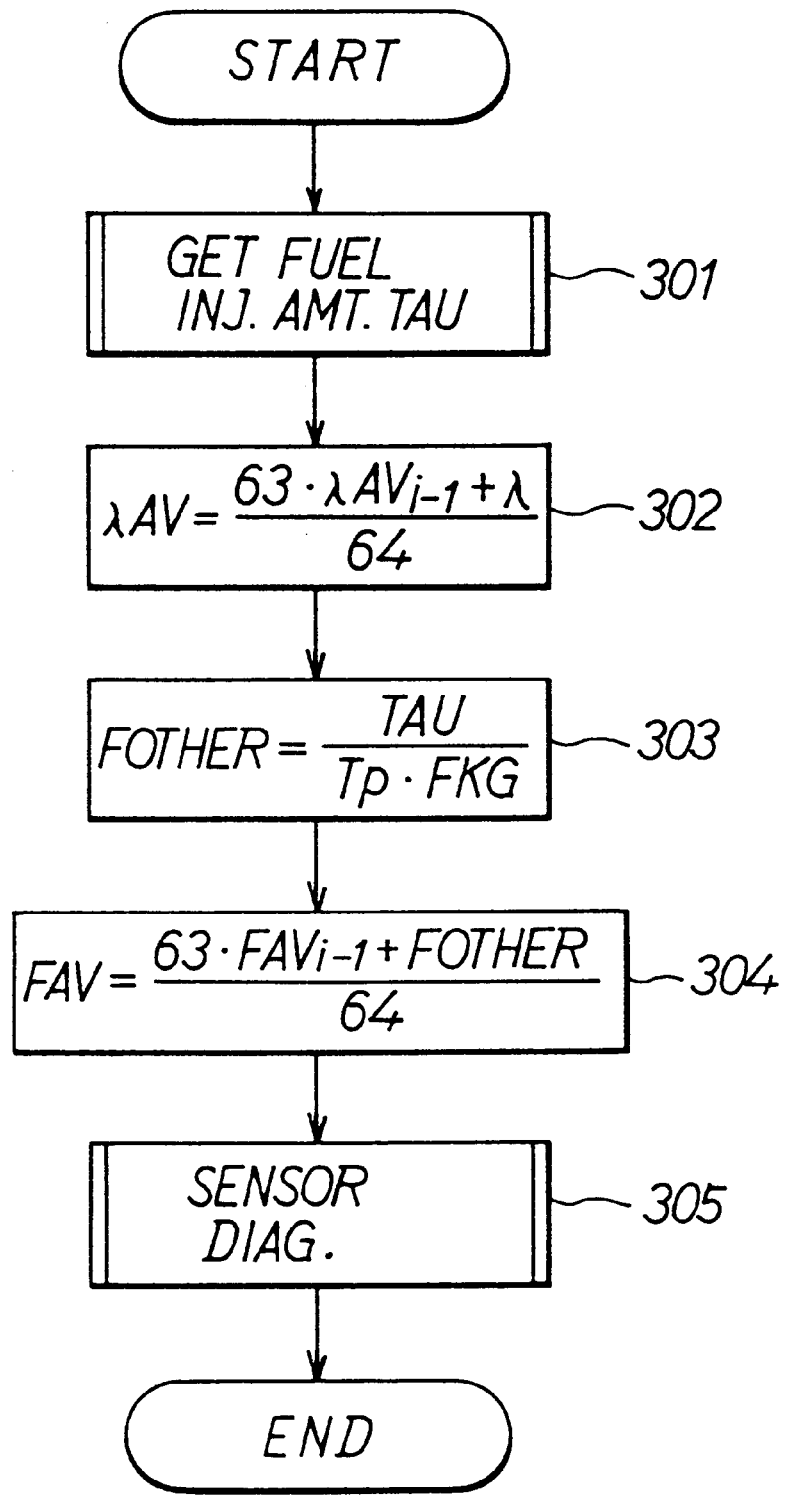
FIG. 11 is a flowchart illustrating a fuel injection main routine.
Figure 12:
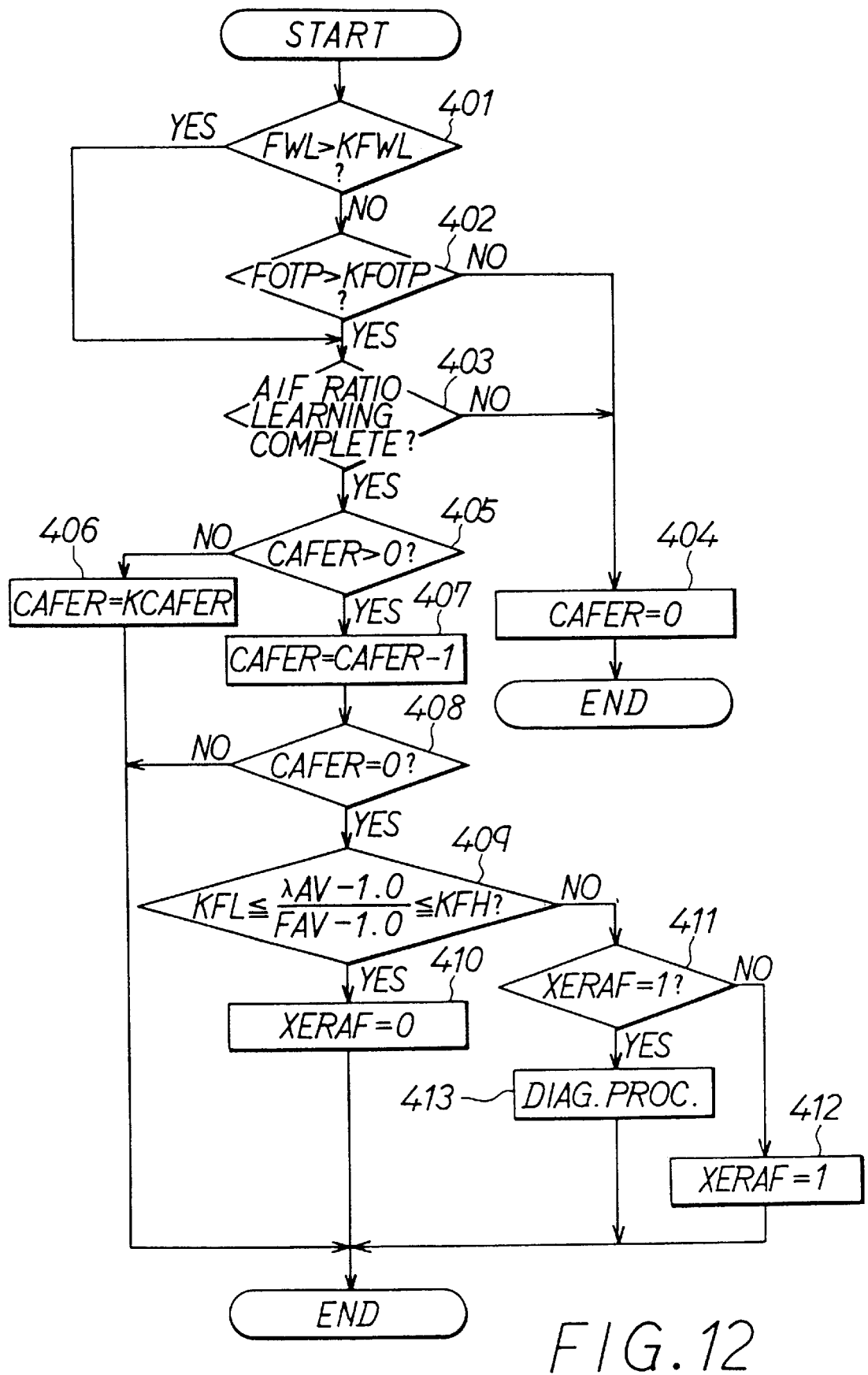
FIG. 12 is a flowchart illustrating a sensor diagnosis routine according to the second embodiment.

The computation performed by the CPU 42 to achieve the above-described operation will be described with reference to the flowcharts shown in FIGS. 11 and 12. The flowchart of FIG. 11 illustrates the fuel injection main routine executed synchronously with injection. The flowchart of FIG. 12 illustrates the sensor diagnosis routine.

Referring to FIG. 11, the CPU 42 executes in Step 301 the routine illustrated in FIG. 5 to calculate a fuel injection amount TAU. Then, Step 302 calculates an air-fuel ratio average λAV by the average calculation {λAV=(63×λAVi−1+λ)/64}.

In Step 303, the CPU 42 divides the fuel injection amount TAU by the product of the basic fuel injection amount and the air-fuel ratio learned value FKG to determine a fuel correction amount FOTHER relative to the fuel injection amount TAU (the correction amount excluding the air-fuel ratio learned value) {FOTHER=TAU/(Tp×FKG)}. The fuel correction coefficient FOTHER corresponds to the total correction amount including, for example, the coolant temperature-dependent correction coefficient FWL, the load-dependent correction coefficient FOTP and the air-fuel ratio correction coefficient FAF. Essentially, the basic fuel injection amount Tp calculated on the basis of the engine operating conditions (e.g., the engine speed Ne, the intake air pressure PM) should be determined to drive the air-fuel ratio λ to the theoretical air-fuel ratio λ=1. The variations of the fuel injection amount caused by differences of individual engines or changes over time are corrected by the air-fuel ratio learned value FKG. Thus, the division of "TAU" by "Tp×FKG" provides the total correction amount for achieving the air-fuel ratio λ=1.

In Step 304, the CPU calculates a correction coefficient average FAV {FAV=(63×FAVi−1+FOTHER)/64}. Subsequently, Step 305 executes the sensor diagnosis routine illustrated in FIG. 12.

The sensor diagnosis routine illustrated in FIG. 12 will now be described. The CPU 42 determines in Step 401 whether the coolant temperature-dependent correction coefficient FWL is greater than a predetermined criterion KFW. For example, while the coolant temperature-dependent increasing correction is performed following the start of the engine 1, FWL>KFWL is established and Step 401 makes an affirmative determination. Then, Step 402 determines whether the load-dependent correction coefficient FOTP is greater than a predetermined criterion KFOTP. For example, during the high-load increasing correction (at the time t13 in FIGS. 10A–10E), FOTP>KFOTP is established and step 402 makes an affirmative determination.

The CPU 42 determines in Step 403 whether the air-fuel ratio learning operation has been completed for the entire operational region of the internal combustion engine 1. If the air-fuel ratio learning operation has not been completed (NO in Step 403), or if there is no need for the coolant temperature-dependent increasing correction or the high-load increasing correction (NO in both Step 401 and Step 402), the CPU 42 proceeds to Step 404 to clear a counter CAFER to "0", and then ends the routine. That is, variations of the fuel injection amount caused by differences of individual engines or changes over time cannot be corrected for regions for which the air-fuel ratio learning operation has not been performed. Therefore, the diagnosis is executed according to this embodiment only after the air-fuel ratio learning operation has been completed.

On the other hand, if either the coolant temperature-dependent increasing correction or the high-load increasing correction is being performed and the air-fuel ratio learning operation has been completed (YES in either Step 401 or Step 402, and YES in Step 403), the CPU 42 proceeds to Step 405 to determine whether the value of the counter CAFER is greater than 0. For a starting round of the diagnosis operation where CAFER=0 (initial value), Step 405 makes a negative determination, and proceeds to Step 406 to set the counter CAFER to a predetermined value KCAFER (for example, a value corresponding to fifteen injections).

Once the counter CAFER is set in Step 406, Step 405 makes an affirmative determination in later rounds of operation, and Step 407 decrements the counter CAFER by 1. The CPU 42 determines in Step 408 whether the counter CAFER has reached 0. If CAFER=0 is reached, the CPU 42 makes an affirmative determination in Step 408, and the operation proceeds to Step 409. In Step 409, the CPU 42 calculates a deviation of the air-fuel ratio average $\lambda$AV determined in Step 302 from the target air-fuel ratio $\lambda$TG ($\lambda$TG=1.0 according to this embodiment), that is, $\lambda$AV−1.0, and a deviation of the correction coefficient average FAV from a reference value (=1.0), that is, FAV−1.0. Step 409 then determines the ratio of these deviations ($\lambda$AV−1.0)/(FAV−1.0). Further, Step 409 determines whether the ratio is within a predetermined range KFL-KFH (for example, KFL=−0.8, KFH=−1.2).

If Step 409 makes an affirmative determination, the CPU 42 clears the diagnosis determination flag XERAF to "0" in Step 410 followed by the end of this routine. On the other hand, if Step 409 makes a negative determination, the CPU 42 determines that abnormality has occurred, and proceeds to Step 411 to determine whether the diagnosis determination flag XERAF has been set to "1". If XERAF=0, then the CPU 42 establishes XERAF=1 in Step 412. If an abnormality determination is made again in the next round of this routine, Step 413 performs procedures for the diagnosis (for example, the turning on of the warning light 49 and/or the stopping of the air-fuel ratio feedback).

As described above, the second embodiment determines a total correction amount with respect to the basic fuel injection amount Tp calculated on the basis of the engine speed Ne and the engine load (intake air pressure PM) (Steps 303, 304 in FIG. 11), and determines whether there is abnormality in the air-fuel ratio sensor 26 on the basis of the comparison between the total correction amount and the change of the air-fuel ratio $\lambda$ detected by the air-fuel ratio sensor 26 (Step 409 in FIG. 12). Therefore, the second embodiment precisely and easily detects occurrence of abnormality as in the first embodiment.

Third Embodiment

A third embodiment will now be described. The third embodiment determines whether abnormality has occurred in the air-fuel ratio sensor 26 on the basis of the behavior of the air-fuel ratio $\lambda$ (detected by the air-fuel ratio sensor 26) during transitional engine operation. According to this embodiment, the CPU 42 constitutes amplitude detecting means as recited in the appended claims.

FIGS. 13A–13C are timing charts indicating the operation of the sensor diagnosis according to the third embodiment. At time point t21 when the vehicle is rapidly accelerated, the air-fuel ratio $\lambda$ is temporarily varied to the lean side and to the rich side. At time point t22 when the vehicle is suddenly decelerated, the air-fuel ratio $\lambda$ also fluctuates to a large extent. In such a period, the sensor diagnosis is performed on the basis of the difference between the lean peak ratio $\lambda$L and the rich peak ratio $\lambda$R achieved by fluctuation of the air-fuel ratio $\lambda$ (that is, the amplitude of the air-fuel ratio $\lambda$).

Figure 14:
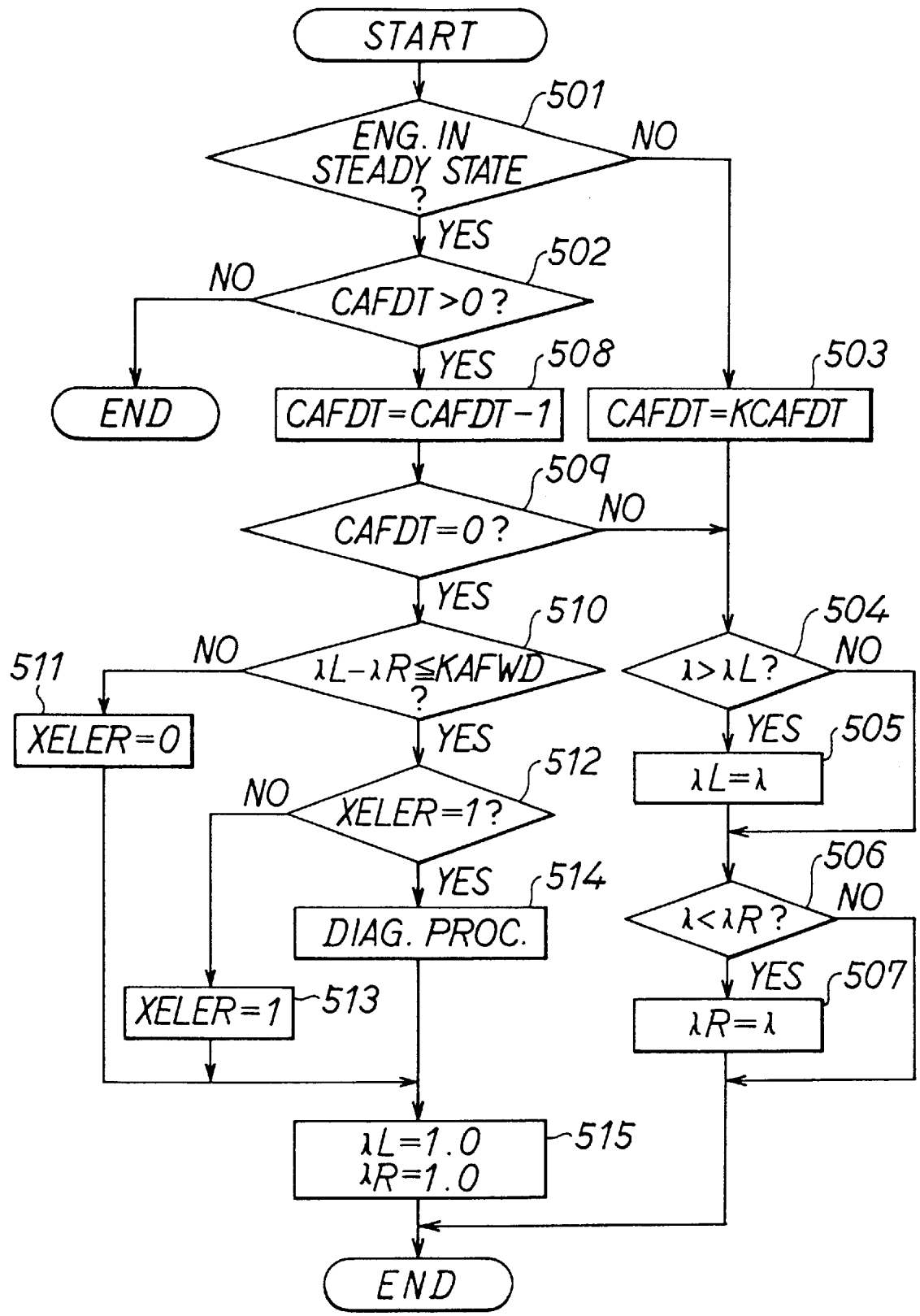
FIG. 14 is a flowchart illustrating a sensor diagnosis routine according to the third embodiment.

FIG. 14 illustrates the sensor diagnosis routine according to the third embodiment. The CPU 42 determines in Step 501 whether the internal combustion engine 1 is in a steady operating condition state. The determination regarding the steady conditions is made on the basis of whether the engine is accelerated or decelerated, whether the target air-fuel ratio $\lambda$TG is sharply changed, or whether the air-fuel ratio correction coefficient FAF is sharply changed. If it is determined that the engine 1 is in the steady operating condition, the CPU 42 proceeds to Step 502 to determine whether the value of a counter CAFDT is greater than 0. For a starting round of this routine when the counter CAFDT has not been set (initial value CAFDT=0), the CPU 42 makes a negative determination in Step 502 and immediately ends the routine.

If the engine 1 is rapidly accelerated, that is, in the transitional operating conditions, the CPU 42 makes a negative determination (time t21 in FIGS. 13A–13C) in Step 502, and sets the counter CAFDT to a predetermined value KCAFDT in Step 503. The CPU 42 then proceeds to Step 504 to determine whether the present air-fuel ratio is greater than the lean peak ratio $\lambda$L stored (that is, whether the present air-fuel ratio is further into the lean side than the lean peak ratio $\lambda$L). If $\lambda$>$\lambda$L, Step 505 updates the lean peak ratio $\lambda$L. In Step 506, the CPU 42 determines whether the present air-fuel ratio is smaller than the rich peak ratio $\lambda$R stored (that is, whether the present air-fuel ratio is further into the rich side than the rich peak ratio $\lambda$R). If $\lambda$<$\lambda$R, Step 507 updates the rich peak ratio $\lambda$R. The lean and rich peak ratios $\lambda$L, $\lambda$R during transitional periods are thus updated.

If the engine 1 resumes the steady operating condition, the CPU 42 proceeds from Step 501 to Step 502 and then to 508. Step 508 decrements the counter CAFDT by 1. The CPU 42 determines in Step 509 whether the counter CAFDT is 0. If CAFDT≠0, the CPU 42 proceeds to Step 504 described above. Thus, during a period (t21-t22 in FIGS. 13A–13E) when the counter CAFDT is decremented, the lean and rich peak ratios $\lambda$L and $\lambda$R are updated in Steps 504–507.

If CAFDT=0 is established (time t23 in FIGS. 13A–13C), the CPU 42 makes an affirmative determination in Step 509. In Step 510, the CPU 42 determines whether the difference between the lean peak ratio $\lambda$L and the rich peak ratio $\lambda$R is equal to or less than a predetermined criterion KAFWD. If $\lambda$L−$\lambda$R>KAFWD, that is, if Step 510 makes a negative determination, the CPU 42 proceeds to Step 511 to clear a diagnosis determination flag XELER to to "0". That is, the CPU 42 determines that the fuel increasing correction caused by sharp acceleration or deceleration or the like is normally reflected in the output from the air-fuel ratio sensor 26 and thus determines that sensor 26 is normal. Then, the CPU 42 proceeds to Step 515 to reset the lean and rich peak ratios $\lambda$L and $\lambda$R to 1.0 for the next diagnosis operation and then ends this routine.

On the other hand, if $\lambda L-\lambda R \geq KAFWD$, that is, if Step 510 makes an affirmative determination, the CPU 42 proceeds to Step 512 to determine whether the abnormality determination flag XELER has been set to "1". If the abnormality determination flag XELER has not been set to "1", the CPU 42 establishes XELER=1 in Step 513. If an occurrence of abnormality is again determined in the next operation of the diagnosis (Steps 501–510), the CPU 42 performs the procedure for the diagnosis.

As described above, the third embodiment determines the amplitude of the air-fuel ratio $\lambda$ detected by the air-fuel ratio sensor 26 when the engine 1 is in the transitional operating condition, and determines whether there is abnormality in the air-fuel ratio sensor 26 (Step 510 in FIG. 14). Thus, the third embodiment precisely and easily performs the sensor diagnosis as in the first and second embodiments.

Figure 15A:
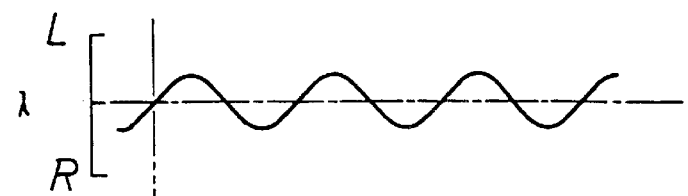
FIGS. 15A–15G are timing charts indicating various forms of abnormality.

As described above, the third embodiment determines an air-fuel ratio correction coefficient FAF in accordance with the difference between the air-fuel ratio $\lambda$ and the target air-fuel ratio $\lambda TG$ ($\lambda TG=1.0$ according to the first embodiment). If abnormality occurs in the air-fuel ratio sensor 26, the behavior of the air-fuel ratio correction coefficient FAF relative to the air-fuel ratio $\lambda$ (output from the sensor 26) becomes unstable. FIGS. 15A–15G are timing charts indicating various forms of abnormalities determined on the basis of a comparison between the output from the sensor 26 and the air-fuel ratio correction coefficient FAF. FIG. 15A indicates the waveform of a normal output from the sensor 26 (air-fuel ratio $\lambda$). FIGS. 15B–15G indicate waveforms of the outputs from the sensor 26 or the air-fuel ratio correction coefficient FAF occurring when the sensor 26 is abnormal.

Figure 15B:
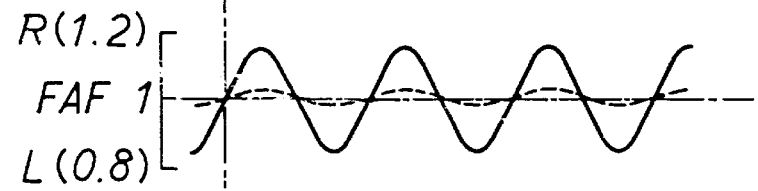

The abnormality of the air-fuel ratio sensor 26 in various forms will be described with reference to FIGS. 15A–15G. Compared with the amplitude of the air-fuel ratio $\lambda$ indicated in FIG. 15A, the amplitude of the air-fuel ratio correction coefficient FAF indicated in FIG. 15B is larger (indicated by the solid line) or smaller (indicated by the broken line). For example, if the air-fuel ratio sensor 26 deteriorates, the air-fuel ratio sensor 26 becomes unable to output signals (limit currents) that correspond to the actual air-fuel ratio $\lambda$. In such a case, the air-fuel ratio correction coefficient FAF in accordance with the difference between the actual air-fuel ratio $\lambda$ and the target air-fuel ratio $\lambda TG$ cannot be obtained, thus causing excessively large or small fluctuation of the air-fuel ratio correction coefficient FAF.

More specifically, when the sensor body 32 of the air-fuel ratio sensor 26 deteriorates, the device internal resistance increases. In such a case, the slope of the voltage-current characteristic curve (as shown in FIG. 16) within a resistance-dominant region (that is, a voltage region where the voltage is smaller than the voltages corresponding to the segment of the curve parallel to the voltage axis) becomes less when abnormality (deterioration) has occurred (indicated by dotted line) than when the sensor body 32 is normal (indicated by solid line) (Ip2<Ip1). That is, the deterioration reduces the limit current that flows through the air-fuel ratio sensor 26. In addition, the straight segment of the characteristic curve (as shown in FIG. 16) parallel to the voltage axis becomes inclined (the curve indicated by the dot-dash line is inclined upwards to the right), and therefore the limit current increases over the normal level (Ip3>Ip1). In these cases, precise detection of the air-fuel ratio $\lambda$ becomes impossible so that the difference between the actual air-fuel ratio $\lambda$ and the target air-fuel ratio $\lambda TG$ becomes excessively large or small, resulting in large deviations of the amplitude of the air-fuel ratio correction coefficient FAF from that of the actual air-fuel ratio $\lambda$.

Figure 15C:
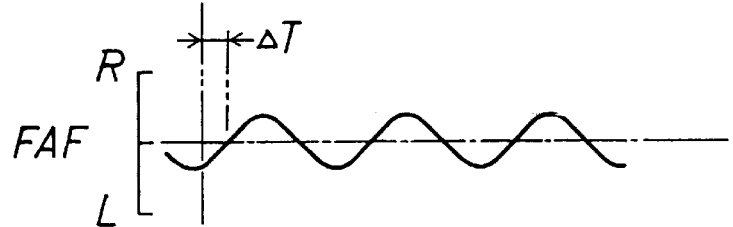

In FIG. 15C, the phase of the air-fuel ratio correction coefficient FAF is delayed a predetermined amount $\Delta T$ from that of the air-fuel ratio $\lambda$ detected by the air-fuel ratio sensor 26 (indicated in FIG. 15A). More specifically, if the response delay of the air-fuel ratio sensor 26 is caused by contamination of the sensor 26 (for example, clogging of the pores 31a of the cover 31, or clogging of the porous materials in the electrode layers 36, 37 shown in FIG. 2), the phase of the air-fuel ratio correction coefficient FAF deviates as indicated in FIG. 15C.

Figure 15D:
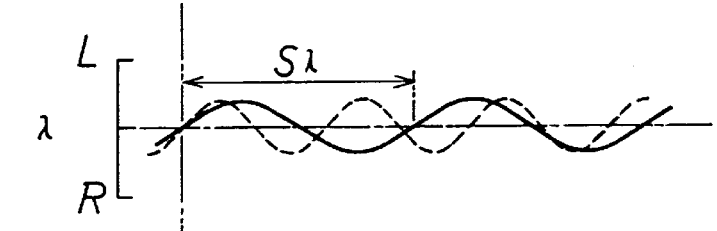
Figure 15E:
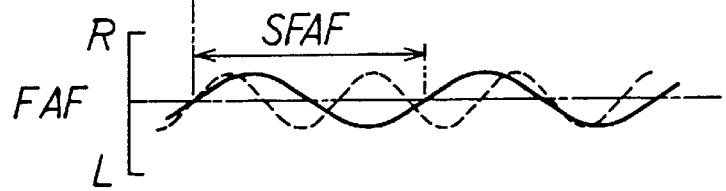

In FIGS. 15D and 15E, the period $S\lambda$ of the air-fuel ratio detected by the air-fuel ratio sensor 26 is increased, and the period SFAF of the air-fuel ratio correction coefficient FAF is also increased. That is, at least one of the period $S\lambda$ of the air-fuel ratio detected by the air-fuel ratio sensor 26 and the period SFAF of the air-fuel ratio correction coefficient FAF will become abnormal if a plurality of abnormality factors, such as deviation of the air-fuel ratio correction coefficient FAF in amplitude and phase, occur. Further, if the output gain of the air-fuel ratio sensor 26 decreases or the response thereof is delayed, the periods $S\lambda$, SFAF exceeds allowed values. If the output gain of the air-fuel ratio sensor 26 increases or the response thereof becomes quick, the periods $S\lambda$, SFAF becomes lower than allowed values.

Figure 15F:
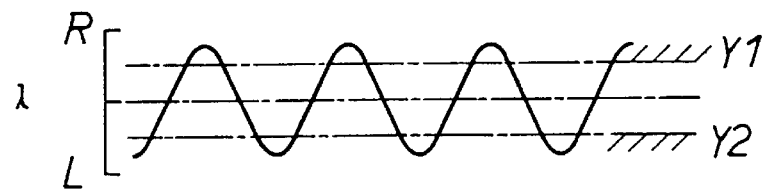
Figure 15G:
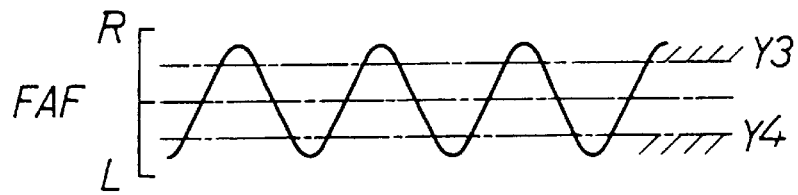

In FIGS. 15F and 15G, the amplitude of the air-fuel ratio $\lambda$ detected by the air-fuel ratio sensor 26 or the amplitude of the air-fuel ratio correction coefficient FAF is greater than a predetermined allowed range. The abnormalities indicated in FIGS. 15F and 15G are likely to occur when a plurality of abnormality factors, such as deviation of the air-fuel ratio correction coefficient FAF in amplitude and phase, occur.

Fourth Embodiment

Figure 17A:
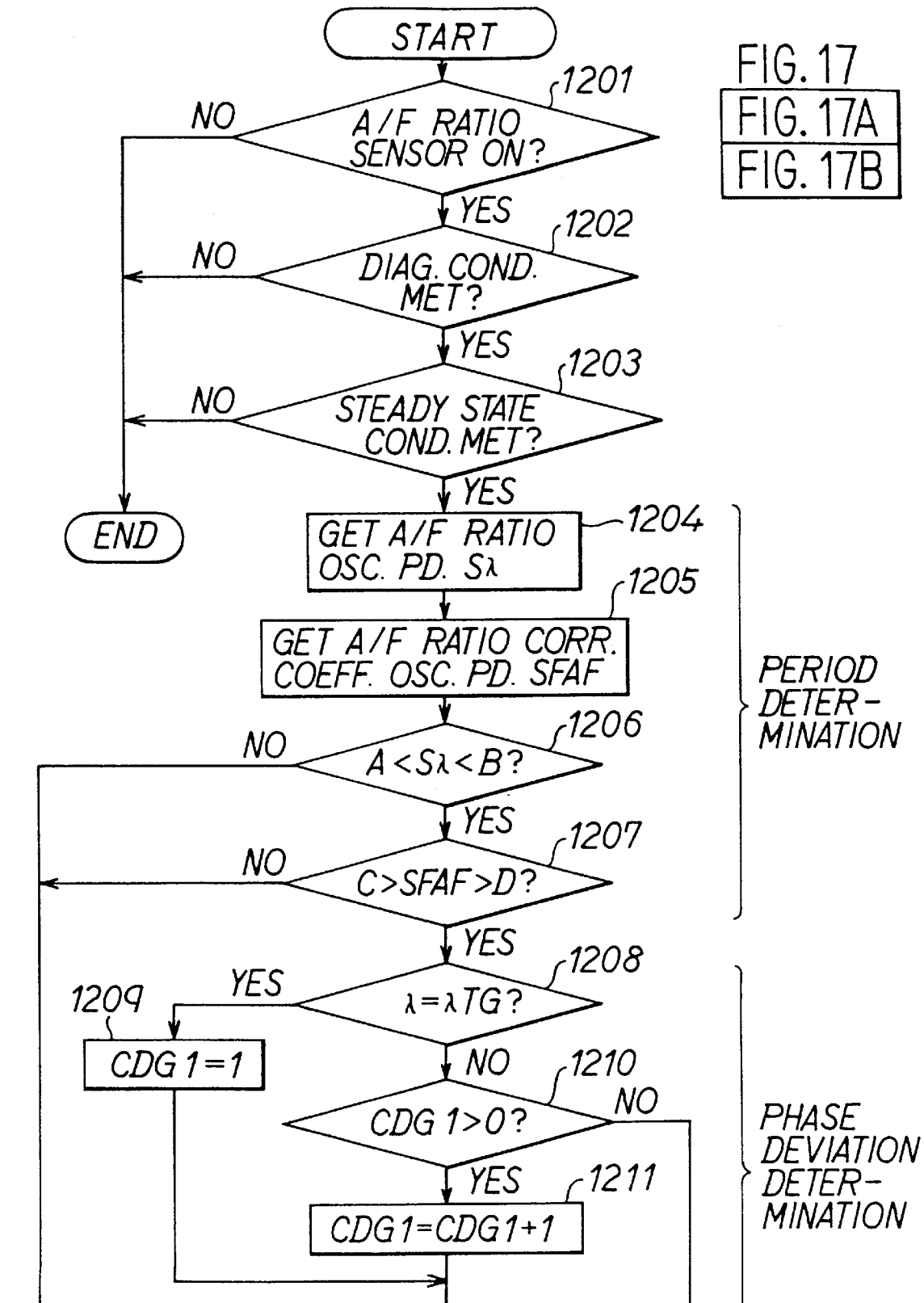
Figure 17B:
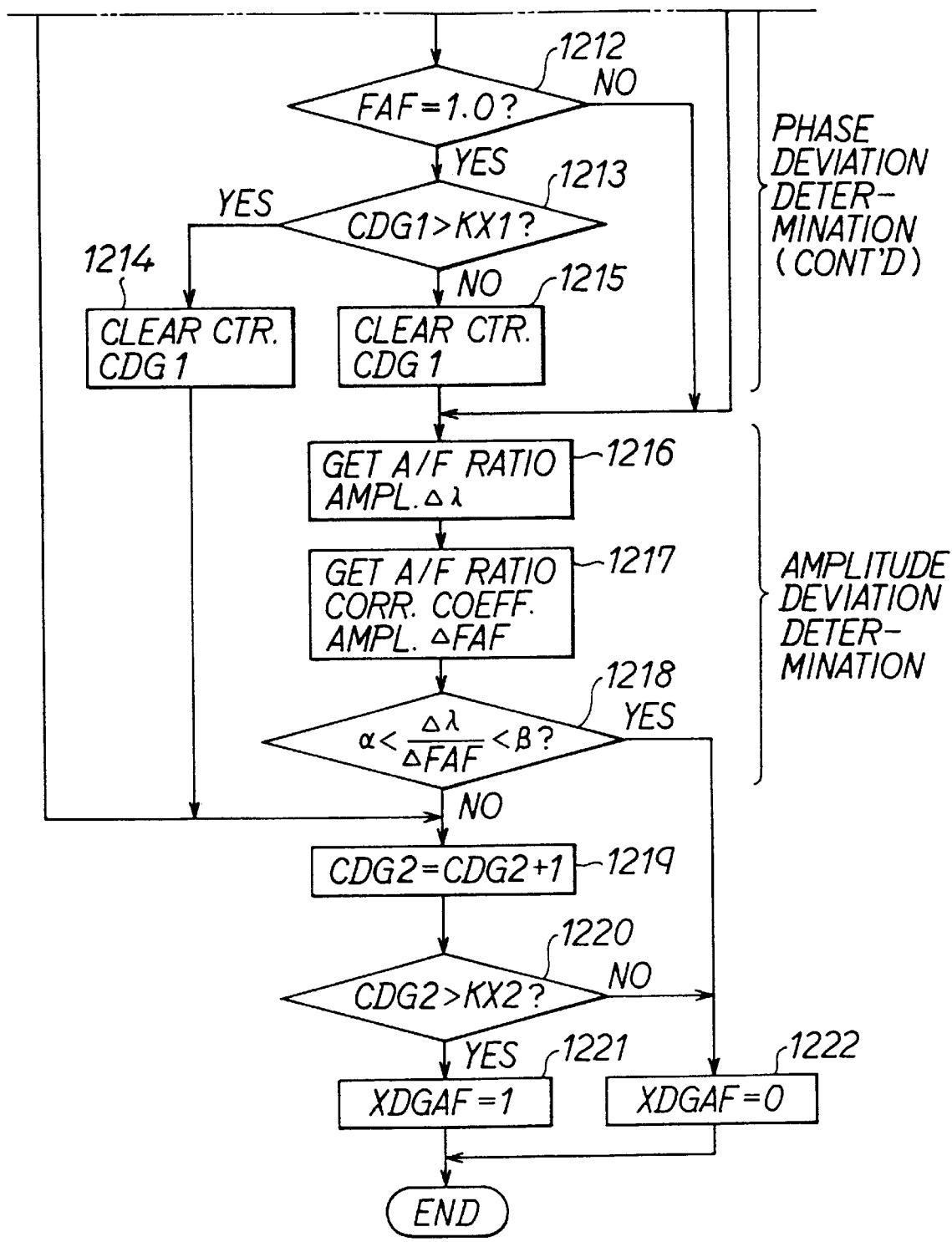

According to a fourth embodiment of the present invention, the following diagnosis operation is executed to determine various forms of abnormalities described above. FIGS. 17A and 17B illustrate a first diagnosis routine executed by the CPU 42 synchronously with fuel injection.

In Step 1201 in FIG. 17A, the CPU 42 determines whether the air-fuel ratio sensor 26 is activated. More specifically, the CPU 42 determines that the air-fuel ratio sensor 26 is activated if the device temperature of the air-fuel ratio sensor 26 (the temperature of the sensor body 32) equals or exceeds 650° C. or if the device resistance of the air-fuel ratio sensor 26 is equal to or lower than 90 $\Omega$. The CPU 42 then determines in Step 1202 whether predetermined diagnosis conditions have been established. In Step 1203, the CPU 42 determines whether predetermined steady operating conditions of the engine 1 have been established. The establishment of the diagnosis conditions concerned in Step 1202 comprises the air-fuel ratio feedback conditions having been established, and a predetermined length of time having elapsed following the start of the air-fuel ratio feedback. The establishment of the steady operating conditions in Step 1203 comprises the intake air pressure PM being equal to or lower than a predetermined level, the engine speed Ne being equal to or lower than a predetermined value, the throttle opening TH being equal to or lower than a predetermined value, or the engine being in an idle state.

If Steps 1201–1203 all make affirmative determinations, the CPU 42 executes the diagnosis based on a determination regarding the oscillation period. If no abnormality is detected on the basis of the oscillation period, the CPU 42 proceeds to Steps 1208–1215 to execute the diagnosis based on determinations regarding the phase deviation. If no abnormality is detected on the basis of the oscillation period nor the phase deviation, the CPU 42 executes in Steps 1216–1218 the diagnosis based on the amplitude deviation. These diagnosis procedures will be described in detail below.

In the period determination (Steps 1204–1207), the CPU 42 reads in the oscillation period $S\lambda$ of the air-fuel ratio $\lambda$ in Step 1204, and the oscillation period SFAF of the air-fuel ratio correction coefficient FAF in Step 1205. The periods $S\lambda$ and SFAF are calculated by a calculation routine described later.

The CPU 42 then determines in Step 1206 whether the period $S\lambda$ of the air-fuel ratio $\lambda$ is within a predetermined allowed range (A-B). Step 1207 determines whether the period $S\lambda$ of the air-fuel ratio correction coefficient FAF is within a predetermined allowed range (C-D). If the periods $S\lambda$ and SFAF are within the predetermined allowed ranges, Steps 1206 and 1207 make affirmative determinations, that is, it is determined that no abnormality regarding the period has occurred. The CPU 42 then proceeds to Step 1208 (that is, to the phase deviation determination). On the other hand, if either Step 1206 or Step 1207 makes negative determination, the CPU 42 determines that abnormality has occurred regarding the period, and proceeds to Step 1219 in FIG. 17B.

In the phase deviation determination (Steps 1208–1215), the CPU 42 determines whether the air-fuel ratio $\lambda$ corresponds to the target air-fuel ratio $\lambda$TG in Step 1208. If $\lambda=\lambda$TG, then the CPU 42 proceeds to Step 1209 to set a phase deviation counter CDG1 to "1". If $\lambda\neq\lambda$TG, then the CPU 42 proceeds to Step 1210 to determine whether the value of the phase deviation counter CDG1 is greater than 0. In the case where Step 1209 has not been executed, CDG1= 0, and therefore the CPU 42 makes a negative determination in Step 1210 and proceeds to Step 1216 (described later). In the case where Step 1209 has been executed, CDG1>0 and therefore the CPU 42 makes an affirmative determination in Step 1210 and proceeds to Step 1211 to increment the phase deviation counter CDG1 by 1.

Subsequently, the CPU 42 determines in Step 1212 in FIG. 17B whether the air-fuel ratio correction coefficient FAF is 1. If FAF$\neq$1, then the CPU 42 immediately proceeds to Step 1216. If FAF=1, then the CPU 42 proceeds to Step 1213 to determine whether the phase deviation counter CDG1 exceeds a predetermined criterion KX1. In the case where the deviation in phase between the air-fuel ratio $\lambda$ and the air-fuel ratio correction coefficient FAF is within a predetermined allowed range, that is, CDG1$\leq$KX1, Step 1213 makes a negative determination, that is, it is determined that no abnormal deviation in phase has occurred. The CPU 42 then clears the phase deviation counter to "0" in Step 1215 and proceeds to Step 1216 (that is, to the amplitude deviation determination). The phase deviation counter CDG1 performs counting as indicated in FIGS. 18A–18E.

On the other hand, if the deviation in phase between the air-fuel ratio $\lambda$ and the air-fuel ratio correction coefficient FAF exceeds the predetermined allowed range (CDG>KX1), Step 1213 makes an affirmative determination, that is, it is determined that an abnormal phase deviation has occurred. The CPU 42 then clears the phase deviation counter CDG1 to "0" in Step 1214 and proceeds to Step 1219.

In the amplitude deviation determination (Steps 1216–1218), the CPU 42 reads in the amplitude $\Delta\lambda$ of the air-fuel ratio $\lambda$ in Step 1216, and the amplitude $\Delta$FAF of the air-fuel ratio correction coefficient FAF in Step 1217. The amplitudes $\Delta\lambda$ and $\Delta$FAF take values as indicated in FIGS. 18A and 18B and are calculated by the calculation routine described later.

Subsequently, the CPU 42 determines in Step 1218 whether the ratio between the amplitude $\Delta\lambda$ and the amplitude $\Delta$FAF is within a predetprmined allowed range, that is, whether a $<(\Delta\lambda/\Delta\text{FAF})<b$ (for example, a=0.8, b=1.2). If the ratio between the amplitude $\Delta\lambda$ and the amplitude $\Delta$FAF is within the predetermined allowed region, Step 1218 makes an affirmative determination, that is, it is determined that no abnormal amplitude deviation has occurred. The CPU 42 then proceeds to Step 1222. If Step 1218 makes a negative determination, that is, it is determined that an abnormal amplitude deviation has occurred, then the CPU 42 proceeds to Step 1219.

The affirmative determination in Step 1218 means that no abnormality has occurred in the period, the phase deviation nor the amplitude deviation. Thus, the CPU 42 clears an abnormality determination flag XDGAF to "0" in Step 1222 and then ends this routine.

If an abnormality is detected in any of the period, the phase deviation and the amplitude deviation, the CPU 42 increments an abnormality determination counter CDG2 by 1 in Step 1219 and then determines in Step 1220 whether the abnormality determination counter CDG2 exceeds a predetermined criterion KX2. If CDG2$\leq$KX2, the CPU 42 proceeds to Step 1222 to clear the abnormality determination flag XDGAF to "0". If CDG2>KX2, the CPU 42 proceeds to Step 1221 to set the abnormality determination flag XDGAF to "1". Together with the setting operation for the abnormality determination flag XDGAF, the CPU 42 performs procedures for diagnosis, such as the turning on of the warning light 49 or the stopping of the air-fuel ratio feedback. As described above, the first diagnosis routine as illustrated in FIGS. 17A and 17B easily detects various forms of abnormalities as indicated in FIGS. 15B–15E.

The procedure of calculating the period $S\lambda$ of the air-fuel ratio $\lambda$ and the period of SFAF of the air-fuel ratio correction coefficient FAF read by the CPU 42 in Steps 1204 and 1205 will be described with reference to the flowcharts shown in FIGS. 19 and 20.

Figure 19:
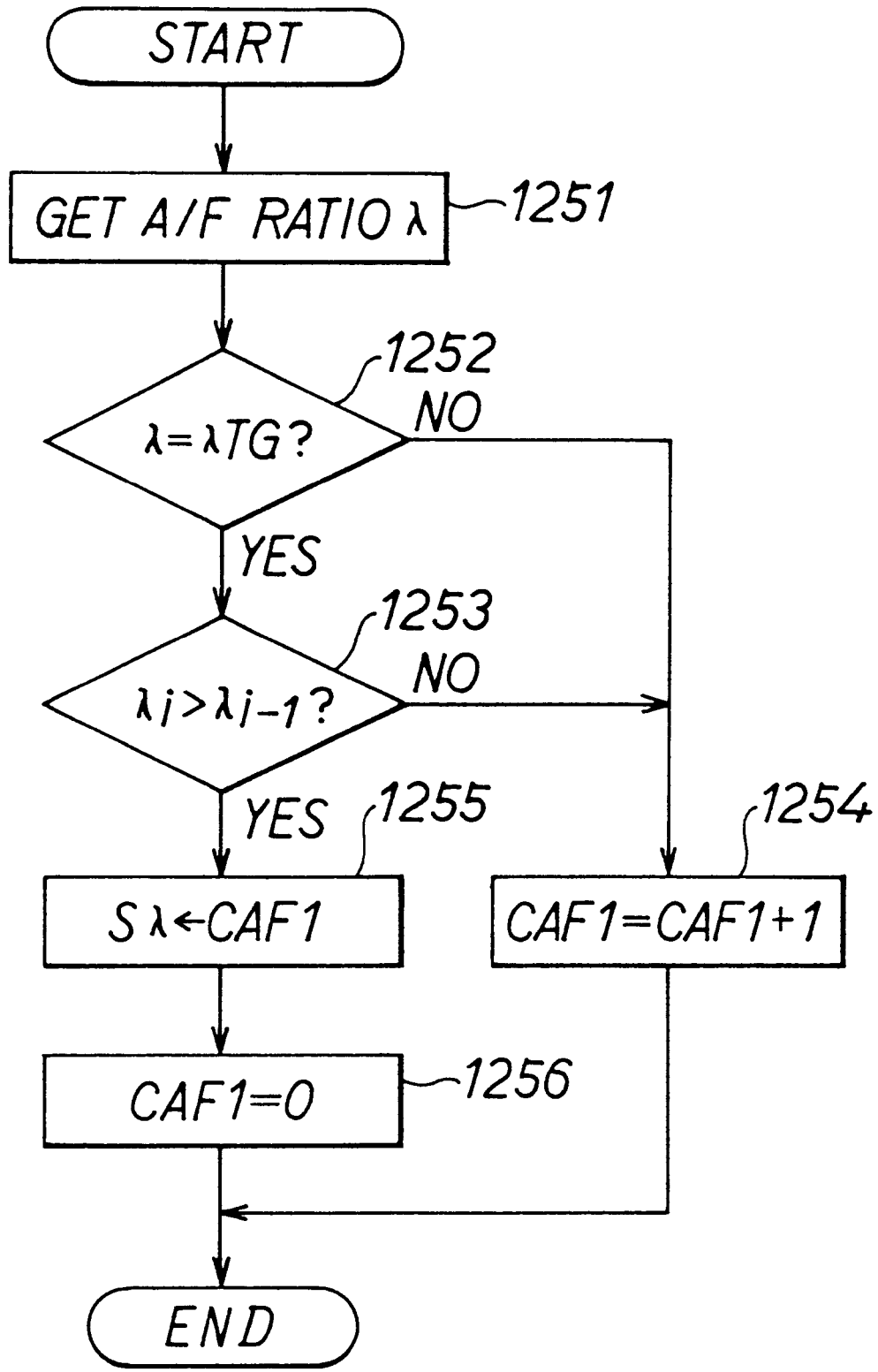
FIG. 19 is a flowchart illustrating a routine for calculating the oscillation period of air-fuel ratio.

In Step 1251 in FIG. 19, the CPU 42 reads in the air-fuel ratio $\lambda$ calculated on the basis of the detection by the air-fuel ratio sensor 26. The CPU then determines in Step 1252 whether the air-fuel ratio $\lambda$ corresponds to the target air-fuel ratio $\lambda$TG ($\lambda$TG=1.0). Further, Step 1253 determines whether the present air-fuel ratio $\lambda$i exceeds the previous air-fuel ratio $\lambda$i−1, that is, whether $\lambda$i>$\lambda$i−1. If either Step 1252 or Step 1253 makes a negative determination, the CPU 42 proceeds to Step 1254 to increment a period counter CAF1 by 1.

If both Step 1252 and Step 1253 make an affirmative determination, the CPU 42 proceeds to Step 1255 to store the value of the period counter CAF1 as the period $S\lambda$ of the air-fuel ratio $\lambda$. Then, the CPU 42 clears the period counter CAF1 to "0" in Step 1256 and ends the routine. The period counter CAF1 operates as indicated in FIGS. 18D.

The period SFAF of the air-fuel ratio correction coefficient FAF is calculated by a procedure similar to that of FIG. 19. This procedure will be described with reference to FIG. 20.

Figure 20:
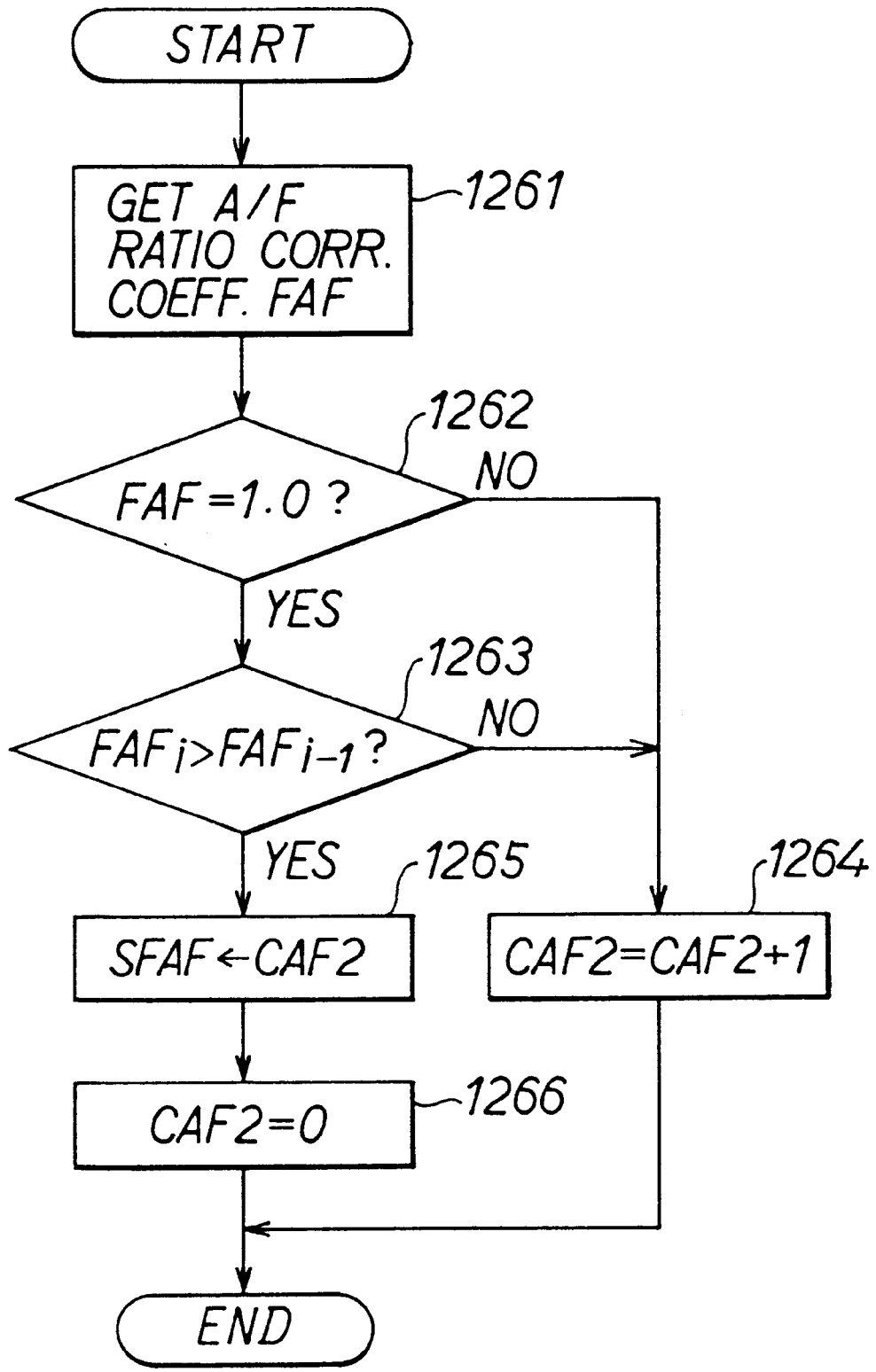
FIG. 20 is a flowchart illustrating a routine for calculating the oscillation period of air-fuel ratio correction coefficient.

In Step 1261 in FIG. 20, the CPU 42 reads in the air-fuel ratio correction coefficient FAF. The CPU then determines in Step 1262 whether the air-fuel ratio correction coefficient FAF$\lambda$ is 1.0. Further, Step 1263 determines whether FAFi>FAFi−1. If either Step 1262 or Step 1263 makes a negative determination, the CPU 42 proceeds to Step 1264 to increment a period counter CAF2 by 1.

If both Step 1262 and Step 1263 make an affirmative determination, the CPU 42 proceeds to Step 1265 to store the value of the period counter CAF2 as the period SFAF of the air-fuel ratio correction coefficient FAF. Then, the CPU 42 clears the period counter CAF2 to "0" in Step 1266 and ends the routine. The period counter CAF2 operates as indicated in FIGS. 18E.

The procedure of calculating the amplitude Δl of the air-fuel ratio λ and the amplitude ΔFAF of the air-fuel ratio correction coefficient FAF read by the CPU 42 in Steps 1216 and 1217 will be described with reference to the flowcharts shown in FIGS. 21 and 22.

Figure 21:
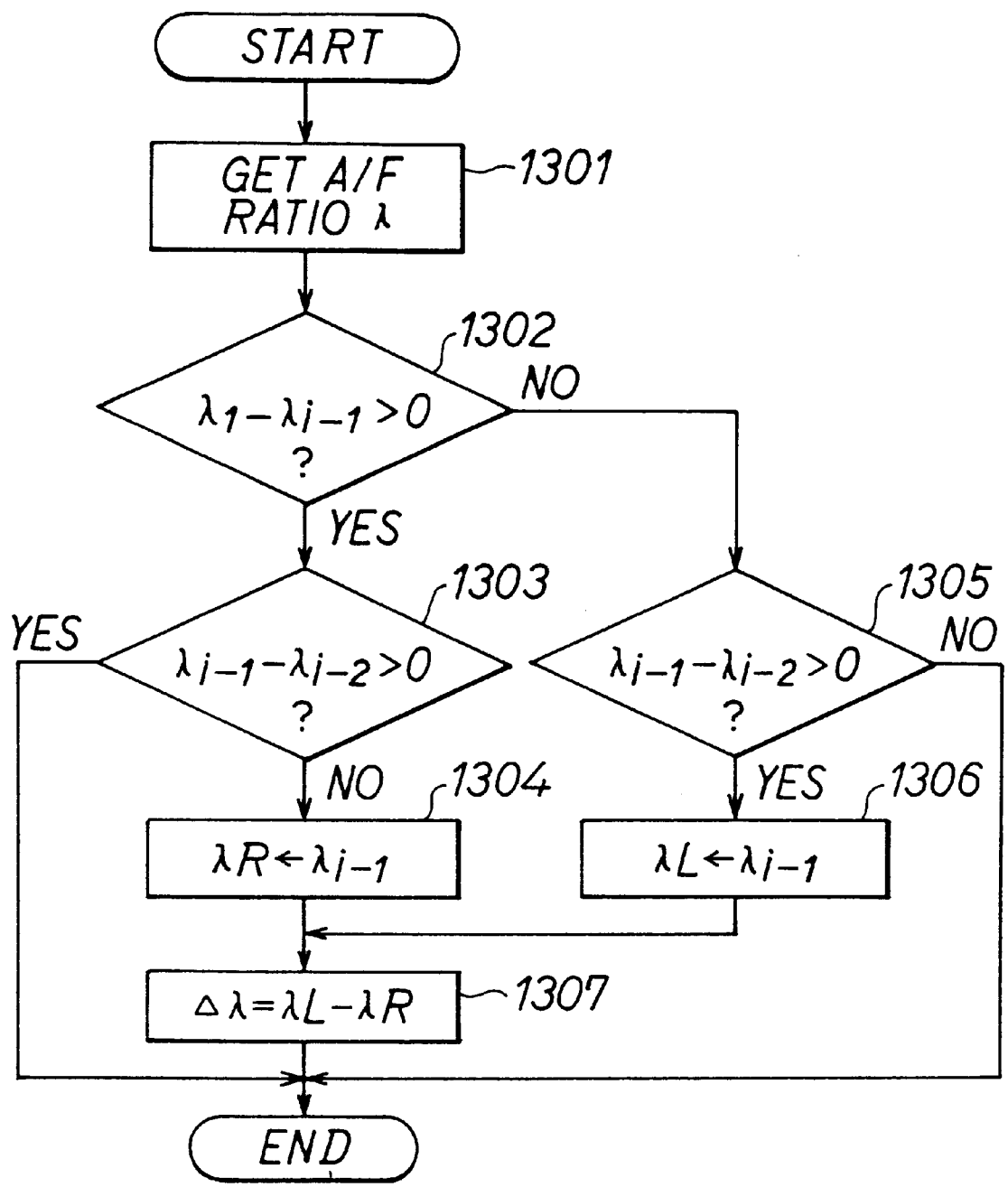
FIG. 21 is a flowchart illustrating a routine for calculating the amplitude of air-fuel ratio.
Figure 23A:
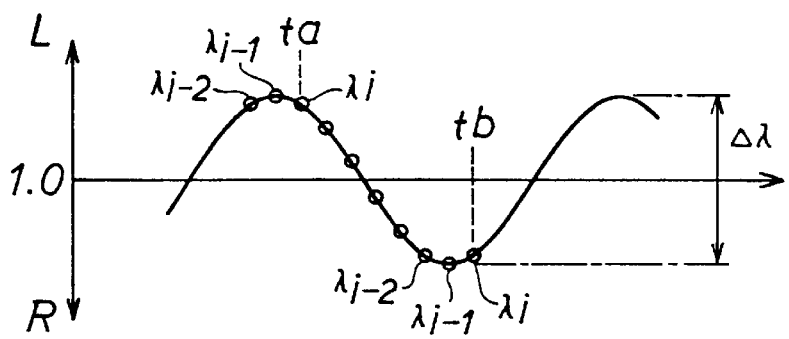
FIGS. 23A and 23B are timing charts for additional illustration of the operation shown in FIGS. 23 and 24.
Figure 23B:
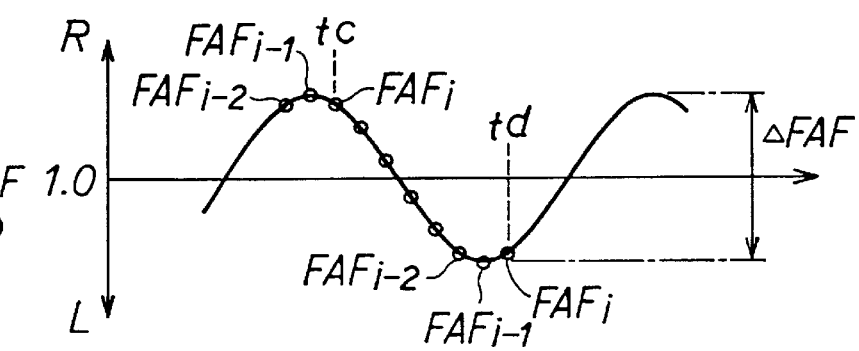

In Step 1301 in FIG. 21, the CPU 42 reads in the air-fuel ratio λ calculated on the basis of the detection by the air-fuel ratio sensor 26. The CPU 42 then determines in Step 1302 whether the value obtained by subtracting the last air-fuel ratio λi−1 from the present air-fuel ratio λi is positive, that is, whether λi−λi−1>0. If λi−λi−1>0, the CPU proceeds to Step 1303 to determine whether the value obtained by subtracting the air-fuel ratio λi−2 preceding the last reading from the last air-fuel ratio λi−1 is positive, that is, whether λi−1−λi−2>0. The combination of an affirmative determination in Step 1302 and a negative determination in Step 1303 means that the air-fuel ratio λ has passed the rich peak and reversed its direction of change. In this case, the CPU 42 stores the last air-fuel ratio λi−1 as the rich peak λR in Step 1304. That is, the serial procedure of Steps 1301, 1302, 1303 and 1304 determines the rich peak λR of the air-fuel ratio λ at a time point tb indicated in FIGS. 23A and 23B.

If Step 1302 determines that λi−λi−1≧0, the CPU 42 proceeds to Step 1305 to determine whether the value obtained by subtracting the air-fuel ratio λi−2 preceding the last reading from the last air-fuel ratio λi−1 is positive, that is, whether λi−1−λi−2>0. The combination of a negative determination in Step 1302 and an affirmative determination in 305 means that the air-fuel ratio λ has passed the lean peak and reversed its direction of change. In this case, the CPU 42 stores the last air-fuel ratio λi−1 as the lean peak λL in Step 1306. That is, the serial procedure of Steps 1301, 1302, 1305 and 1306 determines the lean peak λL of the air-fuel ratio λ at a time point ta indicated in FIGS. 23A and 23B.

Then, the CPU 42 subtracts the rich peak λR from the lean peak λL to determine the amplitude Δλ of the air-fuel ratio λ (Δλ=λL−λR) in Step 1307 and then ends the routine. The amplitude ΔFAF of the air-fuel ratio correction coefficient FAF is calculated by a procedure similar to that of FIG. 21. This procedure will be described with reference to FIG. 22.

Figure 22:
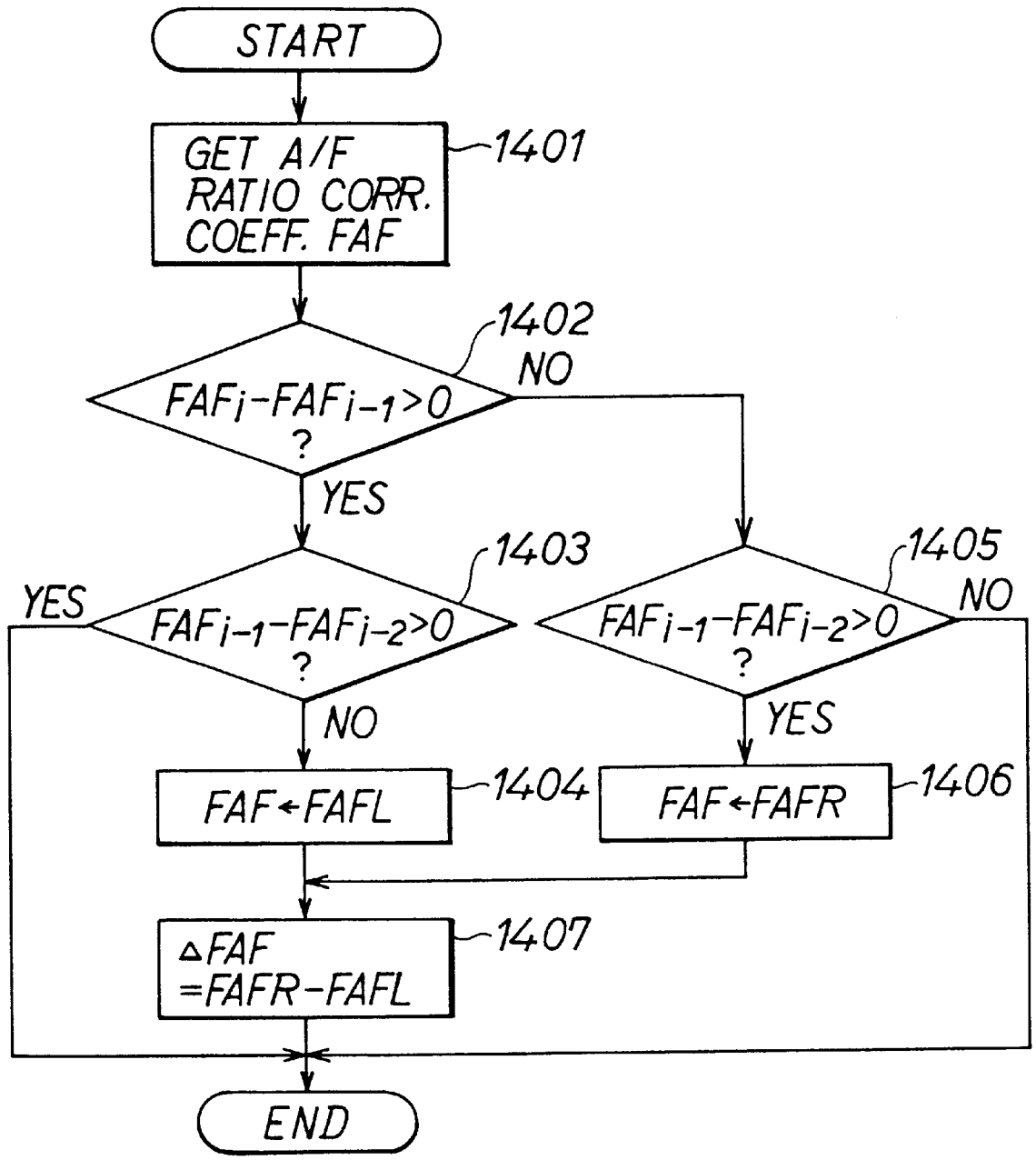
FIG. 22 is a flowchart illustrating a routine for calculating the amplitude of air-fuel ratio correction coefficient.

In Step 1401 in FIG. 22, the CPU 42 reads in the air-fuel ratio correction coefficient FAF. The CPU 42 then determines in Step 1402 whether FAFi−FAFi−1>0. If FAFi−FAFi−1>0, the CPU proceeds to Step 1403 to determine whether FAFi−1−FAFi−2>0. The combination of an affirmative determination in Step 1402 and a negative determination in Step 1403 means that the air-fuel ratio correction coefficient FAF has passed the lean peak and reversed its direction of change. In this case, the CPU 42 stores FAFi−1 as the lean peak FAFL in Step 1404. That is, the serial procedure of Steps 1401, 1402, 1403 and 1404 determines the lean peak FAFL of the air-fuel ratio correction coefficient FAF at a time point td indicated in FIGS. 23A and 23B.

If Step 1402 determines that FAFi−FAFi−1<0, the CPU 42 proceeds to Step 1405 to determine whether FAFi−1−FAFi−2>0. The combination of a negative determination in Step 1402 and an affirmative determination in 405 means that the air-fuel ratio correction coefficient FAF has passed the rich peak and reversed its direction of change. In this case, the CPU 42 stores FAFi−1 as the rich peak FAFR in Step 1406. That is, the serial procedure of Steps 1401, 1402, 1405 and 1406 determines the rich peak FAFR of the air-fuel ratio correction coefficient FAF at a time point tc indicated in FIGS. 25A and 25B.

Then, the CPU 42 subtracts the lean peak FAFL from the rich peak FAFR to determine the amplitude ΔFAF of the air-fuel ratio correction coefficient FAF (ΔFAF=FAFR−FAFL) in Step 1407 and ends the routine.

Figure 24:
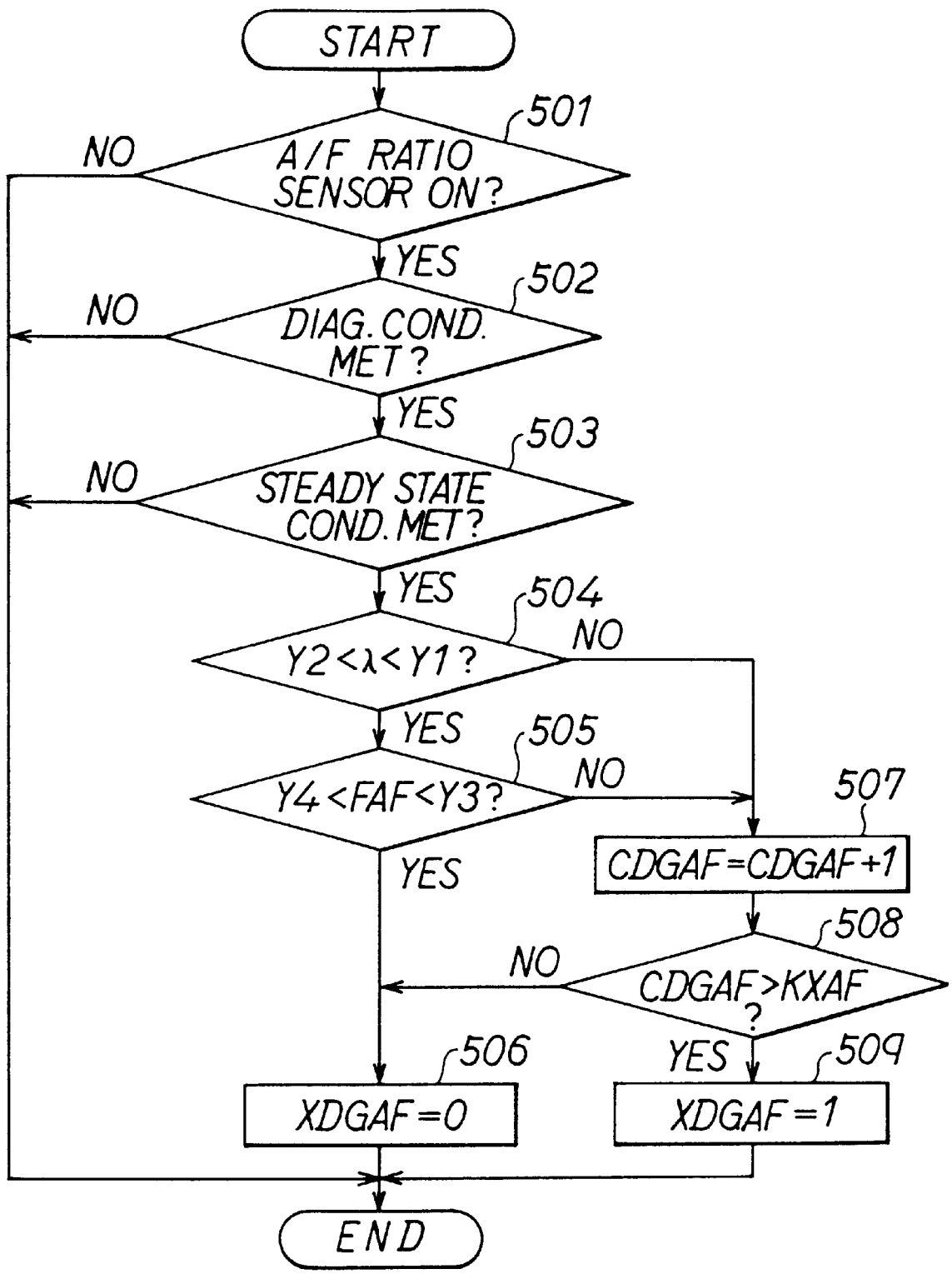
FIG. 24 is a flowchart illustrating a second sensor diagnosis routine.

The flowchart shown in FIG. 24 illustrates the second diagnosis routine executed by the CPU 42. This routine determines whether the form of abnormality as indicated in FIG. 15F or 15G has occurred. This routine is executed, for example, immediately after the routine shown in FIGS. 17A and 17B.

Referring to FIG. 24, the CPU 42 determines whether the preconditions for the diagnosis have been established in Steps 1501–1503. The determination regarding the preconditions corresponds to Steps 1201–1203 described above, and will not be described again.

If the preconditions have been met, the CPU 42 proceeds to Step 1504 to determine whether the air-fuel ratio λ calculated on the basis of the detection by the air-fuel ratio sensor 26 is within a predetermined allowed range (Y2-Y1 indicated in FIG. 15F). If Step 1504 makes affirmative determination, the CPU 42 determines in Step 1505 whether the air-fuel ratio correction coefficient FAF is within a predetermined allowed range (Y3-Y4 indicated in FIG. 15G). If both Step 1504 and Step 1505 make an affirmative determination, the CPU 42 proceeds to Step 1506 to clear the abnormality determination flag XDGAF to "0", and then ends the routine.

If either Step 1504 or Step 1505 makes a negative determination, the CPU 42 proceeds to Step 1507 to increment the abnormality determination counter CDGAF by 1. In the case where the abnormality determination counter CDGAF exceeds a predetermined criterion KXAF (Yes in Step 1508), the CPU 42 proceeds to Step 1509 to set the abnormality determination flag XDGAF to "1".

As described above, this embodiment readily performs sensor diagnosis by making determination separately for various forms of abnormality of the air-fuel ratio sensor 26, thus improving the control precision of the air-fuel ratio control system. In addition, since this embodiment permits a diagnosis operation only upon a precondition that a predetermined length of time has elapsed following the start of the air-fuel ratio feedback (Step 1202 in FIG. 17A), the diagnosis is performed when symptoms of abnormality are likely to be distinguished. Thus, highly reliable diagnosis is made possible.

Although this embodiment performs the first and second sensor diagnosis routines with respect to the four types of abnormalities, diagnosis routines may be provided separately for each of the types of abnormalities (indicated in FIGS. 15B–15G). In this case, it is also possible to provide the individual routines with different operating cycles in accordance with the priority or incidence of the corresponding forms of abnormalities.

Fifth Embodiment

A fifth embodiment in which the diagnosis procedure for the phase deviation abnormality is modified will be described. The flowchart shown in FIG. 25 illustrates a diagnosis routine according to the fifth embodiment.

Figure 25:
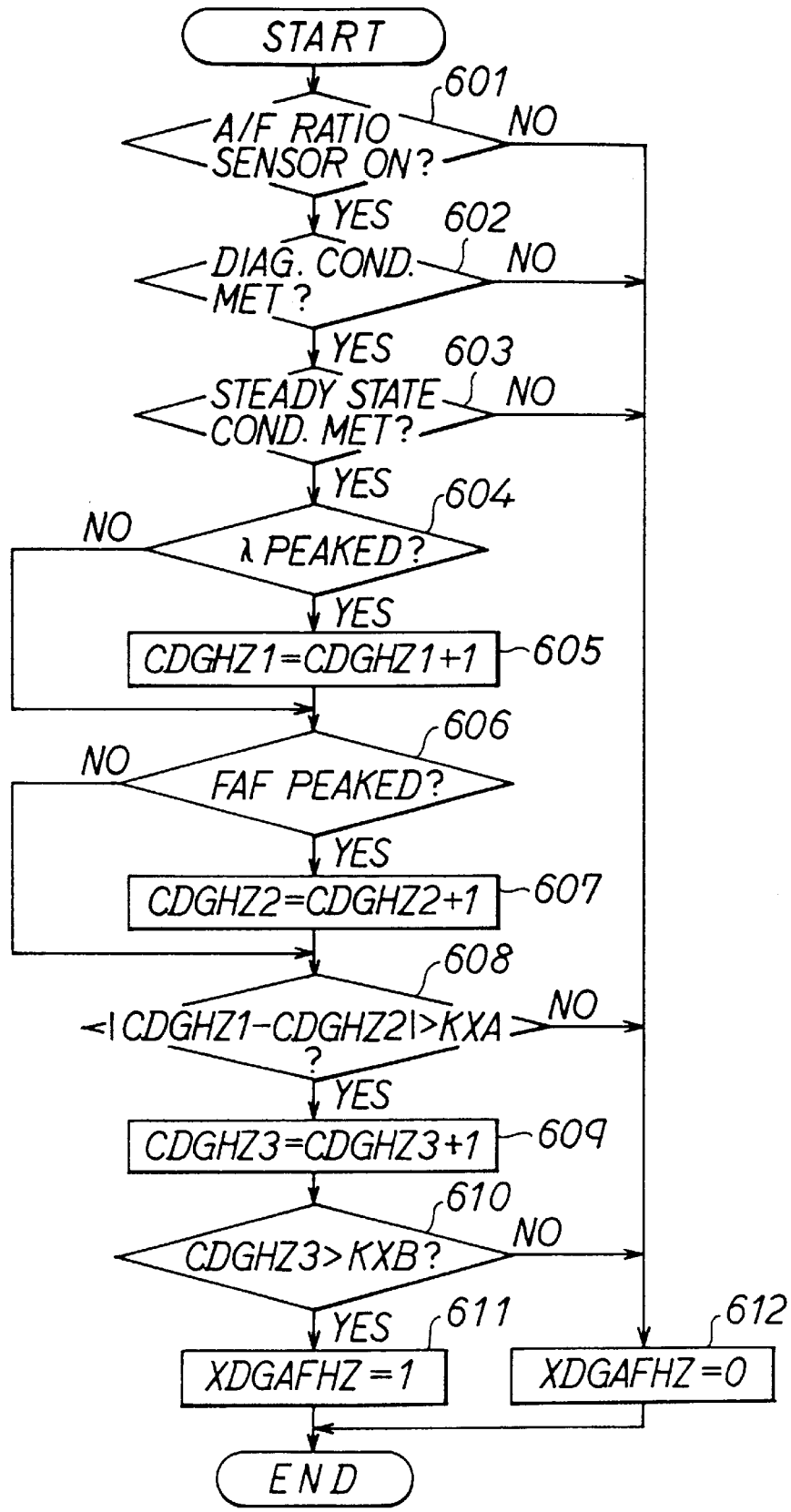
FIG. 25 is ga flowchart illustrating a sensor diagnosis routine according to the second embodiment.

Referring to FIG. 25, the CPU 42 determines whether the preconditions for the diagnosis have been established in Steps 601–603. The determination regarding the preconditions corresponds to Steps 1201–1203 described above, and will not be described again.

If the preconditions have been met, the CPU 42 proceeds to Step 604 to determine whether the air-fuel ratio λ has reached a peak value (either the lean peak or the rich peak). If the air-fuel ratio λ has reached a peak value, the CPU 42 increments a counter CDGHZ1 by 1. More specifically, the determination in Step 604 is based on the difference between the present value of the air-fuel ratio λ and the last value and the difference between the last value and the value preceding the last value as described with the flowchart shown in FIG. 21 (see the timing charts of FIGS. 23A and 23B).

Then, the CPU 42 determines in Step 606 whether the air-fuel ratio correction coefficient FAF has reached a peak value (either the rich peak or the lean peak). If the air-fuel ratio correction coefficient FAF has reached a peak value, the CPU 42 increments a counter CDGHZ2 by 1. The determination in Step 606 is based on the difference between the present value of the air-fuel ratio correction coefficient FAF and the last value and the difference between the last value and the value preceding the last value as described with the flowchart shown in FIG. 21 (see the timing charts of FIGS. 25A and 25B).

Subsequently, the CPU 42 determines in Step 608 whether the difference between the counters CDGHZ1 and CDGHZ2 exceeds a predetermined criterion KXA. If |CDGHZ1−CDGHZ2|≧KXA, then the CPU 42 determines that no abnormal phase deviation has occurred and proceeds to Step 612 to clear an abnormality determination flag XDGAFHZ to "0". If |CDGHZ1−CDGHZ2|>KXA, then the CPU 42 determines that an abnormal phase deviation has occurred, and proceeds to Step 609 to increment an abnormality determination counter CDGHZ3 by 1. In the case where the abnormality determination counter CDGHZ3 exceeds a predetermined criterion KXB (Yes in Step 610), that is, where an abnormality of the sensor 26 has been determined a predetermined number of times or more, the CPU 42 determines that an abnormality has definitely occurred in the air-fuel ratio sensor 26. The CPU 42 then proceeds to Step 611 to set the abnormality determination flag XDGAFHZ to "1".

As described above, this embodiment executes precise diagnosis even if the amplitude center of the air-fuel ratio λ (i.e., the output from the sensor 26) or the air-fuel ratio correction coefficient FAF shifts to the lean or rich side to a large extent. In a lean burn engine wherein combustion is conducted in the lean region, the amplitude center of the output from the air-fuel ratio sensor 26 shifts to the lean side to a large extent. In addition, if the result of learning of the air-fuel ratio is reflected in the air-fuel ratio control, the amplitude center of the air-fuel ratio correction coefficient FAF is shifted from the reference value (1.0). In these cases, the phase of the output from the sensor 26 and/or the air-fuel ratio correction coefficient FAF can be precisely determined without being affected by the lean burn or the air-fuel ratio learning by calculating the phase based on the interval between the peaks. Thus, this embodiment performs appropriate diagnosis operations.

Sixth Embodiment

Figure 26:
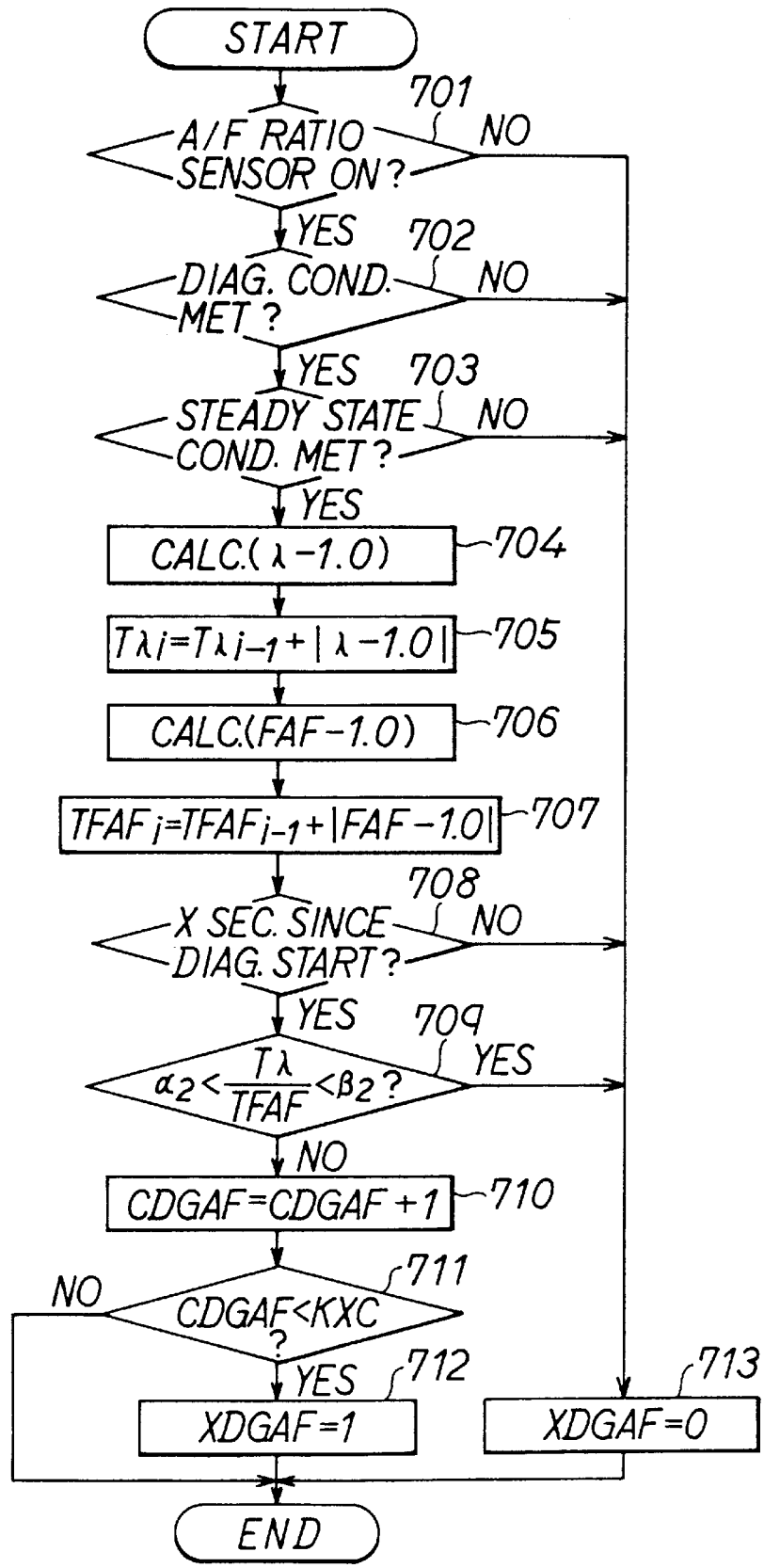
FIG. 26 is a flowchart illustrating a sensor diagnosis routine according to the third embodiment of the present invention.

A sixth embodiment of the present invention will be described below. The flowchart shown in FIG. 26 illustrates a sensor diagnosis routine according to the sixth embodiment. According to this embodiment, the CPU 42 provided in the ECU 41 constitutes first deviation accumulating means and second deviation accumulating means as recited in the appended claims.

Referring to FIG. 26, the CPU 42 determines whether the preconditions for the diagnosis have been established in Steps 701–703. The determination regarding the preconditions corresponds to Steps 1201–1203 described above, and will not be described again. If the preconditions have been met, the CPU 42 proceeds to Step 704 to determine the difference between the air-fuel ratio λ and the target air-fuel ratio (=1.0 according to this embodiment), and in Step 705 calculates an accumulation Tλ by successively accumulating the difference between the air-fuel ratio λ and the target air-fuel ratio (Tλi=Tλi−1+|−1.0|). The CPU 42 then calculates a difference |FAF−1.0| in Step 706, and calculates an accumulation TFAF by successively accumulating the difference |FAF−1.0| (TFAF=TFAFi−1+|FAF−1.0|).

Subsequently, the CPU 42 determines in Step 708 whether a duration of x seconds has elapsed following the starting of the diagnosis. If the duration of x seconds has elapsed, Step 709 calculates the ratio between the accumulation Tλ and the accumulation TFAF, and determines whether the ratio is within a predetermined allowed range (α2–α3) (for example, α2=0.8, β2=1.2). If Step 709 makes an affirmative determination, which means that no sensor abnormality has occurred, the CPU 42 proceeds to Step 713 to clear the abnormality determination flag XDGAF to "0".

If Step 709 makes a negative determination, which means that a sensor abnormality has occurred, the CPU 42 proceeds to Step 710 to increment the abnormality counter CDGAF by 1. In the case where the abnormality counter CDGAF exceeds a predetermined criterion KXC (YES in Step 711), the CPU 42 sets the abnormality determination flag XDGAF to "1".

Figure 27A:
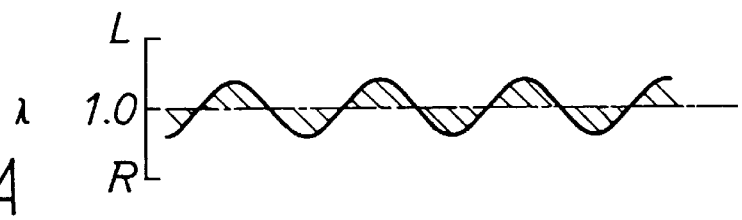
FIGS. 27A and 27B are timing chart for additional illustration of the operation shown in FIG. 26.
Figure 27B:
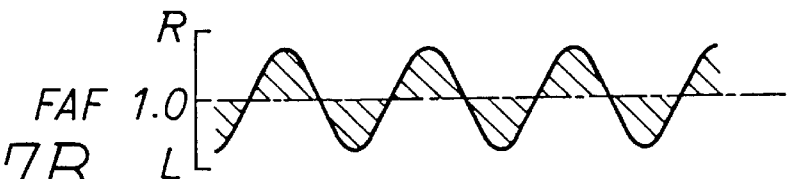

This embodiment performs diagnosis, as indicated in FIGS. 27A and 27B, in accordance with the ratio between the total of the amplitudes of the air-fuel ratio λ (the shadowed area) and the total of the amplitudes of the air-fuel ratio correction coefficient FAF (the shadowed area); that is, the ratio of the integrals of the two curves. In the amplitude abnormality indicated in FIG. 27B, Tλ/TFAF<α2 is established and, therefore, the occurrence of an abnormality is determined.

As described above, this embodiment determines the occurrence of an amplitude abnormality by accumulating the differences between the air-fuel ratio λ and the target air-fuel ratio λTG and the differences between the air-fuel ratio correction coefficient FAF and the reference value (=1.0), respectively, and comparing the accumulated values. The diagnosis based on the accumulations makes it possible to perform a diagnosis that is hardly affected by external disturbances, such as temporary fluctuations of the sensor output or correction coefficients.

Seventh Embodiment

A seventh embodiment comprising a routine for performing diagnosis based on the deviation in phase of the air-fuel ratio λ from the air-fuel ratio correction coefficient FAF as well as the sensor diagnosis routine according to the seventh embodiment will be described below.

Figure 28A:
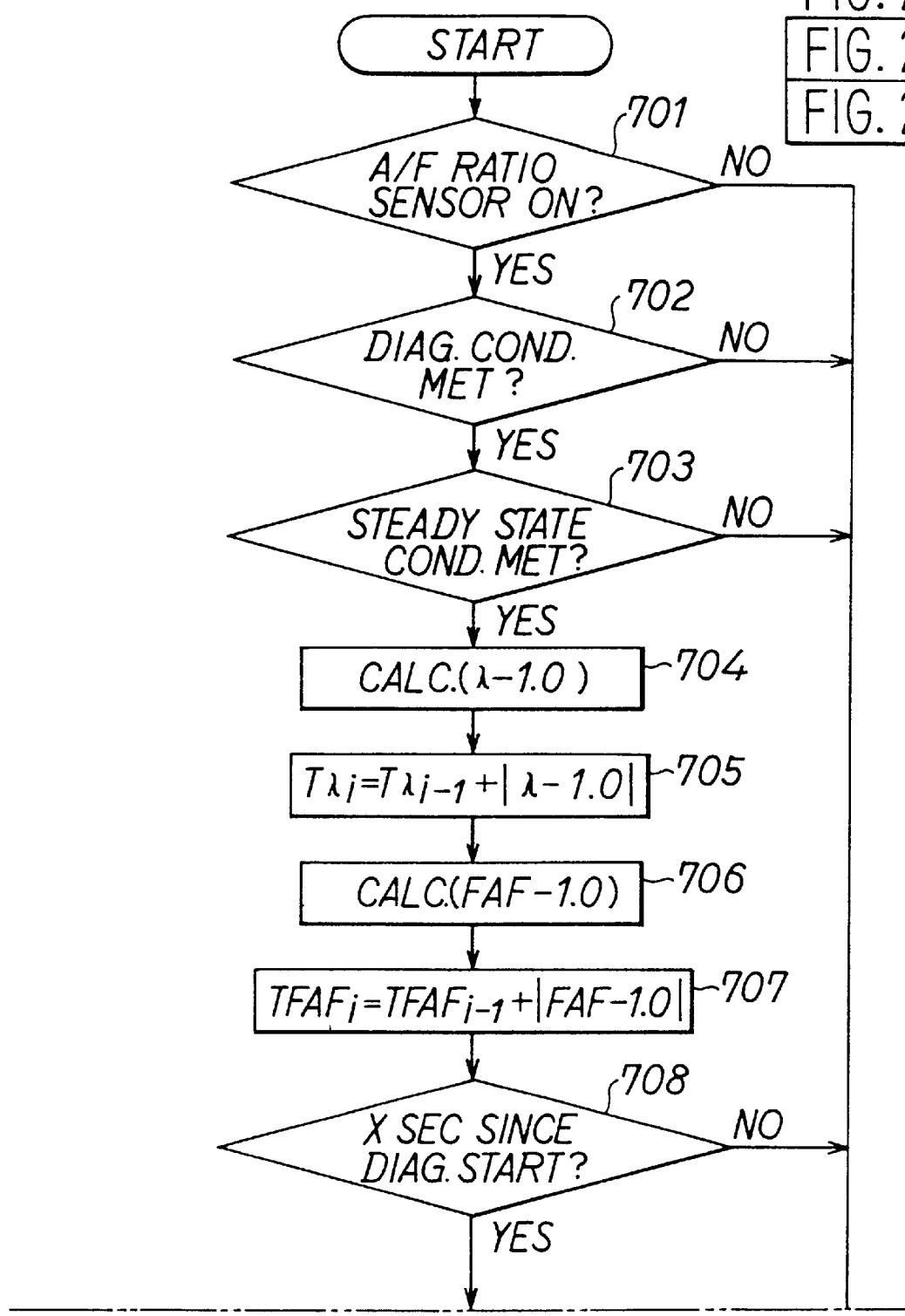
Figure 28B:
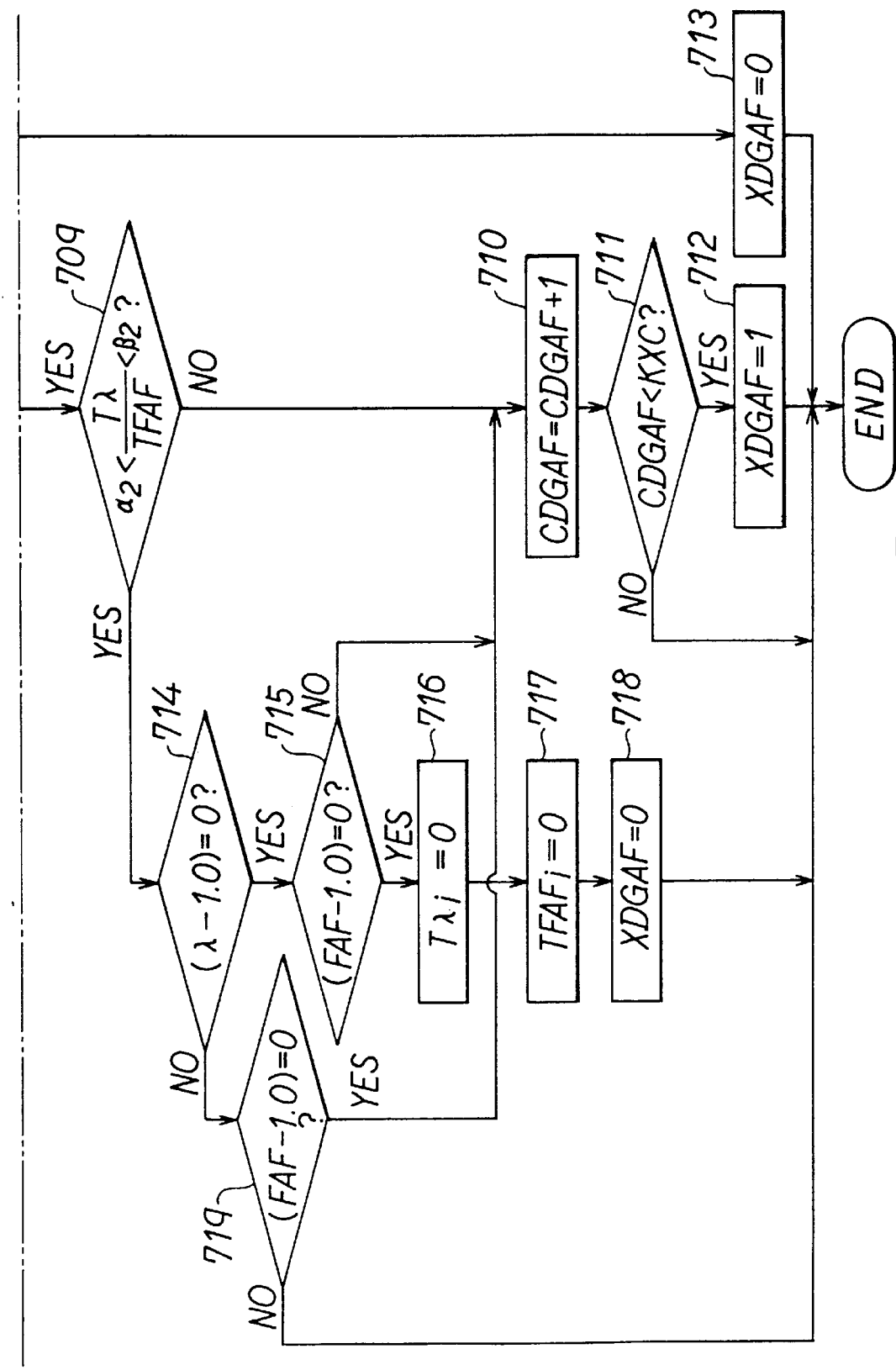

FIGS. 28A and 28B show a flowchart illustrating the phase deviation determining routine that is added to the flowchart shown in FIG. 26. According to this embodiment, deviation in phase is detected by a routine simplified from the phase deviation determining routine according to the fourth embodiment. This simplified routine will be described with reference to the flowchart of FIG. 28A and 28B.

If the operation proceeds to Step 709 and Step 709 makes affirmative determination, the CPU 42 proceeds to Step 714 to determine whether the air-fuel ratio $\lambda$ is the theoretical air-fuel ratio. If the air-fuel ratio $\lambda$ is the theoretical air-fuel ratio, the CPU 42 proceeds to Step 715 to determine whether the air-fuel ratio correction coefficient FAF indicates the theoretical air-fuel ratio (i.e., whether FAF is 1.0). If Step 715 makes an affirmative determination, it is determined that no phase deviation has occurred and that the air-fuel ratio sensor 26 is normal. Then, Step 716 clears the accumulation T$\lambda$i of the air-fuel ratio $\lambda$. Step 717 then clears the accumulation TFAFi of the air-fuel ratio correction coefficients FAF. Finally, Step 718 resets the abnormality determination flag XDGAF to "0", and the routine ends.

On the other hand, if Step 714 makes a negative determination, the CPU 42 proceeds to Step 719 to determine whether the air-fuel ratio correction coefficient FAF indicates the theoretical air-fuel ratio (whether FAF is 1.0) as in Step 715. If Step 719 makes a negative determination, it is impossible to determine whether a phase deviation has occurred, and therefore the CPU 42 ends the routine. If Step 719 makes an affirmative determination, it is determined that a phase deviation has occurred, and the CPU 42 executes the procedure from Step 710 to the end. If Step 715 makes a negative determination, it is determined that a phase deviation has occurred, and the CPU 42 executes the procedure from Step 710 to the end.

The procedure in step 714, Step 715 or Step 719 makes a determination based on whether the air-fuel ratio $\lambda$ is the theoretical air-fuel ratio or whether the air-fuel ratio correction coefficient FAF indicates the theoretical air-fuel ratio according to this embodiment. However, considering the response delay by the processing of sensor signals, some latitude may be allowed. For example, although Step 714 determines whether the air-fuel ratio indicates or corresponds to the theoretical air-fuel ratio on the basis of whether $\lambda-1.0=0$, this determination may be based on whether $-0.025 \geq (\lambda-1) \geq 0.025$. Such latitude may also be allowed for Steps 715 and 719.

Eighth Embodiment

Figure 29:
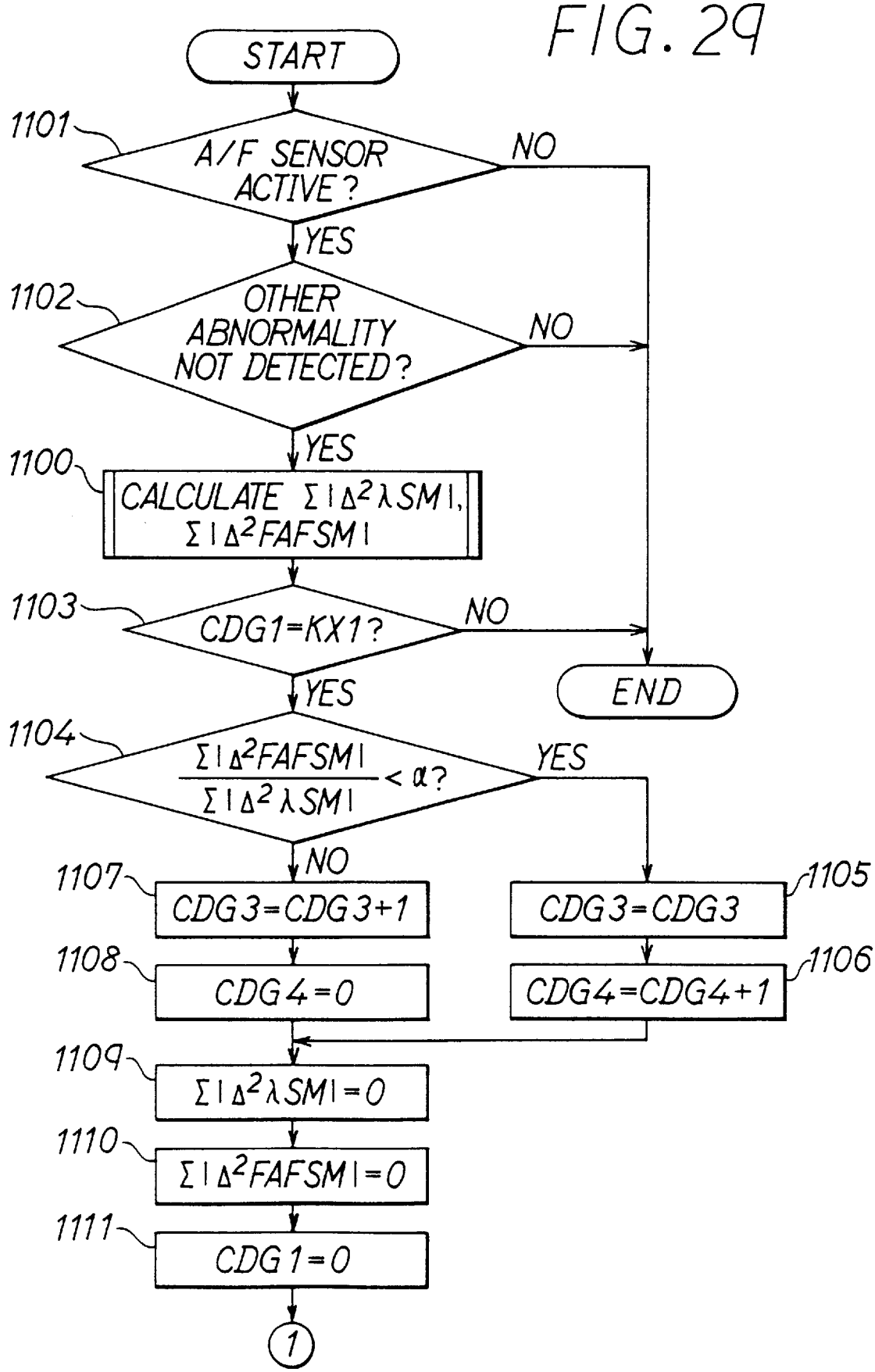
FIGS. 29 and 30 are a flowchart showing a sensor abnormality diagnosing routine in an eighth embodiment.

An eighth preferred embodiment of the present invention will now be described in connection with FIGS. 29–36. In FIG. 29, When the routine is started, the CPU 42 determines at Step 1101 the activity state of the A/F sensor 26. Specifically, it is decided that the A/F sensor 26 is activated if the element temperature of the A/F sensor 26 (i.e., the temperature of the sensor body 32) is not lower than 650° C. or the element resistance of the A/F sensor 26 is not higher than 90Ω. The CPU 42 decides at Step 1102 whether or not an abnormality other than that of the A/F sensor 26 is detected. This decision is executed to ensure that another abnormality will not influence the abnormality diagnosis of the A/F sensor 26.

Next, the process calculates accumulated values $\Sigma|\Delta^2\lambda SM|$ and $\Sigma|\Delta^2 FAFSM|$ in Step 1600, as will be described in greater detail below. Then, the CPU 42 decides at Step 1103 whether or not an accumulated time counter CDG1 reaches a predetermined value KX1 (i.e., a numerical value corresponding to an accumulated time period of 30 seconds in the present embodiment). The CPU 42 ends the present routine as it is if CDG1≠KX1, and proceeds to Step 1104 if CDG1=KX1. The CPU 42 compares and decides at Step 1104 an abnormality diagnosing parameter, i.e., the ratio between accumulated values $\Sigma|\Delta^2\lambda SM|$ and $\Sigma|\Delta^2 FAFSM|$ and a predetermined abnormality deciding value $\alpha$. Specifically, it is decided whether or not Inequality (10) is satisfied:

$$\Sigma|\Delta^2 FAFSM|/\Sigma|\Delta^2\lambda SM|<\alpha \tag{10}$$

Figure 33:
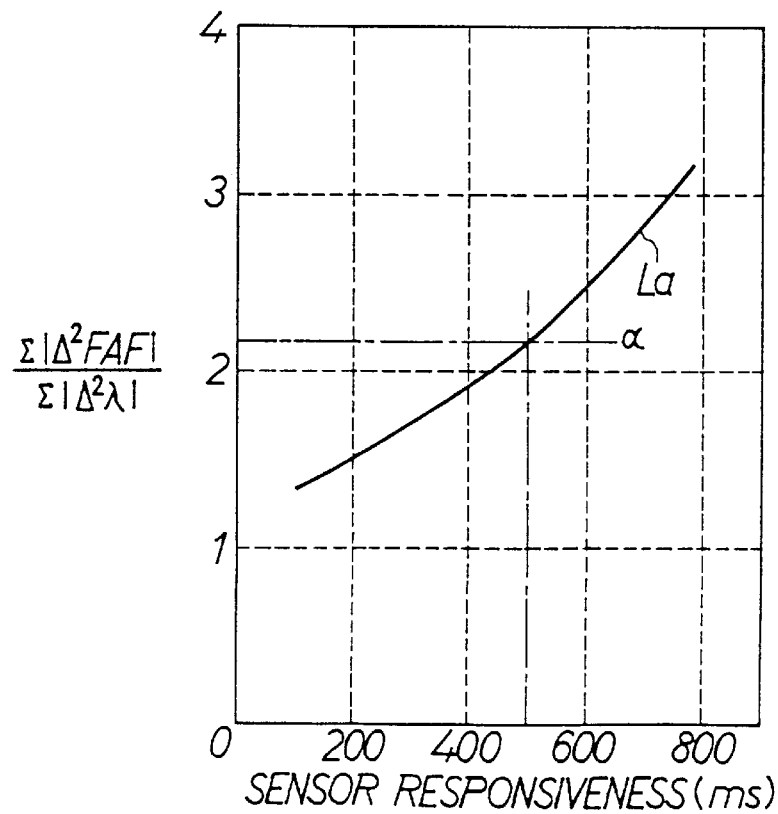
FIG. 33 is a graph showing a correlation between an abnormality diagnosing parameter and sensor responsiveness in the eighth embodiment.
Figure 34:
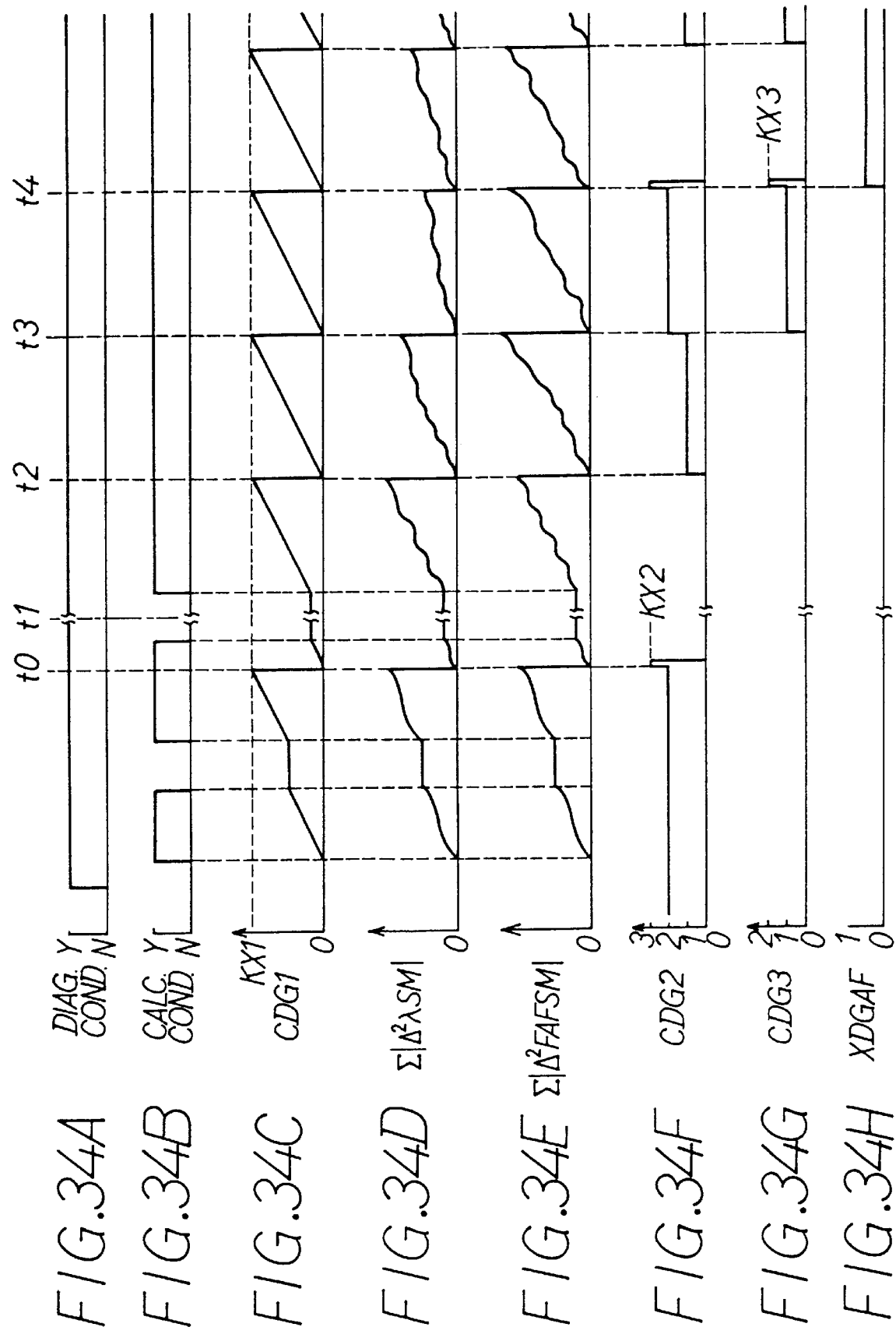
FIGS. 34A–34H are graphs showing the operations of the abnormality diagnosis.

Satisfying this inequality means that the air/fuel ratio $\lambda$ and the FAF value change at satisfactory changing rates while correlating to each other, and corresponds to the retention of the responsiveness of the A/F sensor 26, for example. Here, FIG. 33 shows a characteristic curve La showing the relation the sensor responsiveness and the abnormality diagnosing parameter "$(\Sigma|\Delta^2 FAF|)/(\Sigma|\Delta^2\lambda|)$" (wherein $\Sigma|\Delta^2 FAF|$ and $\Sigma|\Delta^2|$ conveniently show the parameter values left unrounded). When the reference for deciding the propriety of the sensor responsiveness is exemplified by 500 ms, as shown in FIG. 33, the abnormality deciding value $\alpha$ is set along the characteristic curve La. According to this characteristic curve La of FIG. 33, the numerical value of "$(\Sigma|\Delta^2 FAF|)/(\Sigma|\Delta^2\lambda|)$" becomes larger for worse sensor responsiveness so that the abnormality diagnosing parameter, as shown on the ordinate of FIG. 33, reflects the sensor responsiveness better for deciding the sensor abnormality conveniently.

As shown in Inequality (11) below, if can be determined from the above that the A/F sensor 26 is normal if $$\Sigma|\Delta^2 FAFSM|/\Sigma|\Delta^2\lambda SM|<\alpha \tag{11}$$

and that the A/F sensor 26 is abnormal if, as shown in Inequality (12), $$\Sigma|\Delta^2 FAFSM|/\Sigma|\Delta^2\lambda SM|\leq\alpha \tag{12}$$

If the answer in Step 1104 of FIG. 29 is YES, the CPU 42 determines that the sensor is normal and proceeds to Step 1105. If the answer in Step 1104 is NO, the CPU 42 determines that the sensor is abnormal and proceeds to Step 1107. At Step 1105, the CPU 42 holds an abnormality deciding counter CDG3 and increments at Step 1106 a continuous normality deciding counter CDG4 by "1". At Step 1107, on the other hand, the CPU 42 increments the abnormality deciding counter CDG3 by "1" and clears at Step 1108 the continuous normality deciding counter CDG4 to "0".

Then, the CPU 42 clears at Step 1109 the accumulated value $\Sigma|\Delta^2\lambda SM|$ and clears at Step 1110 $\Sigma|\Delta^2 FAFSM|$ to "0". The CPU 42 clears the accumulated time counter CDG1 to "0".

Figure 30:
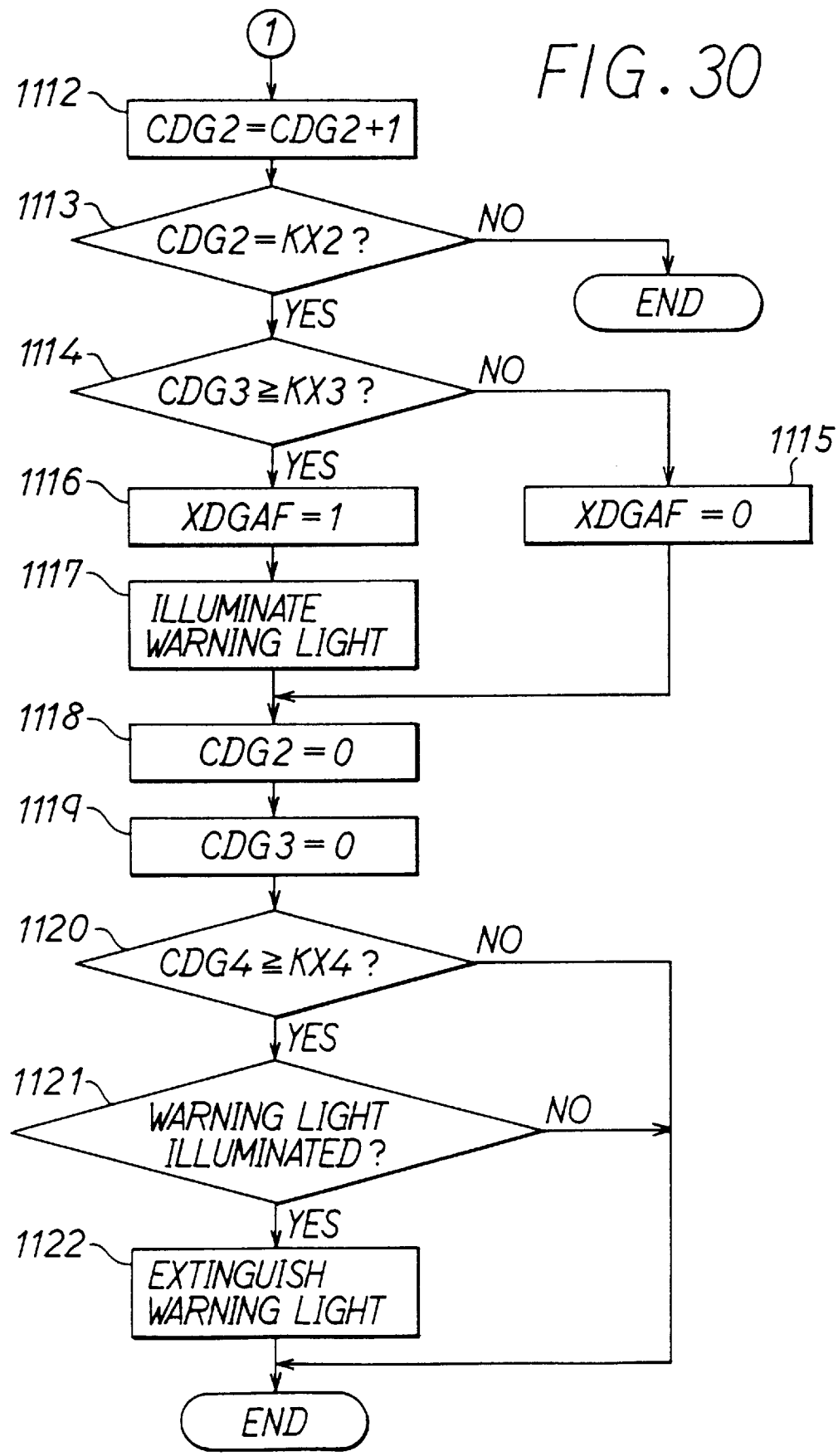

Then, the CPU 42 proceeds to Step 1112 of FIG. 30 to increment an abnormality diagnosis executing counter CDG2 by "1" and to Step 1113 to decide whether or not the abnormality diagnosis executing counter CDG2 reaches a predetermined value KX2 (e.g., KX2=3 in the present embodiment). In this case, the CPU 42 ends the present routine as it is if CDG2≠KX2, and proceeds to Step 1114 if CDG2=KX2 to decide whether or not the abnormality deciding counter CDG3 at this time is no less than a predetermined value KX3 (e.g., KX3=2 in the present embodiment).

The operation of this Step 1114 corresponds substantially to the decision on the occurrence of the abnormality. If CDG3<KX3, the CPU 42 proceeds to Step 1115 to clear an abnormality decision flag XDGAF to "0". This abnormality decision flag XDGAF is operated by the final decision of the occurrence of the abnormality and indicates no occurrence of abnormality for XDGAF=0 and the occurrence of abnormality for XDGAF=1.

If CDG3>KX3 at Step 1114, on the other hand, the CPU 42 proceeds to Step 1116 to set the abnormality decision flag XDGAF to "1". In accordance with this flag operation, the CPU 42 turns on a warning light 49 at Step 1117. Incidentally, at this abnormality deciding time, a diagnosis may be executed to stop the air/fuel ratio feedback control in addition to the turning on of the warning light 49.

Then, the CPU 42 clears at Steps 1118 and 1119 both the abnormality diagnosis executing counter CDG2 and the abnormality deciding counter CDG3 to "0".

Then, the CPU 42 decides at Step 1120 whether or not the continuous normality deciding counter CDG4 is no less than a predetermined value KX4 (e.g., KX4=4 in the present embodiment), and at Step 1121 whether or not the warning light 49 is now on, that is, whether or not the abnormality decision flag XDGAF is set. If the answer in Step 1120 or 1121 is NO, the CPU 42 ends the present routine as it is. If both the answers of Steps 1120 and 1121 are YES, the CPU 42 proceeds to Step 1122 to turn off the warning light 49, and then ends the present routine. Simultaneously with this, the abnormality decision flag XDGAF is cleared to "0".

The aforementioned operations of Steps 1120 to 1122 are executed to notify that the abnormality of the A/F sensor 26 temporarily occurs and that the abnormal state is avoided. These operations are re-executed if the air/fuel ratio feedback control is stopped at the abnormality diagnosing time.

Figure 31:
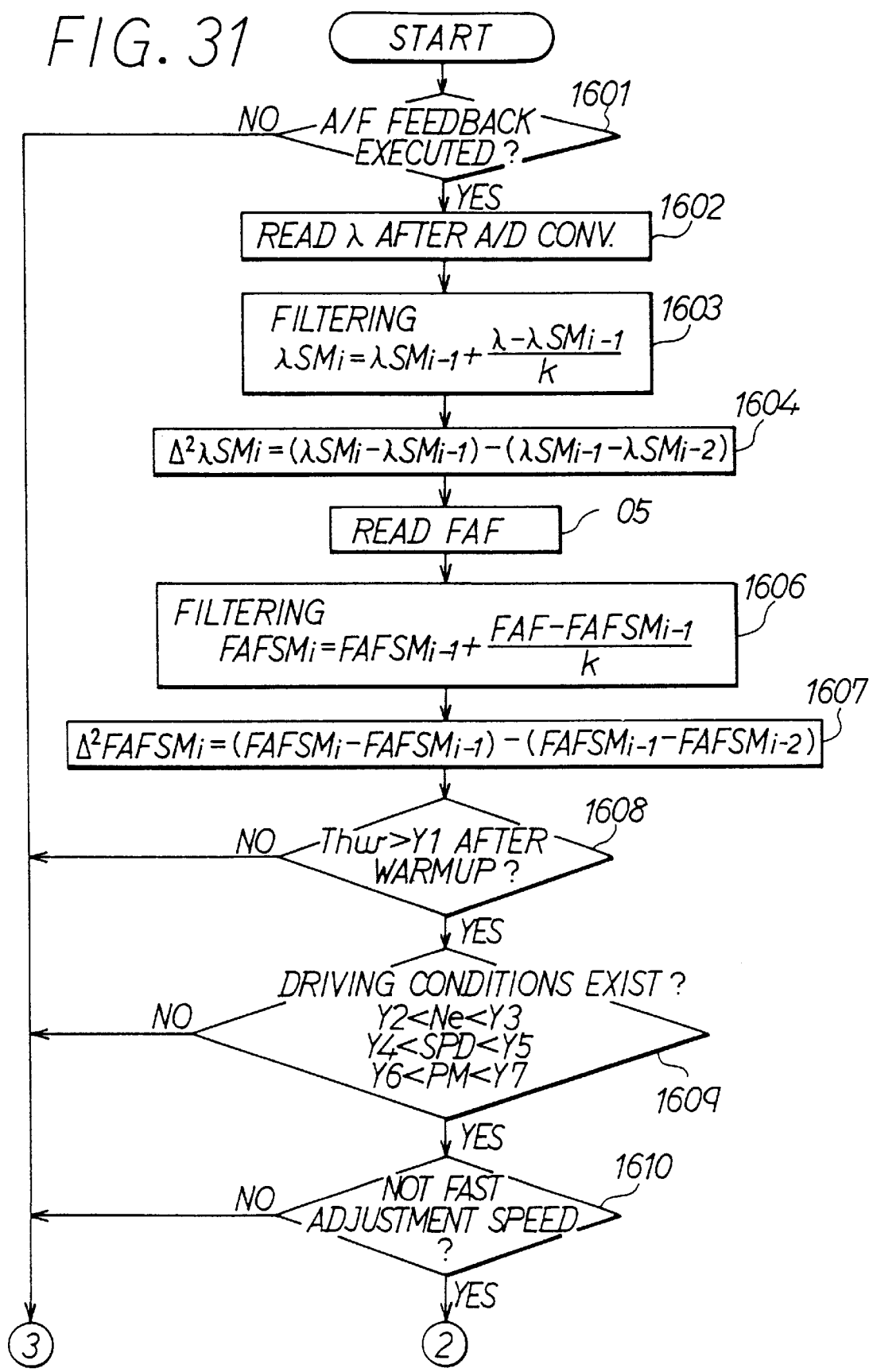
FIGS. 31 and 32 are a flowchart showing a routine for calculating accumulated values $\Sigma|\Delta^2\lambda SM|$ and $\Sigma|\Delta^2 FAFSM|$ in the eighth embodiment.
Figure 32:
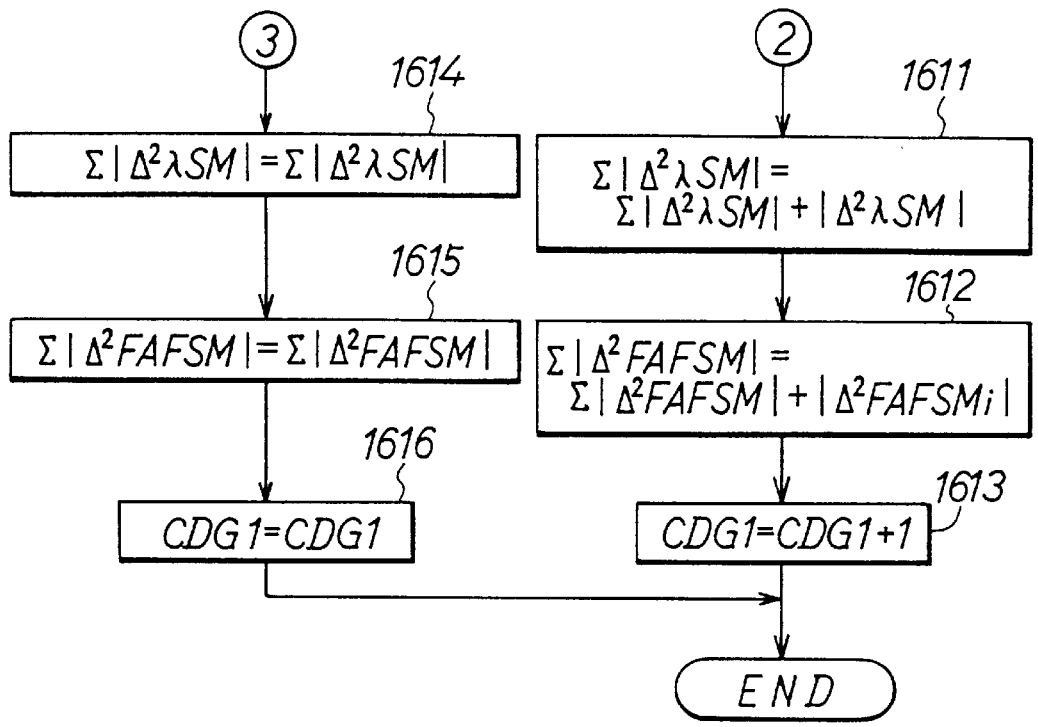

The flowcharts of FIGS. 31 and 32 describe the detailed procedure of Step 1600 of FIG. 29, that is, the procedures of calculating the accumulated values $\Sigma|\Delta^2 SM|$ and $\Sigma|\Delta^2 FAFSM|$.

When the routine of FIG. 31 is started, the CPU 42 calculates at Steps 1602 to 1604 the second derivative $\Delta^2 \lambda SM_i$ (corresponding to the acceleration of the air/fuel ratio $\lambda$) by using the air/fuel ratio $\lambda$, as detected by the A/F sensor 26, and at Step 1605 to 307 the second derivative $\Delta^2 FAFSM_i$ (corresponding to the acceleration of the air/fuel ratio correction coefficient FAF) by using the correction coefficient FAF, on condition that the air/fuel ratio feedback is being executed (that is, on condition that the diagnosis condition of Step 1601 is satisfied).

In short, the CPU 42 reads at Step 1602 the A/D converted air/fuel ratio $\lambda$ and filters at Step 1603 the read air/fuel ratio $\lambda$. This filtering operation is executed to eliminate the influences of the dispersion between the engine cylinders, and a smoothed value $\lambda SM_i$ is determined by the following Equation (13):

$$\lambda SM_i = \lambda SM_{i-1} + (\lambda - \lambda SM_{i-1})/k \qquad (13)$$

Here, the suffix "i" corresponds to the number of operations by the CPU 42, the value subscripted by i shows the present value whereas the value suffixed by (i−1) shows the previous value, and k is the number of control operations.

At Step 1604, the CPU 42 calculates the second derivative $\Delta^2 \lambda SM_i$ of the smoothing value $\lambda SM_i$ by using the following Equation (14):

$$\Delta^2 \lambda SM_i = (2\lambda SM_i - 2\lambda SM_{i-1}) - (2\lambda SM_{i-1} - 2\lambda SM_{i-2}) \qquad (14)$$

The CPU 42 reads at Step 1605 the air/fuel ratio correction coefficient FAF and filters at Step 1606 the air/fuel ratio correction coefficient FAF read previously. In this filtering operation, a smoothing value $FAFSM_i$ is determined from the following Equation (15):

$$FAFSM_i = FAFSM_{i-1} + (FAF - FAFSM_{i-1})/k \qquad (15)$$

At Step 1607, the CPU 42 calculates the second derivative $\Delta^2 FAFSM_i$ of the smoothing value $FAFSM_i$ by using the following Equation (16):

$$\Delta^2 FAFSM_i = (FAFSM_i - FAFSM_{i-1}) - (FAFSM_{i-1} - FAFSM_{i-2}) \qquad (16)$$

Then, the CPU 42 decides at Steps 1608 to 1610 whether or not the conditions (i.e., the accumulating conditions) for accumulating the second derivatives $\Delta^2 \lambda SM_i$ and $\Delta^2 FAFSM_i$ are satisfied.

In other words, the CPU 42 decides at Step 1608 whether or not the engine warming-up has been completed. Specifically, the CPU 42 decides whether or not a cooling water temperature Thw exceeds a predetermined level Y1 (e.g., 80° C.). The CPU 42 decides at Step 1609 whether or not the running conditions satisfy predetermined conditions. Specifically, it is individually decided whether or not an engine RPM Ne is within a predetermined range Y2 to Y3 (e.g., 600 to 4,000 rpm), whether or not a vehicle speed SPD is within a predetermined range Y4 to Y5 (e.g., 0 to 120 km/h), and whether or not an intake air pressure PM is within a predetermined range Y6 to Y7 (e.g., 25 to 95 kPa). The CPU 42 decides at Step 1610 whether or not the running condition is for an abrupt acceleration. Specifically, it is decided whether or not the change $\Delta PM$ of the intake air pressure is lower than a predetermined level.

In the air/fuel ratio feedback control system of the present embodiment, the A/F sensor 26 and the internal combustion engine 1 are modeled. If the aforementioned accumulating conditions are satisfied under the fitting conditions for the modeling, Inequality (17) is satisfied as the behaviors of the air/fuel ratio $\lambda$ and the correction coefficient FAF:

$$\Delta^2 \lambda SM_i < \Delta^2 FAFSM_i \qquad (17)$$

If all the aforementioned accumulating conditions of Steps 1608 to 1610 are satisfied, the CPU 42 proceeds to Step 1611 of FIG. 32 to calculate a new accumulated value $\Sigma|\Delta^2 \lambda SM|$ by adding the absolute value of the second derivative $\Delta^2 \lambda SM_1$, as calculated at this time, to the previous accumulated value $\Sigma|\Delta^2 \lambda SM|$ ($\Sigma|\Delta^2 \lambda SM| = \Sigma|\Delta^2 \lambda SM| + |\Delta^2 \lambda SMi|$). The CPU 42 calculates at Step 1612 a new accumulated value $\Sigma|\Delta^2 FAFSM|$ by adding the absolute value of the second derivative $\Delta^2 FAFSM_i$, as calculated at this time, to the previous accumulated value $\Sigma|\Delta^2 FAFSM|$ ($\Sigma|\Delta^2 FAFSM| = \Sigma|\Delta^2 FAFSM| + |\Delta^2 FAFSM_i|$).

Finally, the CPU 42 increments at Step 1613 the accumulated time counter CDG1 by "1" and ends the present routine.

If the aforementioned diagnosing condition of Step 1601 is not satisfied or if any of the accumulating conditions of Steps 1608 to 1610 is not satisfied, the CPU 42 proceeds to step 1614 of FIG. 32. The CPU 42 holds at Steps 1614 and 1615 the accumulated values $\Sigma|\Delta^2 \lambda SM|$ and $\Sigma|\Delta^2 FAFSM|$, and holds at Step 1616 the accumulated time counter CDG1 to end the present routine.

The aforementioned abnormality diagnosing routine by the CPU 42 will be specifically described with reference to the graphs of FIGS. 34A–34H. In FIGS. 34A–34H, the abnormality of the A/F sensor 26 is detected not before but after a time t1. On the other hand, the accumulating conditions (i.e., the conditions of the aforementioned Steps 1608 to 1610) are usually repeatedly satisfied and not satisfied at and before the time t1. Conveniently, it is assumed here that the accumulating conditions are always satisfied at and after the time t1. It is aslo conveniently assumed that the diagnosing condition (i.e., the abnormality condition of Step 1601 of FIG. 31) is kept as it is once it is satisfied.

In this case, as shown in FIGS. 34C–34E, the accumulating time counter CDG1 and the accumulated values $\Sigma|\Delta^2 \lambda SM|$ and $\Sigma|\Delta^2 FAFSM|$ are individually set when the diagnosing conditions and the accumulating conditions are satisfied, and held at the values when the same are not satisfied.

The graphs of FIGS. 34A–34H will be sequentially described. At and before the time t1, the accumulating time counter CDG1 reaches the predetermined value KX1 at a time t0, and the abnormality diagnosis is then executed (at Step 1104 of FIG. 29) as shown in FIG. 34C by using the ratio between the accumulated values $\Sigma|\Delta^2\lambda SM|$ (in FIG. 34D) and $\Sigma|\Delta^2 FAFSM|$ (in FIG. 34E). At and before the time t1, Inequality (18) is satisfied (that is, the answer in Step 1104 of FIG. 29 is YES):

$$\Sigma|\Delta^2 FAFSM|/\Sigma|\Delta^2\lambda SM|<\alpha \qquad (18)$$

As a result, the abnormality deciding counter CDG3 is not incremented in FIG. 34G. At this time t0, the abnormality diagnosis executing counter CDG2 is incremented in FIG. 34F, and this counted value reaches the predetermined value KX2 (=3) (that is, the answer in Step 1113 of FIG. 30 is YES) so that the counter CDG2 is cleared to "0". In this case, the abnormality deciding counter CDG3=3 so that the abnormality decision flag XDGAF is kept at "0" in FIG. 34H.

At and after the time t1, the abnormality diagnosis executing counter CDG2 is incremented at times t2, t3 and t4. At this time t2, Inequality (19) is satisfied (that is, the answer in Step 1104 of FIG. 29 is YES):

$$\Sigma|\Delta^2 FAFSM|/\Sigma|\Delta^2\lambda SM|<\alpha \qquad (19)$$

At the times t3 and t4, on the other hand, Inequality (20) is satisfied (that is, the answer in Step 1104 of FIG. 29 is NO):

$$\Sigma|\Delta^2 FAFSM|/\Sigma|\Delta^2\lambda SM|\geq\alpha \qquad (20)$$

so that the abnormality deciding counter CDG3 is incremented. As a result, at the time t4, the abnormality deciding counter CDG3 reaches the predetermined value KX3 (=2) (that is, the answer in Step 1114 of FIG. 30 is YES), so that the abnormality decision flag XDGAF is set (at Step 1116 of FIG. 30). According to this flag operation, the warning light 49 is turned on.

When the abnormal phenomenon is temporary so that the answer in Step 1104 of FIG. 29 is again YES, its number of times is counted by the continuous normality deciding counter CDG4 (not shown). When the normal state of the A/F sensor 26 continues so that the counted value of the same counter CDG4 takes the value KX4 (=4) (that is, the answer in Step 1120 of FIG. 30 is YES), the abnormality decision flag XDGAF is cleared, and the warning light 49 is turned off.

The following effects can be achieved according to the present embodiment thus far described in detail.

(a) The detected air/fuel ratio $\lambda$, as detected by the A/F sensor 26, and the correction coefficient FAF are different, when compared in their sensitivities, and this difference is prominent when the sensor becomes abnormal to lower its responsiveness. If, therefore, the ratio between the changing rate of the detected ratio $\lambda$ and the changing rate of the correction coefficient FAF is employed as the abnormality diagnosing parameter so that the parameter is compared, the abnormality of the A/F sensor 26 can be accurately diagnosed. In this case, even if the correction coefficient FAF is varied, when applied to a real system, by the variation of the evaporation purge or the air/fuel ratio learning value, the calculation error of the abnormality diagnosing parameter can be reduced to prevent the erroneous detection of the abnormality diagnosis.

Moreover, since the evaporation purge does not readily influence the abnormality diagnosing parameter, the execution of the abnormality diagnosis can be less restricted to enhance the execution frequency of the abnormality diagnosis. As a result, a highly reliable air/fuel ratio control system can be realized to suppress disadvantages such as the deterioration of emission control quality. In the present embodiment, the diagnosing conditions and the accumulating conditions are really set by the aforementioned flow of FIG. 31, but these conditions have relatively loose restrictions so that they will not seriously lower the diagnosing frequency of the sensor abnormality.

(b) Especially in the present embodiment, the second derivatives $\Delta^2\lambda SM$ of the ratio $\lambda$ are accumulated for the predetermined time period so that their accumulated value $\Sigma|\Delta^2\lambda SM|$ is employed as the changing rate of the correction coefficient FAF, and the second derivatives $\Delta^2 FAFSM$ of the correction coefficient FAF are accumulated for the predetermined time period so that their accumulated value $\Sigma|\Delta^2 FAFSM|$ is employed as the changing rate of the correction coefficient FAF. Moreover, the ratio between accumulated value of the state variable quantity X(k) of the second derivative of $\lambda$ and the accumulated value of the second derivative of FAF is employed as the abnormality diagnosing parameter, and this parameter is compared with the predetermined abnormality deciding value $\alpha$ so that the abnormality of the A/F sensor 26 is diagnosed from the comparison result. In this case, the accumulation of the second derivatives of $\lambda$ and FAF for the predetermined time period is one method for clarifying the difference between the individual behaviors while correlating phenomena such as the characteristic abnormality of the A/F sensor 26 and the responsiveness abnormality, and the sensor abnormality (e.g., the characteristic abnormality or the responsiveness abnormality) can be easily diagnosed.

(c) In the present embodiment, moreover, it is diagnosed that the A/F sensor 26 is normal if the following relation is satisfied when the ratio between the accumulated value $\Sigma|\Delta^2\lambda SM|$ of the second derivative of $\lambda$ and the accumulated value $\Sigma|\Delta^2 FAFSM|$ of the second derivative of FAF is compared with the predetermined abnormality deciding value $\alpha$ as shown in Inequality (21):

$$\Sigma|\Delta^2 FAFSM|/\Sigma|\Delta^2\lambda SM|<\alpha \qquad (21)$$

In other words, at the drop of the responsiveness of the sensor 26, the changing rate of the detected $\lambda$ is drastically lowered, but the changing rate of the correction coefficient FAF is lowered less as has been described above. According to the diagnosis of the present construction, the abnormality that the sensor responsiveness is lowered can be properly diagnosed.

(d) In addition, the changing rate of the air/fuel ratio $\lambda$ and the changing rate of the air/fuel ratio correction coefficient FAF are subjected to the filtering operation as a smoothing operation. When this diagnosis is applied to a four-cylinder internal combustion engine, the dispersion of the individual elements among the cylinders can be eliminated to better improve the abnormality diagnosing accuracy.

(e) In the present embodiment, the continuous normality deciding counter CDG4 is used to clear the abnormality decision by the counting operation of the counter CDG4 even after the decision of the abnormality. As a result, the air/fuel ratio feedback control can be suitably reopened when the sensor abnormality temporarily occurs so that its abnormal state is avoided or when the abnormality is once erroneously decided.

In a variation of the foregoing embodiment, the abnormality deciding value a is set variably according to the engine running state. In this case, the operations shown in FIG. 35 are interposed between the aforementioned operations of Steps 1103 and 1104 of FIG. 29.

Figure 35:
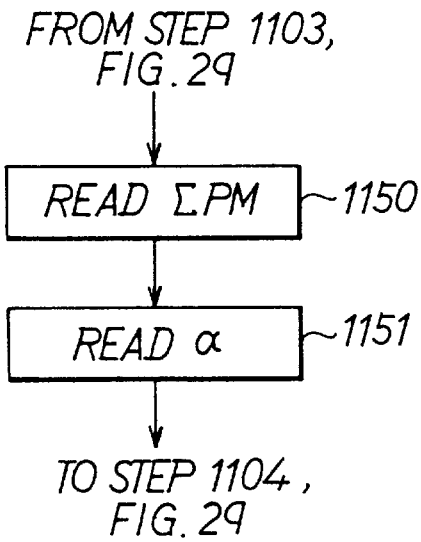
FIG. 35 is a flowchart showing operations to be incorporated in the middle of the flowchart of FIG. 29.
Figure 36:
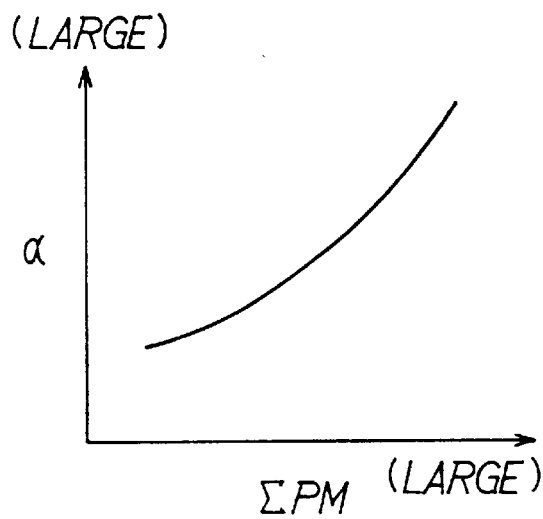
FIG. 36 is a graph for setting an abnormality deciding value a variable in the eighth embodiment.

As shown in FIG. 35, at Step 1140, an accumulated value ΣPM of the intake air pressure is read in. This accumulated value λPM is a parameter indicating the changing rate of the intake air pressure for a predetermined time period. At Step 1151, the abnormality deciding value α is set variably on the basis of the accumulated value ΣPM of the intake air pressure PM. Here, the value α is determined by using a relation of FIG. 36, for example. In FIG. 36, the relation is set such that the value α is larger for larger values of ΣPM.

According to this construction, even if the engine running conditions change, the accompanying abnormality diagnosis can be sequentially executed to better improve the sensor abnormality diagnosing accuracy. Incidentally, the relation shown in FIG. 36 can be likewise achieved even for an abscissa of the changing rate of the engine RPM Ne or the changing rate of a throttle opening TH. Thus, the parameter for setting the variable a may be modified into those changing rates.

Additional embodiments of the present invention will be described with reference to the accompanying drawings. In the following constructions of the individual embodiments, the description of the portions equivalent to those of the foregoing eighth embodiment will be omitted. Here will be stressed the differences from the eighth embodiment.

Ninth Embodiment

Figure 37:
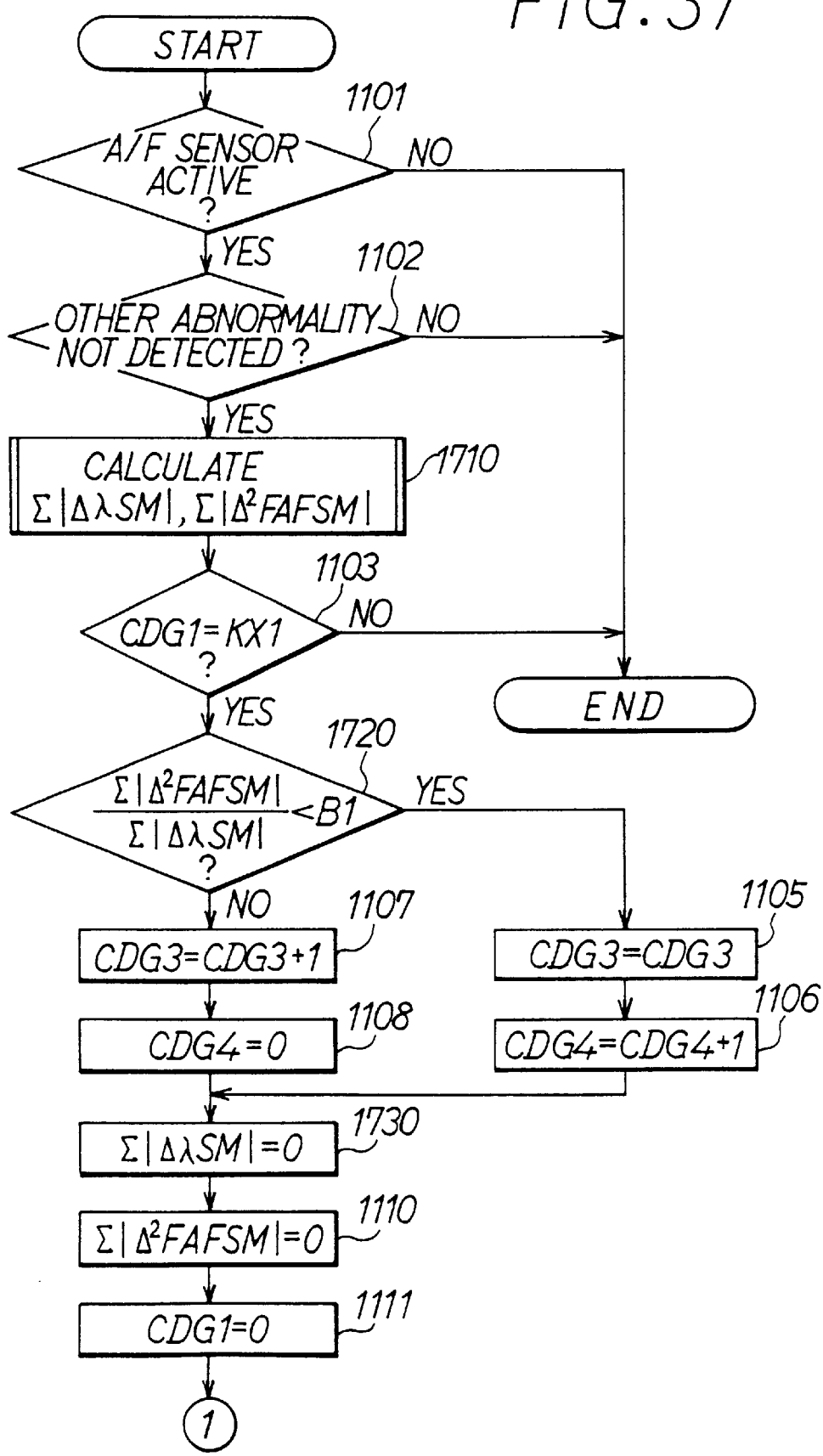
FIG. 37 is a flowchart showing a sensor abnormality diagnosing routine according to a ninth preferred embodiment of the present invention.

FIG. 37 is a flowchart showing an abnormality diagnosing routine according to a ninth preferred embodiment of the present invention. This routine of FIG. 37 replaces the flowchart of FIG. 29 in the eighth embodiment and is executed by the CPU 42 for a predetermined period (or in synchronism with fuel injections), as described above.

Only the parts of the abnormality detecting routine of FIG. 37 which are different from those of FIG. 29 will be described. At Step 1600 in FIG. 29, the accumulated value "$\Sigma|\Delta^2 \lambda SM|$" of the second derivative $\Delta^2 \lambda SM$ of the air/fuel ratio λ is calculated as the changing rate of the air/fuel ratio λ, and the accumulated value $\Sigma|\Delta^2 FAFSM|$ of the second derivative $\Delta^2 FAFSM$ of the correction coefficient FAF is calculated as the changing rate of the value FAF. At Step 1104 of FIG. 29, the abnormality diagnosis of the air/fuel ratio is executed depending upon whether or not Inequality (22) is satisfied:

$$\Sigma|\Delta^2 FAFSM|/\Sigma|\Delta^2 \lambda SM| < \alpha$$

In the routine of FIG. 37, on the other hand, at Step 1710, the accumulated value "$\Sigma|\Delta \lambda SM|$" of a derivative $\Delta \lambda SM$ ($=\Delta \lambda SM_i - \Delta \lambda SM_{i-1}$) is calculated as the changing rate of the air/fuel ratio λ, and the accumulated value "$\Sigma|\Delta^2 FAFSM|$" of the second derivative $\Delta^2 FAFSM$ is calculated as the changing rate of the value FAF. In other words, the changing rate of the air/fuel ratio λ is changed from "$\Sigma|^2 SM|$" to "$\Sigma|\Delta \lambda SM|$". In this case, the accumulated value $\Sigma|\Delta \lambda SM|$ to be used in the present routine takes the value which is accumulated for the time period until the accumulated time counter CDG1 reaches the predetermined value KX1 ($\Sigma|\Delta \lambda SM| = \Sigma|\Delta \lambda SM| + \Delta \lambda SM$).

At Step 1720, moreover, the abnormality of the A/F sensor 26 is diagnosed by using a predetermined abnormality deciding value β1 depending on whether or not Inequality (22) is satisfied:

$$\Sigma|\Delta^2 FAFSM|/\Sigma|\Delta \lambda SM| < \beta 1 \tag{22}$$

At Step 1730 after the abnormality diagnosis, the accumulated value $\Sigma|\Delta \lambda SM|$ is cleared to "0". Incidentally, the operations, as designated by the same step numbers as those of FIG. 29, and the operations at and after Step 1111 are identical to those of FIGS. 29 and 30, and their description will be omitted.

In the present embodiment, too, the object of the present invention is achieved as in the foregoing eighth embodiment. As has been described with reference to FIGS. 35 and 36, the abnormality diagnosing accuracy can also be improved by setting the abnormality deciding value β1 variably by the ΣPM value.

Tenth Embodiment

Figure 38:
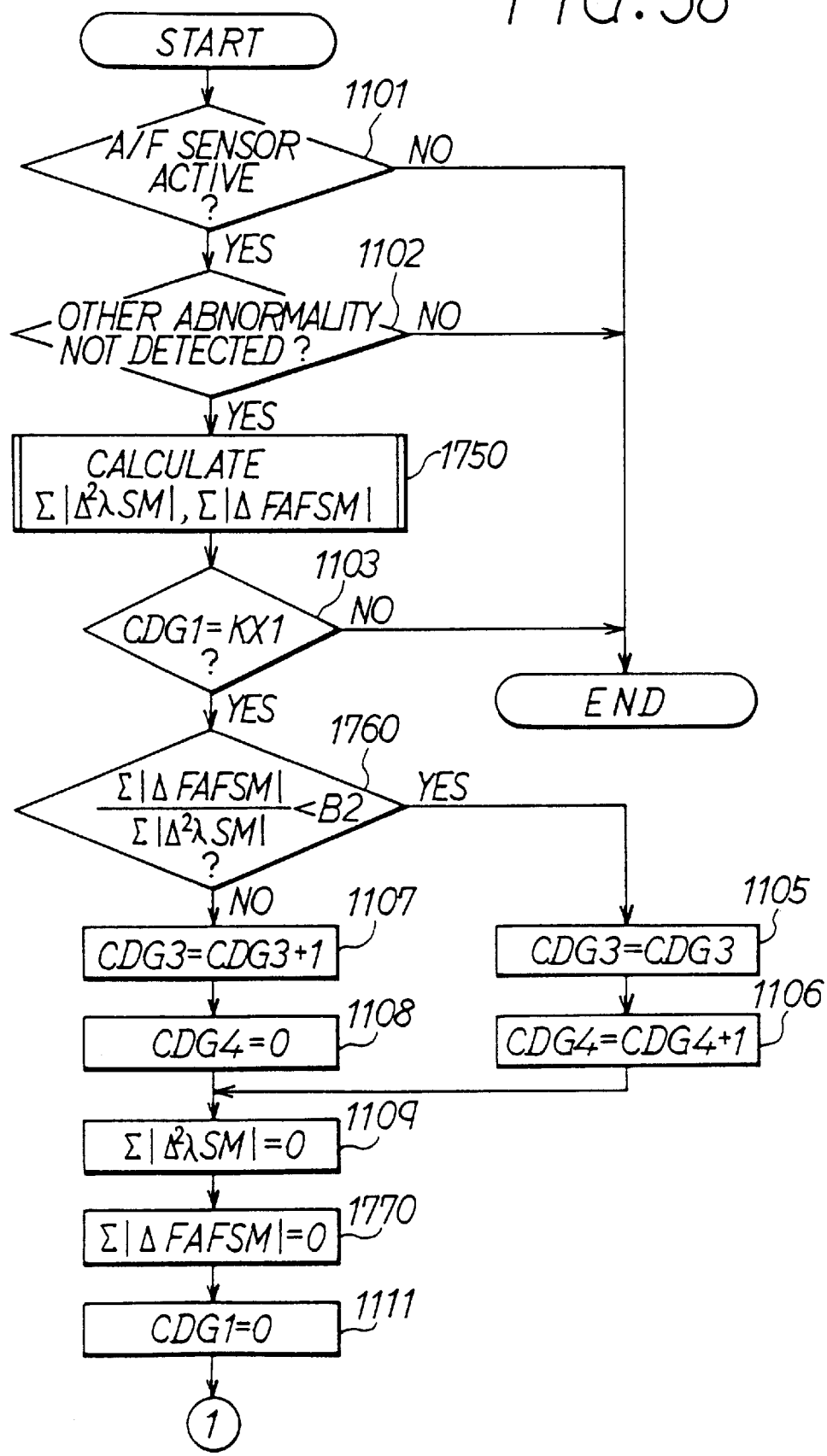
FIG. 38 is a flowchart showing a sensor abnormality diagnosing routine according to a tenth preferred embodiment of the present invention.

FIG. 38 is a flowchart showing an abnormality diagnosing routine according to a tenth preferred embodiment of the present invention. This routine of FIG. 38 replaces the flowchart of FIG. 29 in the eighth embodiment and can be executed by the CPU 42 for a predetermined period (synchronously with the fuel injections).

Only the points in FIG. 38 which are different from those of FIG. 29 will be described below. In the routine of FIG. 38, at Step 1750, the accumulated value "$\Sigma|\Delta^2 \lambda SM|$" of a second derivative $\Delta^2 \lambda SM$ is calculated as the changing rate of the air/fuel ratio λ, and the accumulated value "$\Sigma|\Delta FAFSM|$" of the derivative $\Delta FAFSM$ ($=FAFSM_i - FAFSM_{i-1}$) is calculated as the changing rate of the value FAF. In other words, the changing rate of the value FAF is changed from "$\Sigma|\Delta^2 FAFSM|$" to "$\Sigma \Delta FAFSM|$". In this case, the accumulated value $\Sigma|\Delta FAFSM|$ to be used in the present routine takes the value which is accumulated for the time period until the accumulated time counter CDG1 reaches the predetermined value KX1 ($\Sigma|\Delta FAFSM| = \Sigma|\Delta FAFSM| + \Delta FAFSM$).

At Step 1760, moreover, the abnormality of the A/F sensor 26 is diagnosed by using a predetermined abnormality deciding value β2 depending on whether or not Inequality (23) is satisfied:

$$\Sigma|\Delta FAFSM|/\Sigma|\Delta^2 \lambda SM| < \beta 2 \tag{23}$$

At Step 1770, after the abnormality diagnosis, the accumulated value $\Sigma|\Delta FAFSM|$ is cleared to "0".

In the present embodiment, too, the object of the present invention is achieved as in the foregoing eighth embodiment. As has been described with reference to FIGS. 35 and 36, the abnormality diagnosing accuracy can also be improved by setting the abnormality deciding value β2 variably according to the ΣPM value.

Eleventh Embodiment

An eleventh preferred embodiment of the present invention will be described with reference to FIGS. 39 to 41. In the present embodiment, the amplitude ΔλLR of the changing rate Δλ of the air/fuel ratio λ is determined, and the amplitude ΔFAFLR of the changing rate ΔFAF of the value FAF is determined, so that the changing rates are determined from the accumulated values "ΣΔλLR" and "ΣΔFAFLR" of the individual amplitude values for predetermined time periods. The abnormality diagnosis of the A/F sensor 26 is executed on the basis of those values ΣΔλLR and ΣΔFAFLR.

In short, the accumulated values $\Sigma|\Delta^2 \lambda SM|$ and $\Sigma|\Delta^2 FAFSM|$, as used in the foregoing individual embodiments, and the accumulate value $\Sigma\Delta\lambda LR$ and $\Sigma\Delta FAFLR$, as used in the present embodiment, are substantially equal (that is, "Sum of Second Derivatives=Sum of Amplitudes") if the accumulation time periods of the individual values are longer than the half-wave length of the fluctuation period of the air/fuel ratio λ or the air/fuel ratio correction coefficient FAF. In the present embodiment, therefore, the accumulated value $\Sigma\Delta\lambda LR$ and $\Sigma\Delta FAFLR$ are used as the changing rates to execute the abnormality diagnosis.

Figure 39:
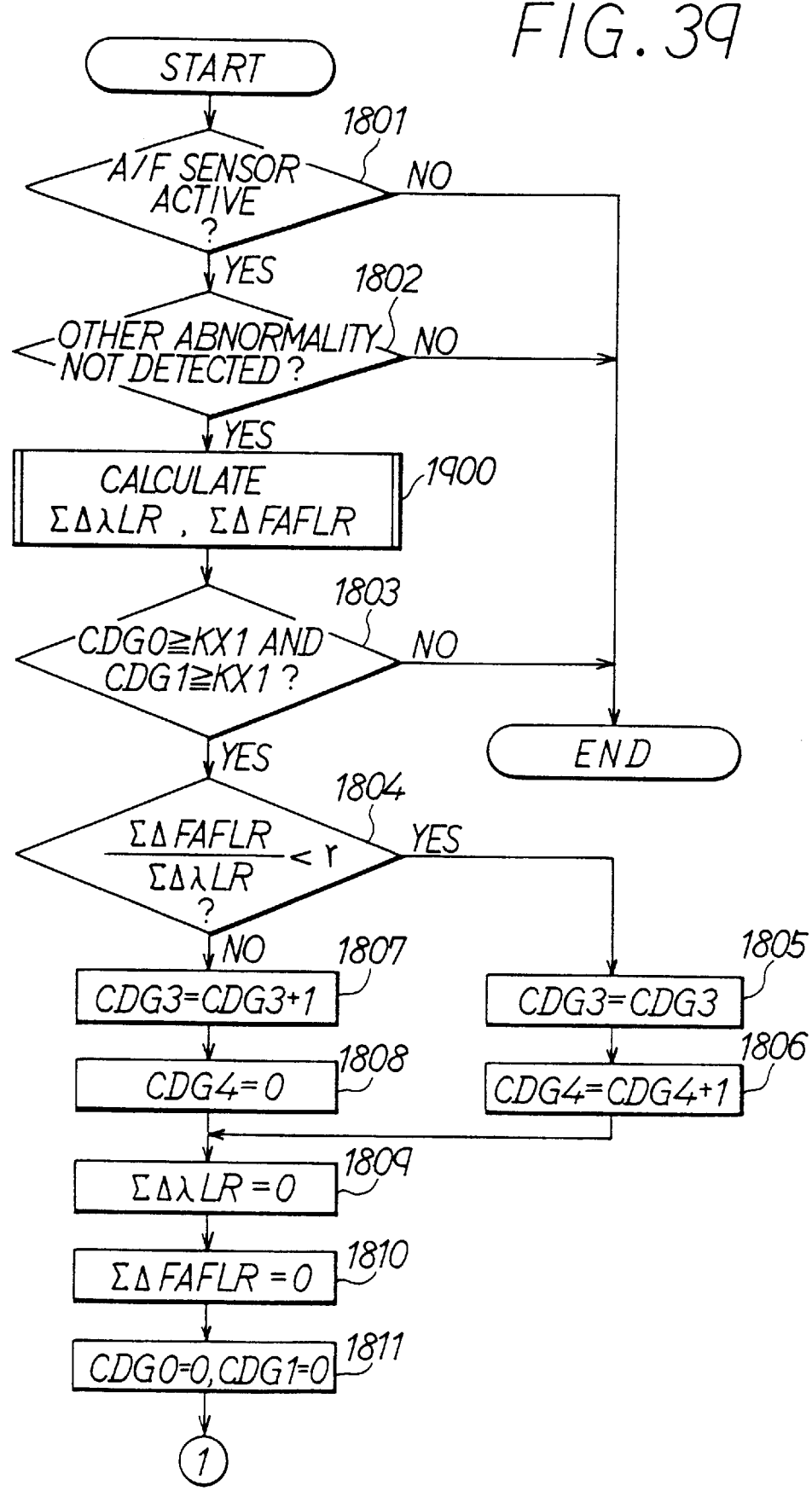
FIG. 39 is a flowchart showing a sensor abnormality diagnosing routine according to an eleventh preferred embodiment of the present invention.

FIG. 39 is a flowchart showing an abnormality diagnosing routine of the present embodiment. This routine of FIG. 39 replaces the flowchart of FIG. 29 in the eighth embodiment and is executed by the CPU 42 for a predetermined period (or in synchronism with the fuel injections).

When the routine of FIG. 39 is started, the CPU 42 determines at Step 1801 the active state of the A/F sensor 26 and determines at Step 1802 whether or not an abnormality other than that of the A/F sensor 26 is detected. If both the answers of Steps 1801 and 1802 are YES, the CPU 42 proceeds to Step 1900 to calculate the accumulated values $\Sigma\Delta\lambda LR$ and $\Sigma\Delta FAFLR$ by the later-described subroutines of FIGS. 40 and 41.

Then, the CPU 42 decides at Step 1803 whether or not both the accumulated time counters CDG0 and CDG1 exceed the predetermined value KX1 (e.g., a numerical value corresponding to the accumulated time of 30 seconds in the present embodiment). If CDG0<KX1 or CDG1<KX1, the CPU 42 ends the present routine as it is. If CDG0≧KX1 and CDG1≧KX1, the CPU 42 proceeds to Step 1804. At Step 1804, the CPU 42 uses the ratio between the accumulated values $\Sigma\Delta\lambda LR$ and $\Sigma\Delta FAFLR$ as the abnormality diagnosing parameter to compare the parameter with a predetermined abnormality deciding value γ. In other words, it is decided whether or not Inequality (24) is satisfied:

$$\Sigma\Delta FAFLR/\Sigma\Delta\lambda LR < \gamma \tag{24}$$

In this case, satisfying this inequality means that the changing rates of the air/fuel ratio λ and the value FAF are correlating to each other in a satisfactory state, and corresponds to the fact that the responsiveness of the A/F sensor 26 is retained. In other words, a relation shown in FIG. 33 holds between the abnormality deciding parameter ($\Sigma\Delta FAFLR/\Sigma\Delta\lambda LR$) and the abnormality deciding value γ (that is, the ordinate and abscissa of FIG. 33 can be replaced by the parameter and the value γ).

It follows that A/F sensor 26 can be deemed normal if, as shown in Inequality (25), $$\Sigma\Delta FAFLR/\Sigma\Delta\lambda LR < \gamma \tag{25}$$

and that the A/F sensor 26 can be deemed abnormal if, as shown in Inequality (26), $$\Sigma\Delta FAFLR/\Sigma\Delta\lambda LR \geq \gamma \tag{26}$$

If the answer in Step 1804 is YES, the CPU 42 holds at Step 1803 the abnormality deciding counter CDG3 and increments at Step 1806 the continuous normality deciding counter CDG4 by "1". If the answer in Step 1804 is NO, on the other hand, the CPU 42 increments at Step 1807 the abnormality deciding counter CDG3 by "1" and clears at Step 1808 the continuous normality deciding counter CDG4 to "0".

Then, the CPU 42 clears at Step 1809 the accumulated value $\Sigma\Delta\lambda LR$ to "0" and clears at Step 1810 the accumulated value $\Sigma\Delta FAFLR$ to "0". The CPU 42 clears at Step 1811 both the accumulated time counters CDG0 and CDG1 to "0". Incidentally, the routine at and after Step 1811 is identical to the routine of FIG. 30, and further description will therefore be omitted.

The procedure of calculating the accumulated values $\Sigma\Delta\lambda LR$ and $\Sigma\Delta FAFLR$ or the detailed procedure of Step 1900 of FIG. 39 will be described with reference to the flowchart of FIGS. 40 and 41.

Figure 40:
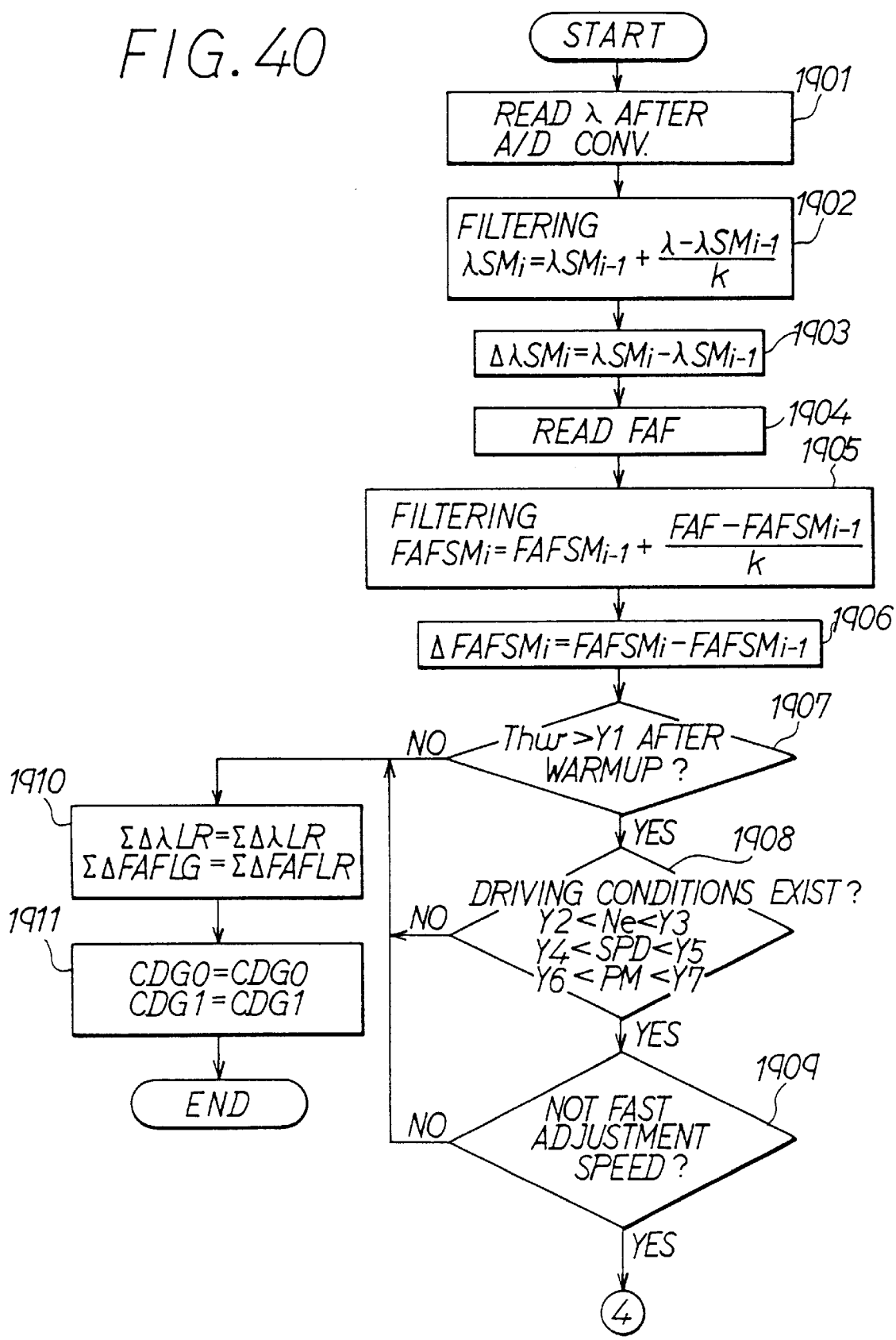
FIGS. 40 and 41 are a flowchart showing a routine for calculating accumulated values $\Sigma\Delta\lambda LR$ and $\Sigma\Delta FAFLR$.

When the routine of FIG. 40 is started, the CPU 42 calculates at Steps 1901 to 1903 a derivative $\Delta\lambda SM_i$ by using the air/fuel ratio λ detected by the A/F sensor 26, and calculates at Steps 1904 to 1906 a derivative $\Delta FAFSM_i$ by using the air/fuel ratio correction coefficient FAF. Specifically, the CPU 42 reads at Step 1901 the air/fuel ratio λ A/D converted and filters at Step 1902 the read air/fuel ratio λ to calculate the smoothed value $\lambda SM_i$. At Step 1903, the CPU 42 calculates the derivative $\Delta\lambda SM_i$ from the present value and the previous value of e previously calculated smoothed value λSM ($\Delta\lambda SM_i = \lambda SM_i - \lambda SM_{i-1}$).

On the other hand, the CPU 42 reads at Step 1904 the value FAF and filters at Step 1905 the read value FAF to calculate the smoothed value $FAFSM_i$. At Step 1906, the CPU 42 calculates the derivative $\Delta\lambda FAFSM_i$ from the present and previous values of the calculated smoothed value FAFSM ($\Delta\lambda FAFSM_i = FAFSM_i - FAFSM_{i-1}$).

Then, the CPU 42 decides at Steps 1907 to 1909 whether or not the conditions (i.e., the accumulating conditions) for accumulating the derivatives $\Delta\lambda SM_i$ and $\Delta FAFSM_i$ are satisfied (where these operations are identical to those of Steps 1608 to 1610 of FIG. 31). Specifically, it is decided at Step 1907 on the basis of the cooling water temperature Thw whether or not the warming-up of the engine is completed, and it is decided at Step 1908 on the basis of the engine RPM Ne, the vehicle speed SPD and the intake air pressure PM whether or not the running conditions satisfy the predetermined conditions. At Step 1909, it is decided on the basis of the changing rate of the intake air pressure PM whether or not the vehicle is being abruptly accelerated.

If any of the accumulating conditions of Steps 1907 to 1909 are not satisfied, the CPU 42 proceeds to Step 1910 to hold both the accumulated values $\Sigma\Delta\lambda LR$ and $\Sigma\Delta FAFLR$. The CPU 42 holds at Step 1911 the accumulated time counters CDG0 and CDG1 and ends the present routine.

Figure 41:
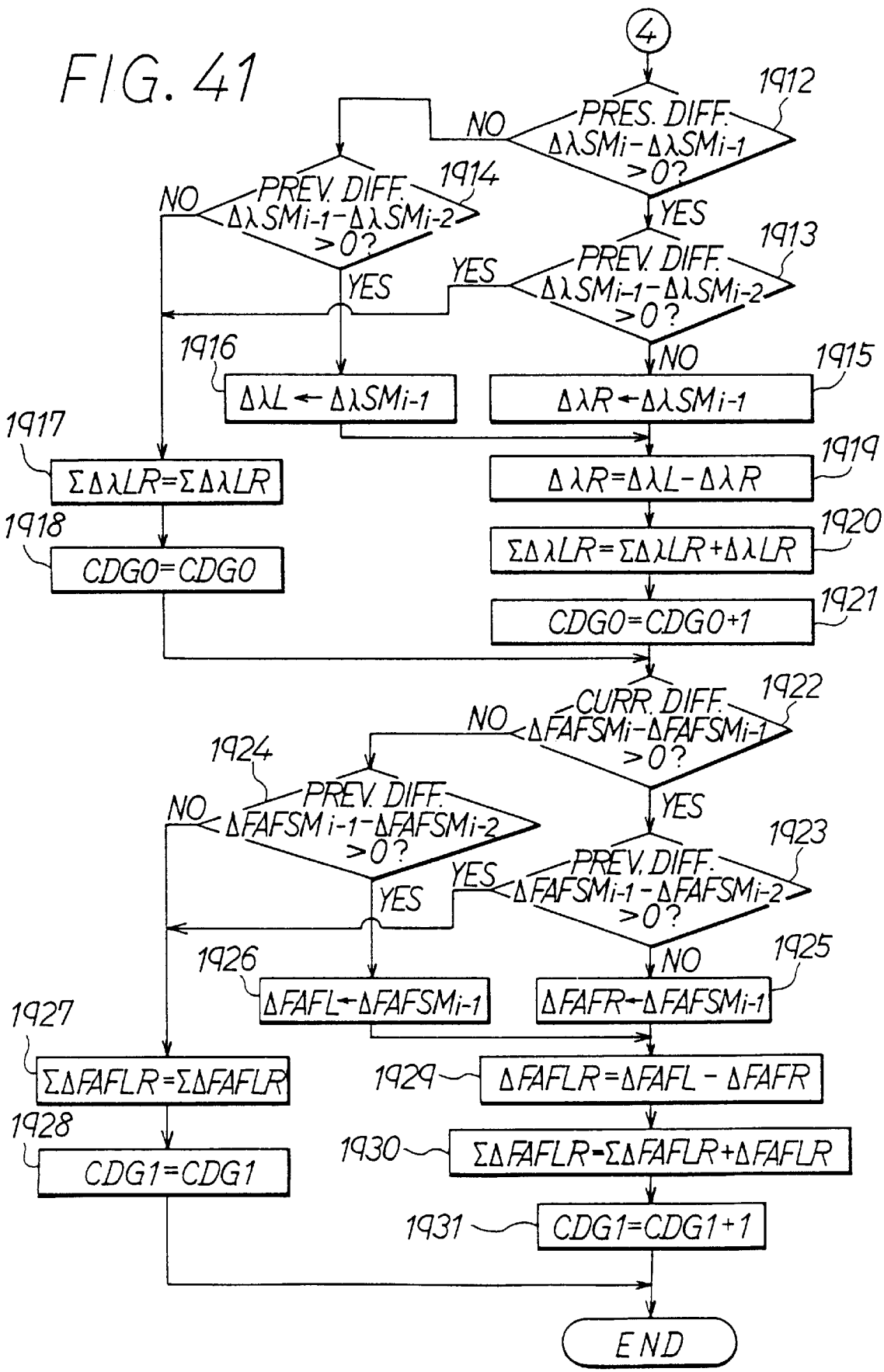

If all the accumulating conditions of Steps 1907 to 1909 are satisfied on the other hand, the CPU 42 proceeds to Step 1912 of FIG. 41. At Step 1912, the CPU 42 decides whether or not the difference between the present value and the previous value of the difference $\Delta\lambda SM$ exceeds "0", as shown in Inequality (27):

$$\Delta\lambda SM_i - \Delta\lambda SM_{i-1} > 0 \tag{27}$$

At both Steps 1913 and 1914, the CPU 42 decides whether or not the difference between the previous value and Ad the further previous value of the difference $\Delta\lambda SM$ exceeds "0", as shown in Inequality (28):

$$\Delta\lambda SM_{-1} - \Delta\lambda SM_{i-2} > 0 \tag{28}$$

If the answer in Step 1912 is YES and the answer in Step 1913 is NO, the CPU 42 proceeds to Step 1915 to set the previous value $\Delta\lambda SM_{i-1}$ to "$\Delta\lambda R$" by assuming that the previous value ($\Delta\lambda SM_{i-1}$) of the value $\Delta\lambda SM$ corresponds to a rich peak value $\Delta\lambda R$. If the answer in Step 1912 is NO and the answer in Step 1914 is YES, on the other hand, the CPU 42 proceeds to Step 1916 to set the previous difference $\Delta\lambda SM_{i-1}$ to "$\Delta\lambda L$" by assuming that the previous value ($\Delta\lambda SM_{i-1}$) of the value $\Delta\lambda SM$ corresponds to the lean peak value $\Delta\lambda L$.

In other cases (i.e., if the answer in Step 1913 is YES or if the answer in Step 1914 is NO), the CPU 42 proceeds to Step 1917. The CPU 42 holds at Step 1917 the accumulated value ΣΔλLR and holds at Step 1918 the accumulated time counter CDG0.

After the operation of Step 1915 or 1916, the CPU 42 calculates at Step 1919 the Δλ amplitude ΔλLR by subtracting the rich peak value ΔλR from the lean peak value ΔλL (ΔλLR=ΔλL−ΔλR). Then, the CPU 42 updates at Step 1920 the accumulated value ΣΔλLR by adding the accumulated value ΣΔLR accumulated until then and the calculated Δλ amplitude ΔλLR (ΣΔλLR=ΣΔλLR+ΔλLR). The CPU 42 increments at Step 1921 the accumulated time counter CDG0 by "1" and then proceeds to Step 1922.

At Step 1922, the CPU 42 decides whether or not the difference between the present value and the previous value of the derivative ΔFAFSM exceeds "0", as shown in Inequality (29):

$$\Delta FAFSM_i - \Delta FAFSM_{i-1} > 0 \tag{29}$$

At both Steps 1923 and 1924, the CPU 42 decides whether or not the difference between the previous value and the further previous value of the derivative ΔFAFSM exceeds "0"!, as shown in Inequality (30):

$$\Delta FAFSM_{i-1} - \Delta FAFSM_{i-2} > 0 \tag{30}$$

If the answer in Step 1922 is YES and the answer in Step 1923 is NO, the CPU 42 proceeds to Step 1925 to set the previous derivative $\Delta FAFSM_{i-1}$ to "ΔFAFR", by assuming that the previous value ($\Delta FAFSM_{i-1}$) of the ΔFAFSM value corresponds to the rich peak value ΔFAFR. If the answer in Step 1922 is NO and if the answer in Step 1924 is YES, on the other hand, the CPU 42 proceeds to Step 1926 to set the previous derivative $\Delta FAFSM_{i-1}$ to "ΔFAFL" by assuming that the previous value ($\Delta FAFSM_{i-1}$) of the ΔFAFSM value corresponds to the lean peak value ΔFAFL.

In other cases (i.e., if the answer in Step 1923 is YES or if the answer in Step 1924 is NO), the CPU 42 proceeds to Step 1927. The CPU 42 holds at Step 1927 the accumulated value ΣΔFAFLR and holds at Step 1928 the accumulated time counter CDG1.

After the operation of Step 1925 or 1926, the CPU 42 calculates at Step 1929 the ΔFAF amplitude ΔFAFLR by subtracting the rich peak value ΔFAFR from the lean peak value ΔFAFL (ΔFAFLR=ΔFAFL−ΔFAFR). Then, the CPU 42 updates the accumulated value ΣΔFAFLR by adding the calculated ΔFAF amplitude ΔFAFLR to the accumulated value ΣΔFAFLR until then (ΣΔFAFLR=ΣΔFAFLR+ ΔFAFLR). The CPU 42 increments at Step 1931 the accumulated time counter CDG1 by "1", and ends the present routine.

In the present embodiment, too, the object of the present invention is achieved as in the foregoing individual embodiments. Especially in the present embodiment, the accumulated value ΣΔλLR of the Δλ amplitude is employed as the changing rate of the air/fuel ratio λ, and the accumulated value ΣΔFAFLR of the ΔFAF amplitude is employed as the changing rate of the FAF value. The ratio between the accumulated values ΣΔLR and ΣΔFAFLR is used as the abnormality diagnosing parameter, and this parameter is compared with the abnormality deciding value γ so that the abnormality of the A/F sensor 26 is diagnosed from the comparison result. In this case, the accumulation of the Δλ amplitude and ΔFAF for the predetermined time period is one method for clarifying the difference between the individual behaviors while correlating phenomena such as the characteristic abnormality of the A/F sensor 26 and the responsiveness abnormality, and the sensor abnormality can be easily diagnosed by determining the ratio (=ΣΔFAFLR/ ΣΔλLR) of those accumulated values.

In the present embodiment, too, the abnormality diagnosing accuracy can be improved by setting the abnormality deciding value γ variably according to the ΣPM value, as has been described with reference to FIGS. 35 and 36.

Twelfth Embodiment

In each of the foregoing eighth to twelfth embodiments, at the abnormality diagnosis, the sensor abnormality is diagnosed depending upon whether or not the abnormality diagnosing parameter, as determined from the ratio of the changing rates of the air/fuel ratio λ and the FAF value, is less than the abnormality deciding value (α, β1, β2 or γ). In the present embodiment, on the other hand, the sensor abnormality is diagnosed depending upon whether or not the abnormality diagnosing parameter, as determined from the ratio of the changing rates of the air/fuel ratio λ and the FAF value, is within a predetermined range (δ1 to δ2). In the present embodiment, moreover, the ratio between the accumulated values $\Sigma|\Delta^2 \lambda SM|$ and $\Sigma\Delta^2 FAFSM|$ is employed as the abnormality diagnosing parameter, and the abnormality deciding values δ1 and δ2 to be used for the abnormality diagnosis are set variable. In this case, the operations shown in FIG. 42 are added after Step 1103 of FIG. 29, and the operation of Step 1104 is modified.

Figure 42:
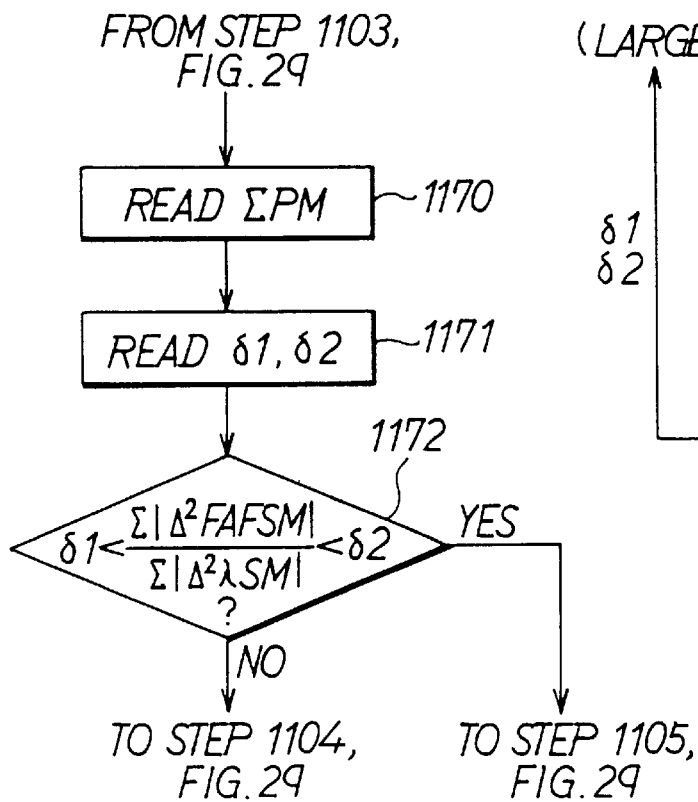
FIG. 42 is a flowchart showing operations to be incorporated midway of that of FIG. 29 in accordance with a twelfth preferred embodiment of the present invention.
Figure 43:
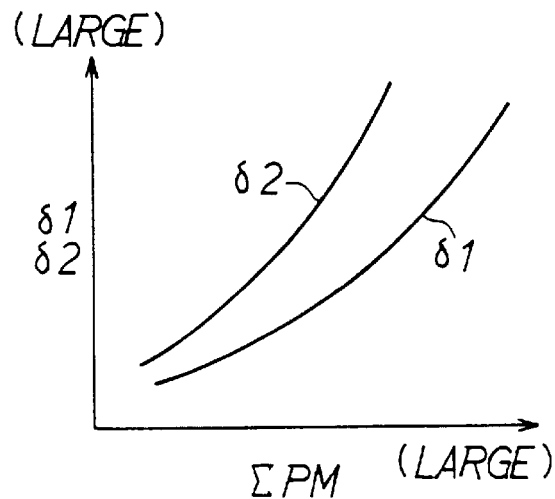
FIG. 43 is a graph for setting abnormality deciding values $\delta 1$ and $\delta 2$ in the twelfth embodiment.

In FIG. 42, the accumulated value ΣPM of the intake air pressure is read in. This accumulated value ΣPM is a parameter indicating the changing rate of the intake air pressure for a predetermined time period. At Step 1171, the abnormality deciding values δ1 and δ2 are set variably on the basis of the accumulated value ΣPM of the intake air pressure PM. Then, the values δ1 and δ2 can be determined from relations shown in FIG. 43, for example. In FIG. 43, the relations are set such that the values δ1 and δ2 become larger for larger values of ΣPM.

Then, at Step 1172, abnormality diagnosis is executed depending upon whether or not Inequality (31) is satisfied:

$$\delta 1 < (\Sigma|\Delta^2 FAFSM|/\Sigma|\Delta^2 \lambda SM|) < \delta 2 \tag{31}$$

If the answer in Step 1172 is YES, the routine proceeds to Step 1105 of FIG. 29. At Steps 1105 and 1106 of FIG. 29, the abnormality deciding counter CDG3 is held, and the continuous normality deciding counter CDG4 is incremented by "1". If the answer in Step 1107 is NO, on the other hand, the routine proceeds to Step 1107 of FIG. 29. At Steps 1107 and 1108 of FIG. 29, the abnormality deciding counter CDG3 is incremented by "1", and the continuous normality deciding counter CDG4 is cleared.

Figure 46A:
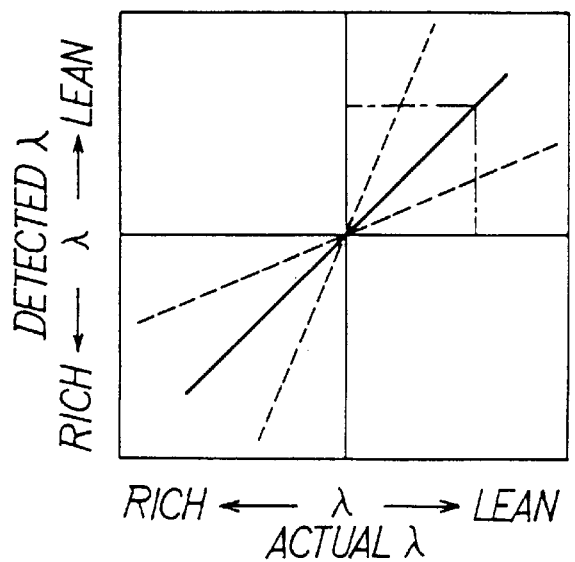
FIG. 46A and 46B are diagram showing the states in the characteristic abnormality and the responsiveness reduction of the air/fuel ratio sensor.
Figure 46B:
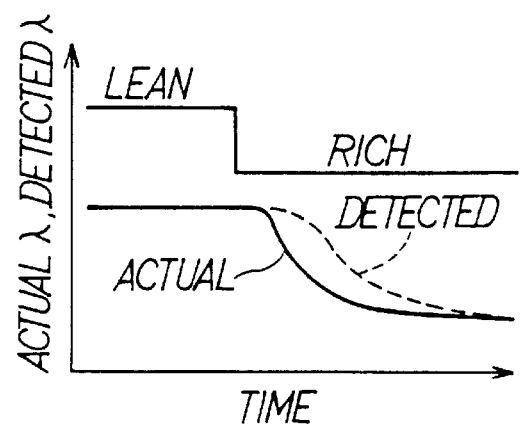

According to the construction of the present embodiment, the object of the present invention can naturally be achieved as in the aforementioned individual embodiments, and the following effects can be additionally achieved. If the construction diagnoses the sensor abnormality from the fact that the abnormality diagnosing parameter is within the predetermined normal range (δ1 to δ2), the characteristic abnormality can be properly diagnosed even when it occurs in the mode shown in FIG. 46A.

Incidentally, the relations shown in FIG. 43 can be likewise achieved even if the abscissa of FIG. 43 shows the changing rate of the engine RPM Ne or the changing rate of the throttle opening TH, so that the parameter for setting the δ1 and δ2 values may be replaced by those changing rates.

Thirteenth Embodiment

Figure 51A:
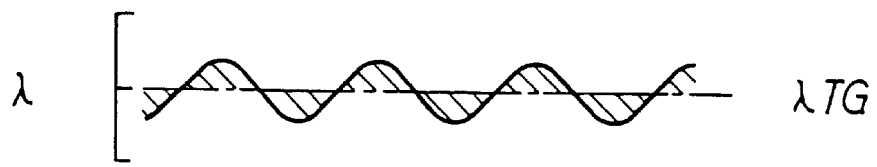
FIGS. 51A and 51B are graphs showing the variation of an air/fuel ratio $\lambda$ with respect to a target air/fuel ratio $\lambda TG$ and the variation of an air/fuel ratio correction coefficient FAF with respect to an air/fuel ratio correction coefficient average value FAFAV in the thirteenth embodiment.
Figure 51B:
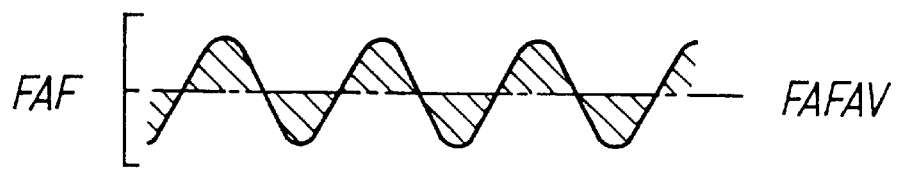

A thirteenth embodiment of the present invention diagnosis procedure calculates the accumulated value (the "λ accumulated value Tλ") between the air/fuel ratio λ, as detected within a predetermined time duration by the A/F sensor 26, and the target air/fuel ratio λTG, and an accumulated value (the "FAF accumulated value TFAF") of the difference between the air/fuel ratio correction coefficient FAF within a predetermined time duration and the average value FAFAV of the correction coefficient FAF. If the air/fuel ratio λ varies relative to the target air/fuel ratio λTG and if the air/fuel ratio correction coefficient FAF varies relative to its average value FAFAV, the λ accumulated value Tλ and the FAF accumulated value TFAF correspond to the areas of the hatched portions in FIGS. 51A and 51B. In the present embodiment, the λ accumulated value Tλ corresponds to a first abnormality deciding element, and the FAF accumulated value TFAF corresponds to a second abnormality deciding element.

The abnormality of the air/fuel ratio feedback control system is detected depending upon whether those values Tλ and TFAF are within the normality deciding region or within the abnormality deciding region. Specifically, if the value Tλ is within a range between threshold values A and B and the value TFAF is within a range between threshold values C and D, as illustrated (in an intermediate region excluding the hatched portions) in FIG. 52, it is diagnosed that the air/fuel ratio feedback control system is normal. If the values Tλ and TFAF fall within the hatched regions, on the other hand, it is diagnosed that the air/fuel ratio feedback control system is normal. In this case, the region of Tλ≦A and TFAF≦C is intrinsically hard to decide as an abnormal one. In the present embodiment, however, that region is poor in reliability for abnormality diagnosis and may possibly be mistaken in the diagnosis of abnormality, so that its decision of normality is inhibited (to belong to the abnormality decidig region).

Figure 47:
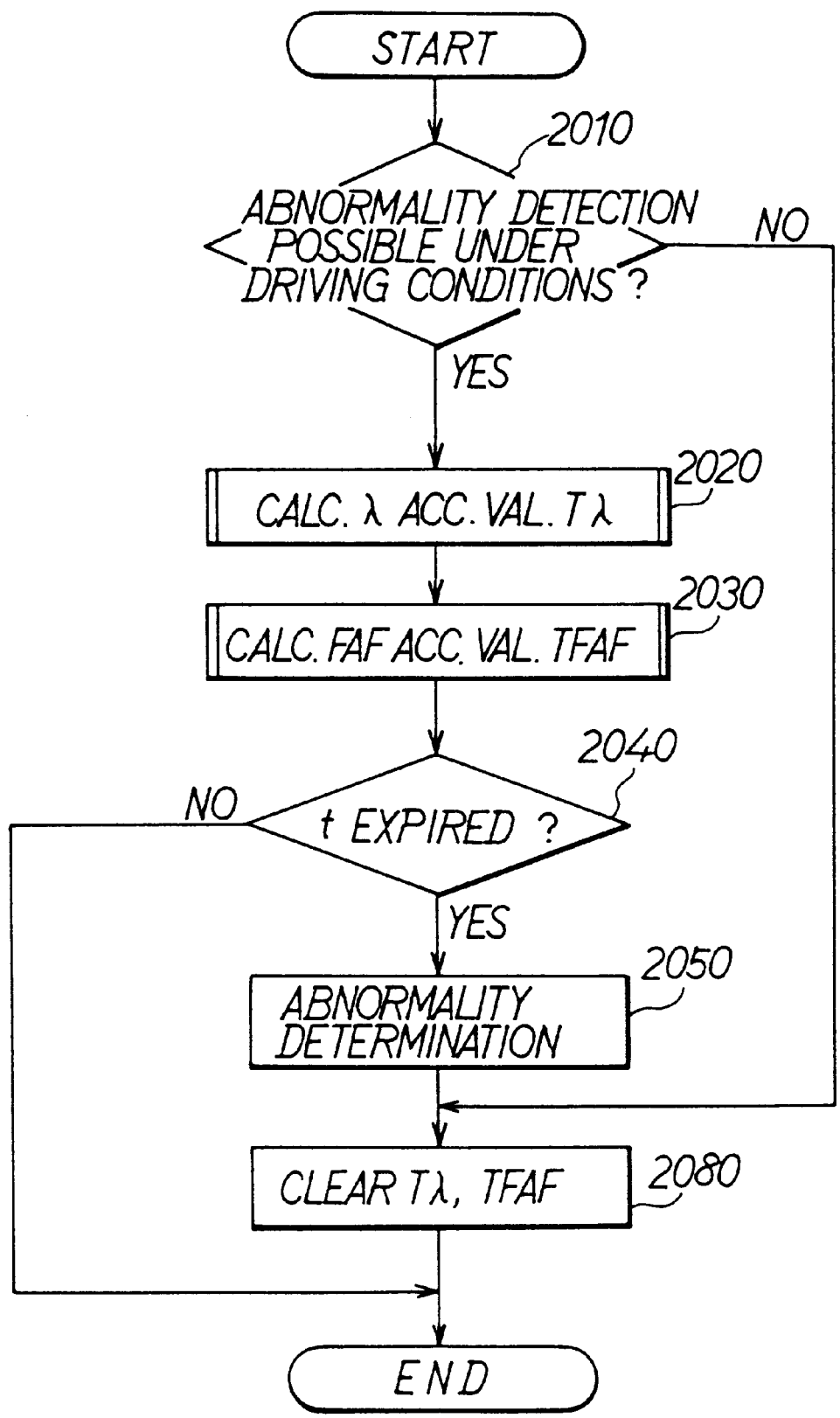
FIG. 47 is a flowchart showing a main routine for deciding an abnormality of the air/fuel ratio feedback control system in a thirteenth embodiment.

FIG. 47 is a flowchart showing an air/fuel ratio feedback system abnormality deciding routine in the present embodiment. This routine is executed for a period of 4 ms, for example, by the CPU 42. In the present embodiment, the routine of FIG. 47 corresponds to abnormality diagnosing means.

When the routine of FIG. 47 is started, The CPU 42 decides at Step 2010 whether or not the engine running state at present is in the state where its abnormality can be decided. At Step 2010, more specifically, it is decided whether or not the following conditions are satisfied:

that the A/F sensor 26 is in an active state (the element temperature of the sensor body 32 is not lower than 650° C. or that the element resistance of the A/F sensor 26 is not lower than 90 Ω);

that the intake air pressure is not lower than a predetermined level;

that the engine RPM Ne is not smaller than a predetermined value;

that the throttle opening TH is not smaller than a predetermined value;

that the engine is idling; and that a predetermined time duration has elapsed from the start of the air/fuel ratio feedback.

Figure 48:
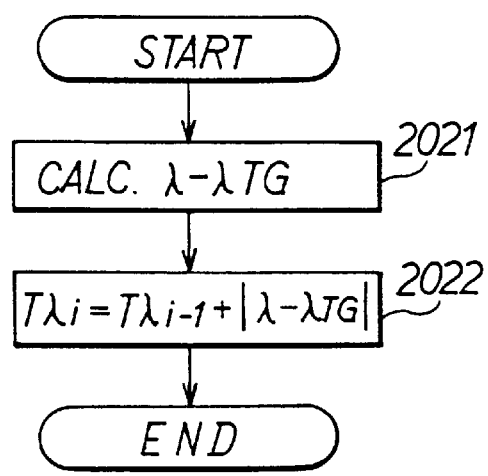
FIG. 48 is a flowchart showing a $\lambda$ accumulated value calculating subroutine in the thirteenth embodiment.

If the answer of Step 2010 is YES to allow the abnormality decision, the CPU 42 proceeds to Step 2020, where the λ accumulated value Tλ is calculated. Here, the λ accumulated values Tλ is calculated by a subroutine of FIG. 48, which corresponds to first element calculating means, as will be described. The CPU 42 calculates at Step 2021 of FIG. 48 the difference between the air/fuel ratio λ, as detected by the A/F sensor 26, and the target air/fuel ratio λTG. At subsequent Step 2022, the absolute value |λ−λTG| of the difference between the air/fuel ratio λ and the target air/fuel ratio λTG is added to the previous value Tλi−1 of the λ accumulated value to calculate the present value Tλi of the λ accumulated value (that is, Tλi=Tλi−1+|λ−λTG|.

Figure 49:
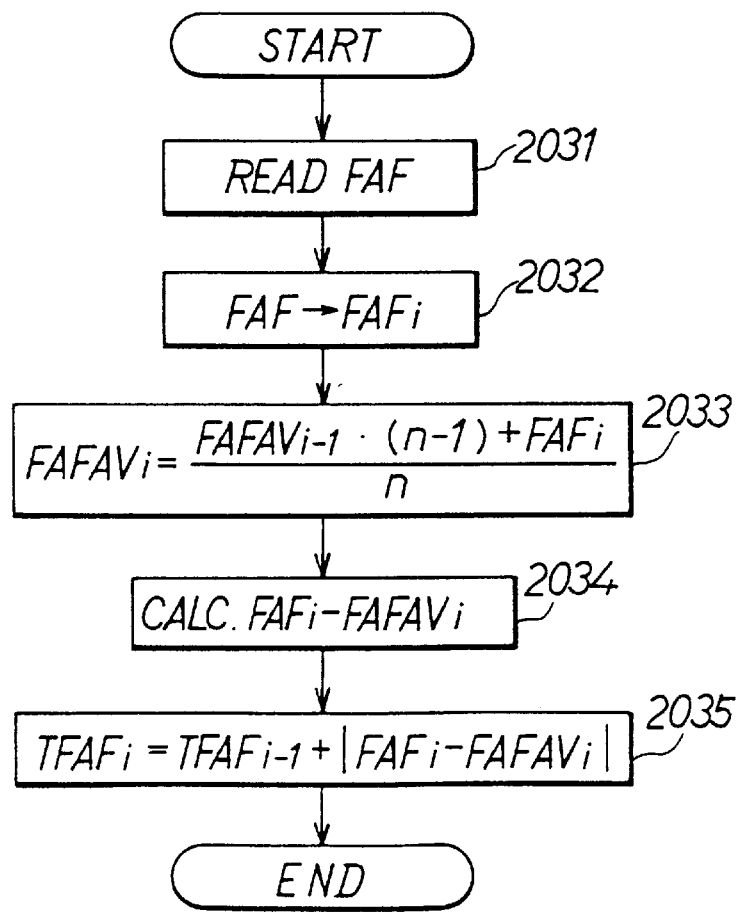
FIG. 49 is a flowchart showing a FAF accumulated value calculating subroutine in the thirteenth embodiment.

At Step 2030 of FIG. 47, the CPU 42 calculates the FAF accumulated value TFAF. Here, the FAF accumulated value TFAF is calculated by a subroutine of FIG. 49, which corresponds to second element calculating means, as will be described below. The CPU 42 reads in at Step 2031 of FIG. 49 the air/fuel ratio correction coefficient FAF, as determined according to the aforementioned procedure, and at subsequent Step 2032 sets the correction coefficient FAF to the present value FAFi of the air/fuel ratio correction coefficient.

The CPU 42 calculates at Step 2033 the (present) average value FAFAVi of the air/fuel ratio correction coefficient FAF by using a well-known rounding operation. Specifically, the average value FAFAVi is calculated by Equation (32):

$$FAFAVi = \{FAFAVi-1 \cdot (n-1) + FAFi\}/n \qquad (32)$$

In Equation (32), n=64, for example.

Then, the CPU 42 calculates at Step 2034 the difference between the (present) air/fuel ratio correction coefficient FAFi and its (present) average value FAFAVi, and adds at subsequent Step 2035 the absolute value |FAFi−FAFAVi| between the air/fuel ratio correction coefficient FAFi and its average value FAFAVi to the previous value TFAFi−1 of the FAF accumulated value, to calculate the present value TFAFi of the FAF accumulated value (that is, TFAFi= TFAFi−1+|FAFi−FAFAVi|.

After the procedures (for calculating the values Tλ and TFAF) of Steps 2020 and 2030 of FIG. 47, on the other hand, the CPU 42 decides at Step 2040 whether or not a predetermined time duration t (e.g., 1280 ms in the present embodiment) has elapsed from the previous abnormality deciding time. If this answer is NO, the present routine is ended as it is. In other words, for the time duration (of 1280 ms) while the answer of Step 2040 is NO, the accumulation of the difference of the air/fuel ratio λ and the accumulation of the difference of the air/fuel ratio correction coefficient FAF are repeatedly executed.

If the answer of Step 2040 is YES, on the other hand, the CPU 42 proceeds to Step 2050, where it executes the abnormality decision. This abnormality decision is executed according to the subroutine shown in FIG. 50.

This abnormality decision (of the subroutine shown in FIG. 50) is to decide the abnormality of the air/fuel ratio feedback control system by using the calculated λ accumulated value Tλ and FAF accumulated value TFAF. After this decision, the CPU 42 clears at Step 2080 of FIG. 47 the λ accumulated value Tλ and the FAF accumulated value TFAF to "0", and ends the present routine.

Figure 50:
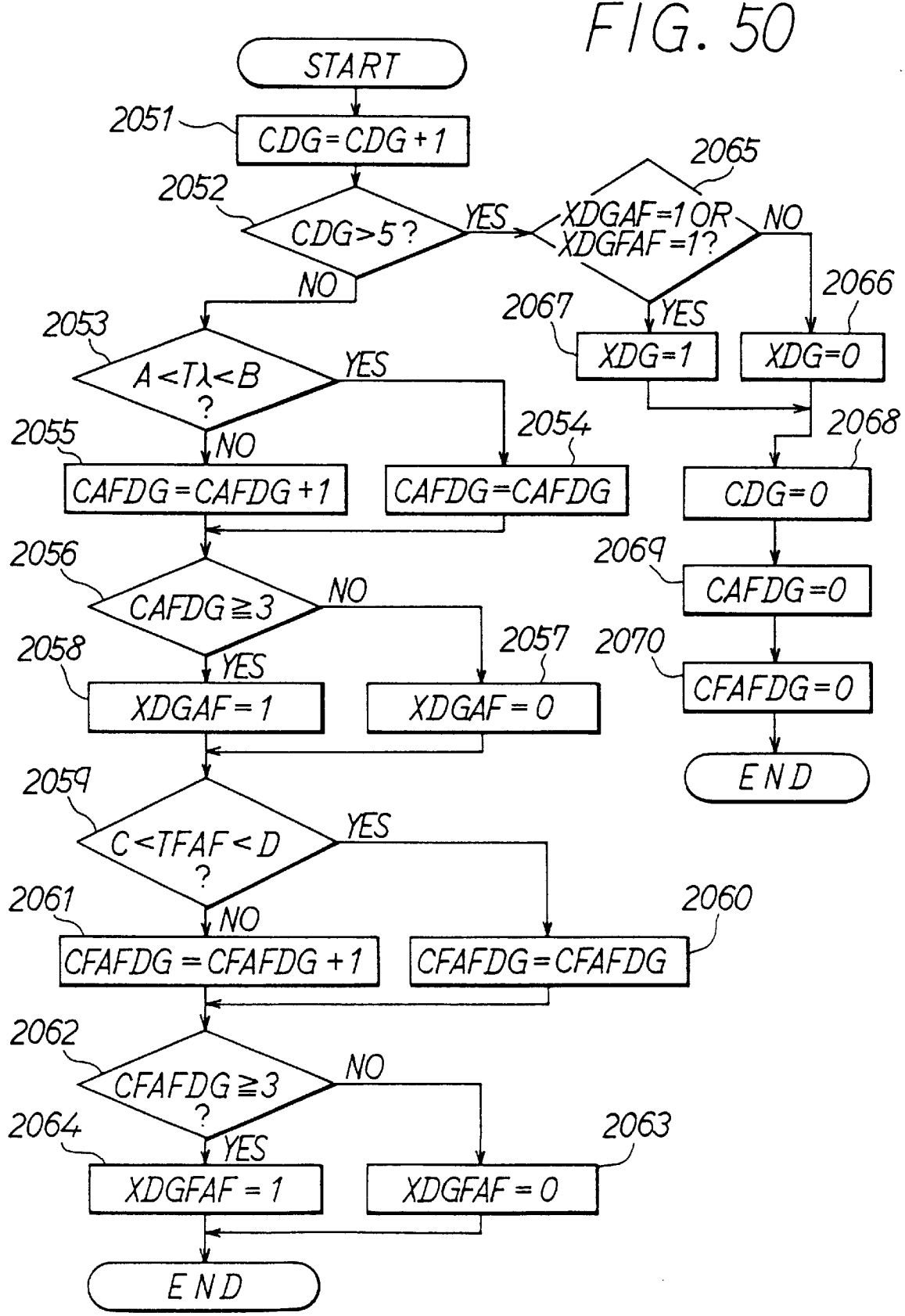
FIG. 50 is a flowchart showing an abnormality deciding subroutine in the thirteenth embodiment.

In FIG. 50, the CPU 42 increments at Step 2051 a processing counter CDG for indicating the number of executions of the abnormality decision by "1", and decides at subsequent Step 2052 whether or not the processing counter CDG exceeds "5". At the early stage of the processing, the answer of Step 2052 is NO, and the CPU 42 proceeds to Step 2053.

The CPU 42 decides at Step 2053 whether or not the λ accumulated value Tλ is within the normal region which is defined by the predetermined threshold values A and B. These threshold values A and B are indicated on the ordinate of FIG. 52. If A<Tλ<B, the CPU 42 leaves a λ abnormality deciding counter CAFDG as it is. If Tλ≦A or Tλ≧B, the CPU 42 increments at Step 2055 the λ abnormality deciding counter CAFDG by "1".

The CPU 42 decides at Step 2056 whether or not the λ abnormality deciding counter CAFDG is no less than "3". The CPU 42 clears at Step 2057 a λ abnormality decision flag XDGAF to "0", if CAFDG<3, but sets at Step 2058 to the λ abnormality decision flag XDGAF to "1" if CAFDG>3.

Then, the CPU 42 decides at Step 2059 whether or not the FAF accumulated value TFAF is within the normal region which is defined by the predetermined threshold values C and D. These threshold values C and D are shown on the abscissa of FIG. 52. If C<TFAF<D, the CPU 42 leaves at Step 2060 a FAF abnormality deciding counter CFAFDG as it is. If TFAF≦C or TFAF≧D, the CPU 42 increments at Step 2061 the FAF abnormality deciding counter CFAFDG by "1".

The CPU 42 decides at Step 2062 whether or not the FAF abnormality deciding counter CFAFDG is no less than "3". If CFAFDG<3, the CPU 42 clears at Step 2063 a FAF abnormality deciding flag XDGFAF to "0", and ends the present routine. If CAFDG≧3, on the other hand, the CPU 42 sets at Step 2064 the FAF abnormality decision flag XDGFAF to "1", and ends the present routine.

When the routine of FIG. 50 is repeatedly executed so that the answer of Step 2052 is YES, the CPU 42 proceeds to Step 2065 to decide whether or not either of the λ abnormality decision flag XDGAF or the FAF abnormality decision flag XDGFAF is set at "1". If both the flags XDGAF and XDGFAF are at "0", the CPU 42 proceeds to Step 2066 to clear a final abnormality decision flag XDG to "0". If at least either of the flag XDGAF or XDGFAF is set at "1", the CPU 42 proceeds Step 2067 to set the final abnormality decision flag XDG to "1". In accordance with the setting operation of the final abnormality decision flag XDG, although not shown, both the abnormality decision flags XDGAF and XDGFAF are cleared to "0".

Figure 52:
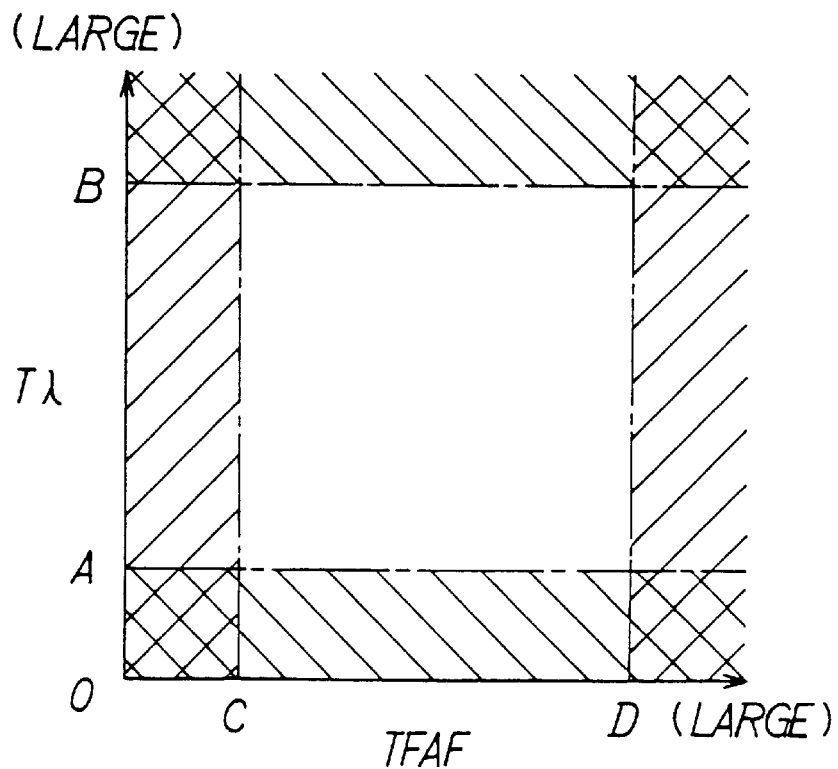
FIG. 52 is a graph showing regions defined by threshold values A, B, C and D for deciding the normality/abnormality of the $\lambda$ accumulated value and the FAF accumulated value in the thirteenth embodiment.
Figure 53:
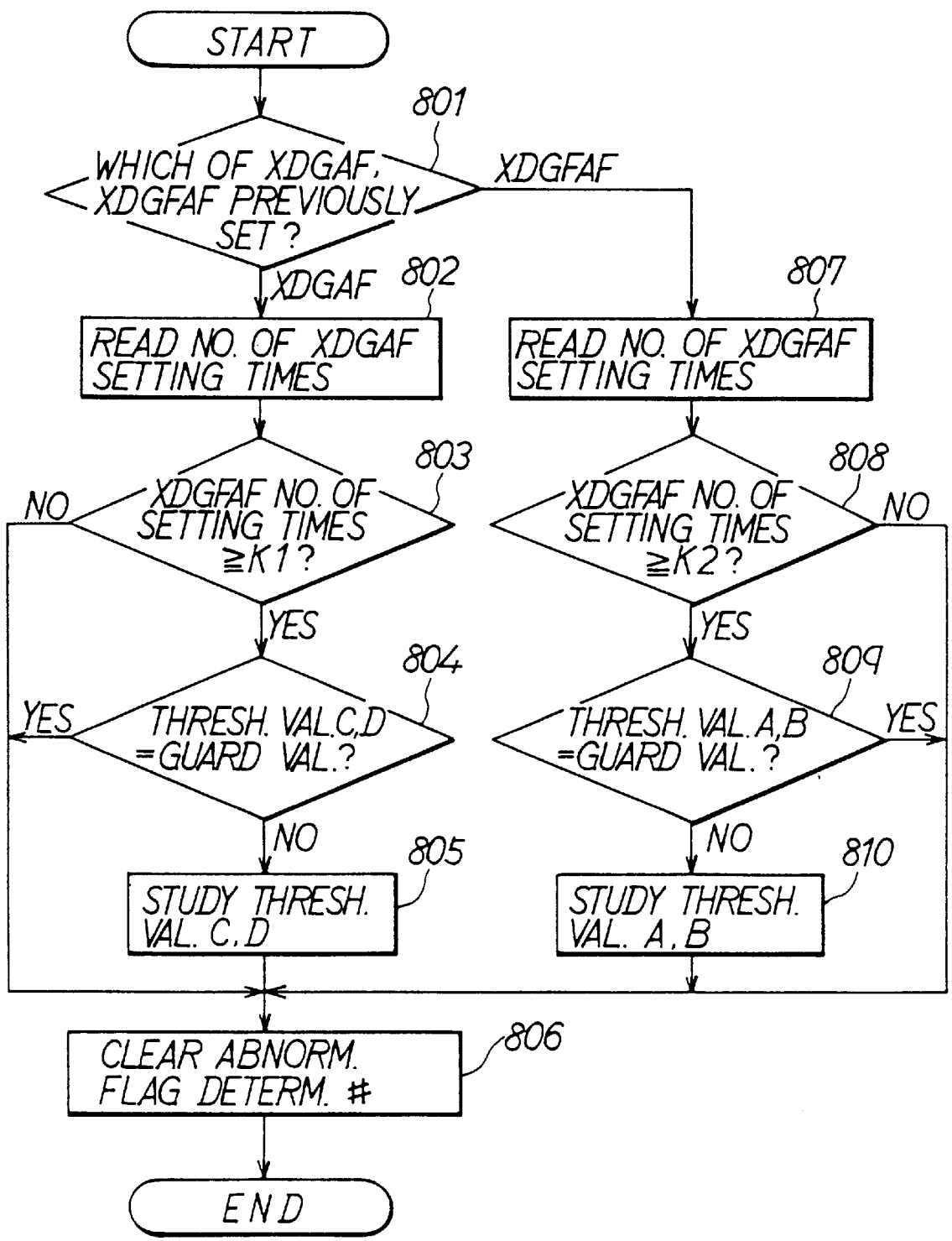
FIG. 53 is a flowchart showing a threshold value learning routine according to the thirteenth embodiment.

Here, XDG=0 means that the λ accumulated value Tλ and the FAF accumulated value TFAF are within the normal (center) region of FIG. 52, and XDG=1 means that the λ accumulated value Tλ and the FAF accumulated value TFAF are within the abnorma (hatched) region of FIG. 52.

Then, the CPU 42 clears at Step 2068 the processing counter CDG to "0"and clears at subsequent Step 2069 the λ abnormality deciding counter CAFDG to "0". The CPU 42 clears at Step 2070 the FAF abnormality deciding counter CFAFDG to "0", and ends the present routine. When the final abnormality decision flag XDG is determined, the CPU 42 executes the diagnosis processing by turning on the warning light 49 or stopping the air/fuel ratio feedback.

The abnormality deciding processing, as executed in the aforementioned manner, will now be described with reference to the graphs of FIGS. 53A–53H. Here, t1, t2, t3, t4, t5 and t6 designate timings at which the abnormality deciding routine of FIG. 50 is executed. In FIGS. 53A–53H, the processing counter CDG is incremented every 1,280 ms and is cleared to "0" when CDG=5 is reached.

For the time duration of t1 to t2 and for the time duration of t3 to t5, the air/fuel ratio λ varies a great deal with respect to the target air/fuel ratio λTG so that the λ accumulated value Tλ deviates from the allowable range (A to B) or the normal region. At the instants t2, t4 and t5, therefore, the λ abnormality deciding counter CAFDG is incremented one by one. At the instant t5 for CAFDG=3, the λ abnormality decision flag XDGAF is set at "1" (that is, at the instant t5, the answer of Step 2056 of FIG. 50 is YES).

For the time period on or before the instant t1, the time period from t1 to t3 and the time period from t4 to t5, the air/fuel ratio correction coefficient FAF varies a great deal with respect to its average value FAFAV so that the FAF accumulated value TFAF deviates from the allowable range (C to D) or the normal region. Thus, the FAF abnormality deciding counter CFAFDG is incremented one by one at the instants t1, t2, t3 and t5, and the FAF abnormality decision flag XDGFAF is set at "1" t1 at the instant t3 for CFAFDG=3 (that is, the answer of Step 2062 of FIG. 50 is YES).

At the instant t6 for CDG=5, the λ abnormality decision flag XDGAF and FAF abnormality decision flag XDGFAF are set at "1" so that the final abnormality decision flag XDG is set to "1".

In connection with the graphs of FIGS. 53A–53H, the case where both the λ abnormality (of A/F sensor 26) and the FAF abnormality (of the feedback gain by the CPU 42) occur substantially simultaneously has been described. In an actual application, however, it is more frequent that one abnormality occurs to cause the other abnormality.

In the air/fuel ratio control system of the present embodiment, therefore, after the detection of either the λ abnormality or the FAF abnormality, the threshold values A, B, C and D for deciding the λ abnormality and the FAF abnormality are learned, as will be described in detail. In this construction, although not shown, there are continuously counted the number of settings of the λ abnormality decision flag XDGAF at "1" (i.e., the number of affirmations of Step 2056 of FIG. 50) and the number of settings of the FAF abnormality decision flag XDGFAF at "1" (i.e., the number of affirmations of Step 2062 of FIG. 50), and the counted values are stored in the RAM 44.

The flowchart of FIG. 54 is a threshold value learning routine for learning the threshold values A, B, C and D to decide the normality/abnormality of the λ accumulated value Tλ and the FAF accumulated value TFAF based on the operation states of the λ abnormality decision flag XDGAF and the FAF abnormality decision flag XDGFAF. This routine is executed for a period of 10 minutes by the CPU 42. In the present embodiment, the routine of FIG. 54 corresponds to decision region learning means.

When the routine of FIG. 54 is started, the CPU 42 decides at Step 801 which of the λ abnormality decision flag XDGAF and the FAF abnormality decision flag XDGFAF is determined earlier for the time periods of the previous processing and the present processing. If neither of the flags is determined, the CPU 42 ends the routine as it is (although not shown).

If the λ abnormality decision flag XDGAF is earlier determined, the CPU 42 proceeds to Step 802 to read in the number of determining the flag XDGAF and further to Step 803 to decide whether or not the determined number reaches a predetermined value K1. At Step 804, the CPU 42 decides whether or not the threshold values C and D reach a preset guard value, that is, whether or not the threshold values C and D are excessively learned.

If the answer of Step 803 is YES and if the answer of Step 804 is NO, the CPU 42 proceeds to Step 805. If the answer of Step 803 is NO or if the answer of Step 804 is YES, on the other hand, the CPU 42 bypasses Step 805 and proceeds to Step 806.

At Step 805, the CPU 42 executes the learning of the threshold values C and D. If the air/fuel ratio λ (by the A/F sensor 26) becomes abnormal, an abnormal symptom may be appear in the air/fuel ratio correction coefficient FAF which should be intrinsically normal. In order to prevent this appearance, therefore, the normal region, as defined by the threshold values C and D, is widened. Specifically, the threshold value C is decreased whereas the threshold value D is increased, as shown in FIG. 52. Then, the learning of the threshold values C and D for widening the normal region may be executed exclusively for one threshold value C or D.

Then, the CPU 42 at Step 806 clears the numbers of determinations of the abnormality decision flags XDGAF and XDGFAF, and ends the present routine.

If the FAF abnormality decision flag XDGFAF is earlier determined, on the other hand, the CPU 42 proceeds to Step 807 to read in the number of determinations of the flag XDGFAF and decides at Step 808 whether or not the number of determinations reaches a predetermined value K2. The CPU 42 further decides at Step 809 whether or not the threshold values reaches a preset guard value, that is, whether or not the threshold values A and B are excessively learned.

If the answer of Step 808 is YES and if the answer of Step 809 is NO, the CPU 42 proceeds to Step 810. If the answer of Step 808 is NO or if the answer of Step 809 is YES, on the other hand, the CPU 42 bypasses the Step 810 and proceeds to Step 806.

The CPU 42 executes at Step 810 the learning of the threshold values A and B. If the air/fuel ratio correction coefficient FAF (i.e., the feedback gain) becomes abnormal, an abnormal symptom may appear in the air/fuel ratio $\lambda$ which should be intrinsically normal. In order to prevent this appearance, therefore, the normal region, as defined by the threshold values A and B, is widened. Specifically, the threshold value A is decreased whereas the threshold value B is increased, as shown in FIG. 52. Then, the learning of the threshold values C and D for widening the normal region may be executed exclusively for one threshold value C or D.

The following effects can be achieved according to the present embodiment thus far described in detail.

(a) In the present embodiment, the difference (i.e., the $\lambda$ accumulated value $T\lambda$) between the air/fuel ratio $\lambda$, as detected by the A/F sensor 26, and the target air/fuel ratio $\lambda TG$ is calculated, and the difference (i.e., the FAF accumulated value TFAF) between the air/fuel ratio correction coefficient FAF and its average value FAFAV is also calculated. The abnormality of the air/fuel ratio feedback control system is diagnosed by causing those calculated abnormality deciding elements (i.e., the $\lambda$ accumulated value $T\lambda$ and the FAF accumulated value TFAF) to correspond to the normality/abnormality deciding regions (as in to FIG. 52), as individually defined by the two threshold values.

Thus, it is possible to provide a system which can execute an easy and clear abnormality decision unlike the existing abnormality deciding system by making a collation between the abnormality deciding element and the normality/abnormality deciding region. As a result, the abnormality of the air/fuel ratio feedback control system, including the abnormality of the A/F sensor 26 and the control abnormality by the microprocessor (ECU 41), can be accurately diagnosed to contribute to an improvement in the control accuracy of the control system.

(b) For the abnormality diagnosis, moreover, the difference between the air/fuel ratio $\lambda$, as detected by the A/F sensor 26, and the target air/fuel ratio $\lambda TG$, and the difference between the air/fuel ratio correction coefficient FAF and its average value FAFAV, are sequentially accumulated, and these accumulation results (i.e., the $\lambda$ accumulated value $T\lambda$ and the FAF accumulated value TFAF) are employed as the abnormality deciding elements (i.e., TX=the first abnormality deciding element, and TFAF=the second abnormality deciding element). Thus, it is possible to achieve the proper air/fuel ratio data and the air/fuel ratio correction data. Since the abnormality diagnosis is executed on the basis of the accumulated values of the individual data, it is hardly influenced by the external disturbance (e.g., the temporary disturbances of the sensor output and the correction coefficient).

(c) In the present embodiment, moreover, if the abnormality deciding elements are decided to belong to the abnormality deciding regions by a predetermined number of times (e.g., three times in the present embodiment) or more within a predetermined number of abnormality diagnosing times (e.g., CDG=five times in the present embodiment), it is finally diagnosed that the air/fuel ratio feedback control system is abnormal. In this case, the reliability of the abnormality diagnosis can be improved better that the case where the abnormality diagnosis for each routine is employed as the final result.

(d) In the region where the $\lambda$ accumulated value $T\lambda$ and the FAF accumulated value TFAF are smaller than the predetermined values (i.e., $T\lambda \leq A$ and $TFAF \leq C$), referring to FIG. 52, a determination that the air/fuel ratio feedback control system is normal is inhibited. That is, the region where the variation of the air/fuel ratio $\lambda$ and the variation of the air/fuel ratio correction coefficient FAF are small, the reliability of the abnormality diagnosis using those data is so low that the abnormality may possibly be overlooked. If the aforementioned decision of the normality is inhibited, the erroneous detection of the abnormality diagnosis can be prevented to enhance the reliability.

(e) In the present embodiment, moreover, the normality/abnormality deciding region is learned to enlarge the normality deciding region (i.e., the region from C to D in FIG. 52), if an abnormality is detected on the basis of the $\lambda$ accumulated value $T\lambda$. If an abnormality is detected on the basis of the FAF accumulated value TFAF, on the other hand, the normality/abnormality is learned to enlarge the normality deciding region (i.e., the region from A to B in FIG. 52) relating to the air/fuel ratio $\lambda$.

When the abnormality of the A/F sensor 26 or the control abnormality in the ECU 41 occur, it is thought that the occurrences of both abnormalities are less frequent than the occurrence of one. If the A/F sensor 26 or the ECU 41 becomes abnormal, it causes an abnormal symptom in the other. In the aforementioned construction, therefore, when one abnormality is detected, the region for deciding the other normality is enlarged to loosen the abnormality deciding conditions. As a result, the abnormality, as really occurring, can be diagnosed in a manner to reflect it directly. Moreover, the content of the abnormality can be more accurately specified.

Fourteenth Embodiment

A fourteenth preferred embodiment of the present invention will be described with reference to FIGS. 55–58. In the construction of the present embodiment, however, the portions equivalent to those of the aforementioned thirteenth embodiment are designated by the same reference numerals while their description is omitted, and the differences from the thirteenth embodiment will be emphasized.

Figure 56:
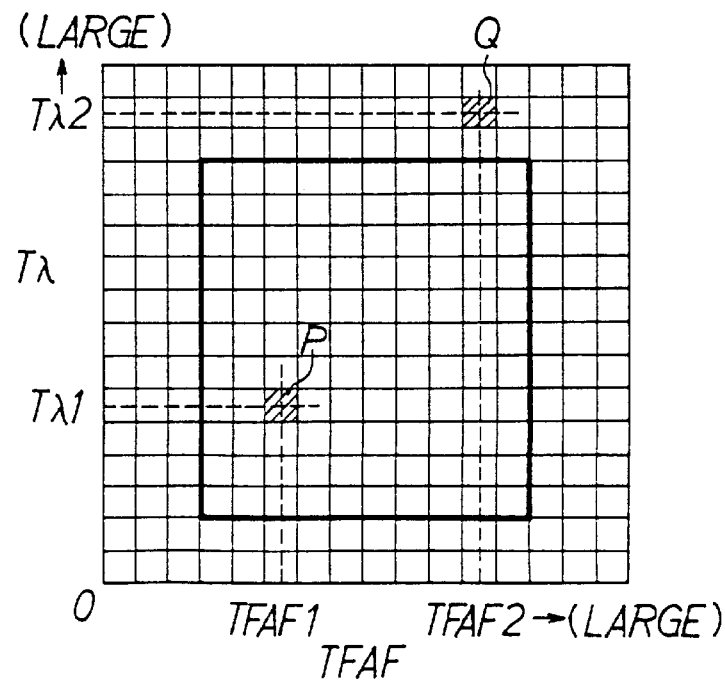
FIG. 56 is a normality/abnormality deciding graph divided into small regions in accordance with the $\lambda$ accumulated value and the FAF accumulated value in the fourteenth embodiment.

In the present embodiment, the abnormality deciding processing is executed by using the normality/abnormality deciding graph of FIG. 56 in which the $\lambda$ accumulated value $T\lambda$ and FAF accumulated value TFAF are employed as the abnormality deciding elements. In FIG. 56, more specifically, the X accumulated value $T\lambda$ is equally divided into a plurality of regions (e.g., sixteen regions in FIG. 56) by a number of threshold values, and the FAF accumulated value TFAF is equally divided into a plurality of regions (e.g., sixteen regions in FIG. 56) by a number of threshold values. As a result, 16×16=256 of small regions are formed in the entire graph.

In this case, the individual small regions (i.e., 10×10=100 of small regions), as located within the thick frame of the same graph, are determined as the normal regions whereas the individual small regions outside of the thick frame are determined as the abnormal regions. In the present embodiment, moreover, the abnormality decision is made according to which of the normal/abnormal regions the individual values T$\lambda$ and TFAF belong. Incidentally, the graph of FIG. 56 is stored and held in the backup RAM 45 acting as a memory.

Figure 55:
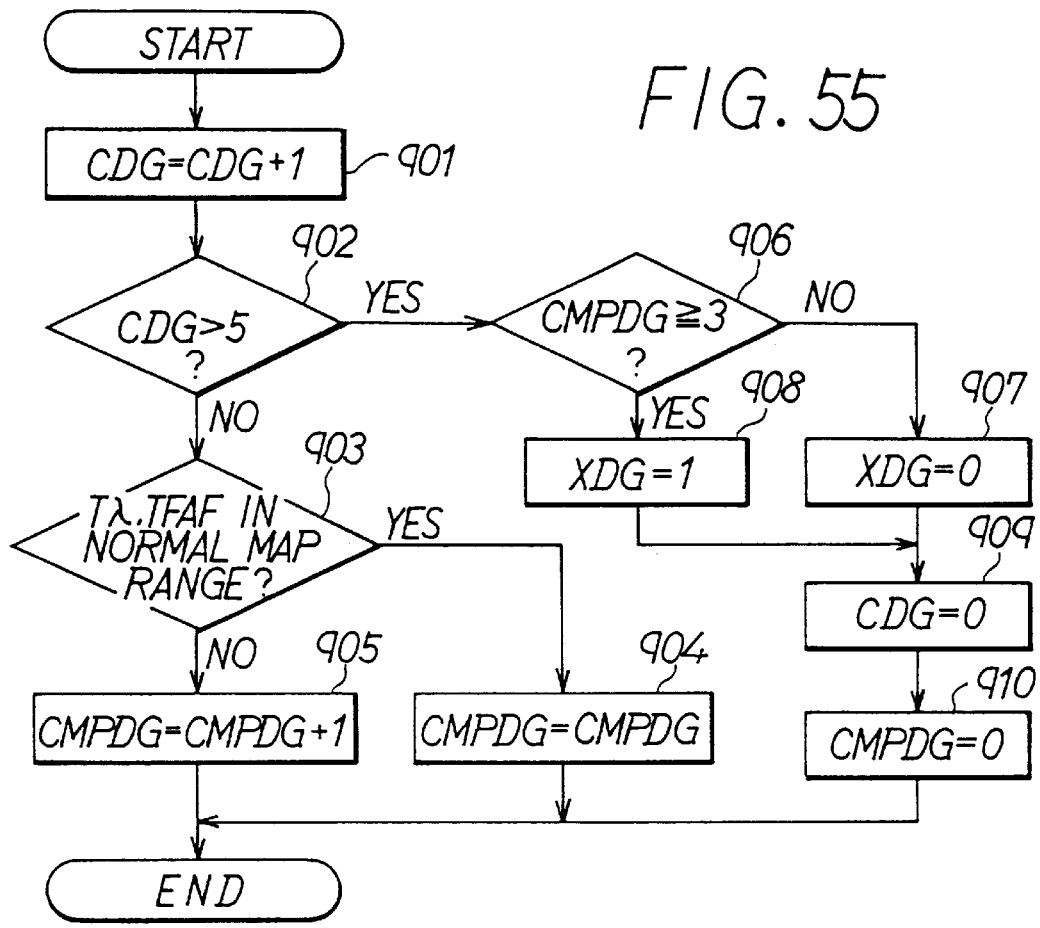
FIG. 55 is a flowchart showing an abnormality deciding subroutine according to a fourteenth preferred embodiment of the present invention.

FIG. 55 is a flowchart showing an abnormality deciding routine in the present embodiment. This routine is replaced by the routine of FIG. 50 (i.e., the processing of Step 2050 of FIG. 47) in the foregoing thirteenth embodiment.

When the routine of FIG. 55 is started, the CPU 42 increments at Step 901 the processing counter CDG indicating the number of executions of the abnormality deciding processing by "1", and decides at Step 902 whether or not the processing counter CDG exceeds "5". At the initial stage of the start of the processing, the answer of Step 902 is NO so that the CPU 42 proceeds to Step 903.

The CPU 42 decides at Step 903 whether or not the $\lambda$ accumulated value T$\lambda$ and the FAF accumulated value TFAF$\lambda$ are within the normal region on the graph of FIG. 56. Specifically, if T$\lambda$=T$\lambda$1 and TFAF=TFAF1 on the graph of FIG. 56, a small region P of the normal region (within the thick frame) is selected so that it is decided to be normal. If T$\lambda$=T$\lambda$2 and TFAF=TFAF2, a small region Q within the abnormal region (outside of the thick frame) is selected so that it is decided to be abnormal.

Thus, if the values T$\lambda$ and TFAF are within the normal region and if the answer of Step 903 is YES, the CPU 42 proceeds to Step 904 to leave an abnormality deciding counter CMPDG as it is. If the values T$\lambda$ and TFAF are within the abnormal region and if the answer of Step 903 is NO, on the other hand, the CPU 42 proceeds to Step 905 to increment an abnormality deciding counter CMPFDG by "1".

Then, the routine of FIG. 55 is repeatedly executed. If the answer of Step 902 is accordingly YES, the CPU 42 proceeds to Step 906 to decide whether or not the abnormality deciding counter CMPDG is no less than "3". If CMPDG<3, moreover, the CPU 42 clears at Step 907 the final abnormality decision flag XDG to "0". If CAFDG≧3, the CPU 42 sets at Step 908 the final abnormality decision flag XDG to "1".

Then, the CPU 42 clears at Step 909 the processing counter CDG to "0". The CPU 42 clears at Step 910 the abnormality deciding counter CMPDG to "0", and ends the present routine.

Figure 57:
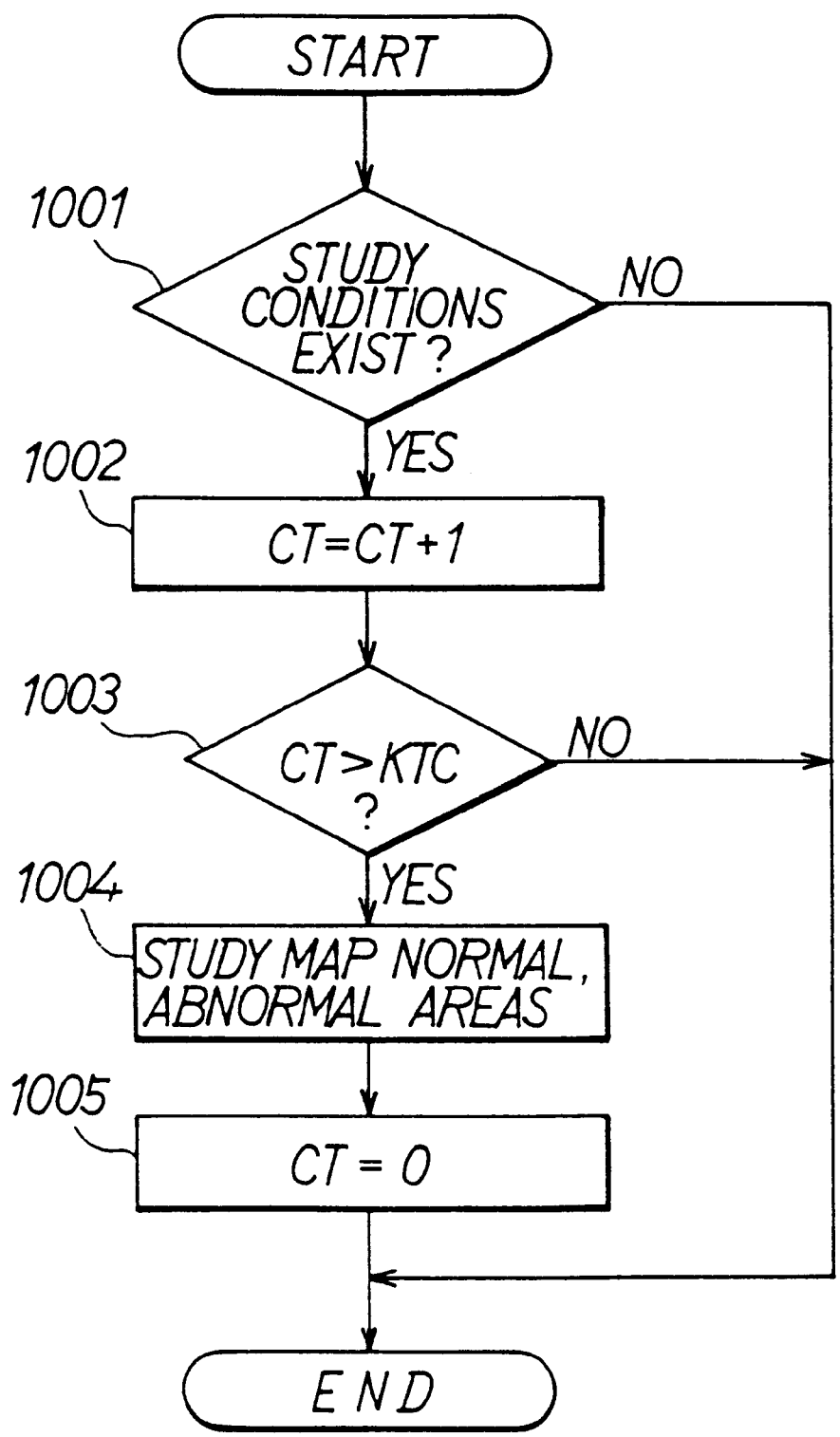
FIG. 57 is a flowchart showing a decision region learning routine in the fourteenth embodiment.

On the other hand, FIG. 57 is a flowchart showing a equation learning routine for learning the normal/abnormal regions in the graph of FIG. 56. This routine is executed for a predetermined period by the CPU 42. In the present embodiment, the routine of FIG. 57 corresponds to decision region learning means.

In FIG. 57, the CPU 42 decides at Step 1001 whether or not the conditions (i.e., the learning conditions) for Alearning the normality/abnormality deciding regions of the graph. These learning conditions include that the small regions to be decided to be normal or abnormal are highly different every time, that both the $\lambda$ accumulated value T$\lambda$ and the FAF accumulated value TFAF are kept at a small value, and so on. If these learning conditions are satisfied, a proper abnormality decision may possibly be unexecuted, and the answer of Step 1001 is affirmed because the individual normal/abnormal small regions in the graph of FIG. 56 should be learned.

If the learning conditions are satisfied so that the answer of Step 1001 is YES, the CPU 42 proceeds to Step 1002 to increment a counter CT by "1". The CPU 42 decides at subsequent Step 1003 whether or not the numerical value of the counter CT is larger than a predetermined decision value KCT. Only if the answer of Step 1003 is YES, the CPU 42 executes at Step 1004 the learning routine of the normality/abnormality decision graph shown in FIG. 56.

The CPU 42 clears at subsequent Step 1005 the counter CT to "0", and then ends the present routine. If the answers of Steps 1001 and 1003 are NO, the CPU 42 ends the present routine without any action and does not execute the equation learning routine.

Figure 58A:
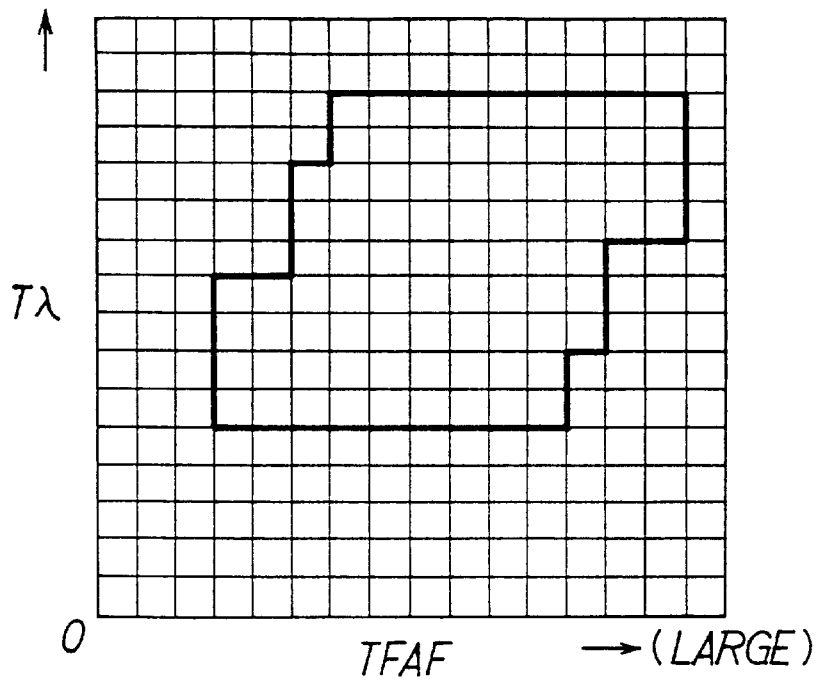
FIGS. 58A and 58B are normality/abnormality deciding graphs showing the result which is learned by the routine of FIG. 57.
Figure 58B:
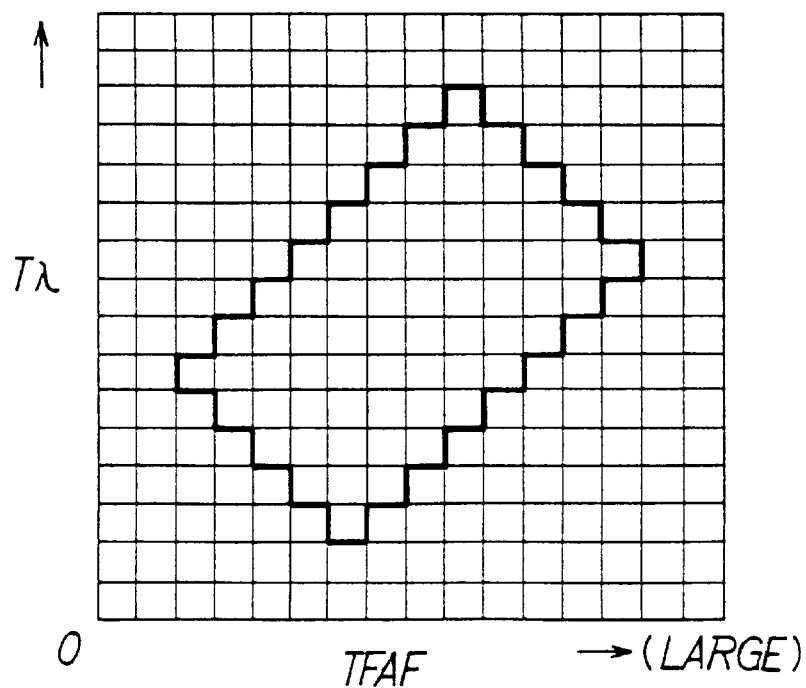

An example of learning the normality/abnormality equation is illustrated in FIGS. 58A and 58B, where the inside of a thick frame indicates the normal region, and the outside of the thick frame indicates the abnormal region. These regions may be updated for every small regions or for the numerous small regions altogether. At this learning time, moreover, the number of small regions for the normal region may be fixed (to one hundred, for example, in FIG. 56) or unfixed.

The present fourteenth embodiment can achieve the object of the present invention and the following effects in addition to those described before.

(a) In the present embodiment, the abnormality of the air/fuel ratio feedback control system is decided on the normality/abnormality deciding graph corresponding to the abnormality deciding elements (i.e., the $\lambda$ accumulated value T$\lambda$ and the FAF accumulated value TFAF). Thus, the decision of the normality/abnormality decision regions can be more easily realized.

(b) In the graph of FIG. 56, on the other hand, there are formed a number (i.e., 16×16=256 in the present embodiment) of small regions which are equally divided to correspond to the $\lambda$ accumulated values T$\lambda$ and FAF accumulated values TFAF individually, so that the data indicating the normality or the data indicating the abnormality are stored for the individual small regions. Thus, closer normality/abnormality decisions can be executed than the case where the normality/abnormality decision regions are formed in larger regions (e.g., 4×4=16 regions).

(c) In the present embodiment, moreover, the normal or abnormal data of the normality/abnormality decision equation are learned, if necessary. Thus, a more accurate abnormality diagnosis can be executed even when an abnormality of one (e.g., the A/F sensor 26 or the ECU 41) influences the other to have an abnormal symptom.

Although the present invention has been fully described in connection with the preferred embodiments thereof with reference to the accompanying drawings, it is to be noted that various changes and modifications will become apparent to those skilled in the art. For example:

(1) Although, according to the above-described first through seventh embodiments, the sensor diagnosis of the present invention is embodied in an air-fuel ratio control system that uses a modern control theory to achieve air-fuel ratio feedback control, the sensor diagnosis operation of the invention may be embodied in other systems performing other types of control such as PID control and the like.

(2) Although, according to the first through seventh embodiments, the diagnosis operation of the invention is implemented for increasing correction (the coolant temperature-dependent increasing control, the high-load increasing control), the diagnosis operation of the invention may also be embodied for reducing correction. For example, in an air-fuel ratio control system comprising an evaporation purge mechanism for purging evaporated fuel from a fuel tank into an intake system of an internal combustion engine, the amount of fuel to be injected from the fuel injection valve 7 is corrected to a reduced amount in accordance with the amount of evaporated fuel purged into the intake system. If the diagnosis operation of the invention is embodied in such a system, abnormality of the air-fuel ratio sensor will be detected on the basis of the change of the air-fuel ratio $\lambda$ outputted from the air-fuel ratio sensor during the reducing correction.

(3) Although the above-described first through seventh embodiments use the elapse of a predetermined length of time following the start of the air-fuel ratio feedback as a precondition for starting the diagnosis operation, this precondition may be changed to the elapse of a predetermined length of time following the start of the engine (switching-on of the power). Furthermore, this precondition may also be omitted.

(4) In the eighth embodiment, the second order derivatives $\Delta^2\lambda$SM and $\Delta^2$FAFSM, as corresponding to the accelerations of the air/fuel ratio $\lambda$ and the FAF value, are calculated by using the aforementioned Equations (14) and (15). For these calculations of the second derivatives, the following fundamental Equations (33) and (34) may be used:

$$\Delta^2\lambda SM_i = (\lambda SM_i - \lambda SM_{i-n}) - (\lambda SM_{i-n} - \lambda SM_{i-m-n}) \quad (33)$$

and $$\Delta^2 FAFSM_i = (FAFSM_i - FAFSM_{i-n}) - (FAFSM_{i-n} - FAFSM_{i-m-n}) \quad (34)$$

(where m=1, 2, 3 . . . and n=1, 2, 3 . . . ). What has been executed in the eighth embodiment is to set m=1 and n=1 in the fundamental equations, and these values m and n may be changed.

(5) In the foregoing eighth embodiment, the changing rate of the detected air/fuel ratio is exemplified by the accumulated value $\Delta|\Delta^2\lambda SM|$ of the second derivative $\Delta^2\lambda$SM of the $\lambda$SM value, and the changing rate of the air/fuel ratio correction coefficient is exemplified by the accumulated value $\Sigma|\Delta^2 FAFSM|$ of the second derivative $\Delta^2$FAFSM of the FAFSM value, and the sensor abnormality is diagnosed depending upon whether or not the following Inequality (35) is satisfied:

$$\Sigma|\Delta^2 FAFSM|/\Sigma|\Delta^2\lambda SM| < \alpha \quad (35)$$

This construction may be modified, as follows. The second derivative $\Delta^2\lambda$SM (not accumulated) of the $\lambda$SM value may be employed as the changing rate of the detected air/fuel ratio, and the second derivative $\Delta^2$FAFSM (not accumulated) of the FAFSM value is used as the changing rate of the air/fuel ratio correction coefficient, so that the sensor abnormality may be diagnosed depending upon whether or not the following Inequality is satisfied:

$$\Delta^2 FAFSM/\Delta^2\lambda SM < \alpha' \quad (36)$$

In the ninth to eleventh embodiments, too, the sensor abnormality may be diagnosed by using the values which are left unaccumulated for the predetermined time periods. If the abnormality diagnosis is executed in these constructions, the individual numerical values before accumulated become the changing rates, and their ratio becomes the abnormality diagnosing parameter so that the object of the present invention can also be achieved by the constructions.

Figure 44:
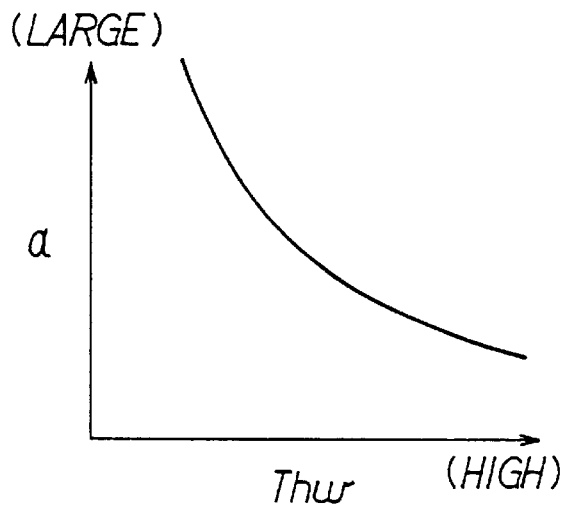
FIG. 44 is a graph for setting the abnormality deciding value a in other embodiments of the present invention.
Figure 45:
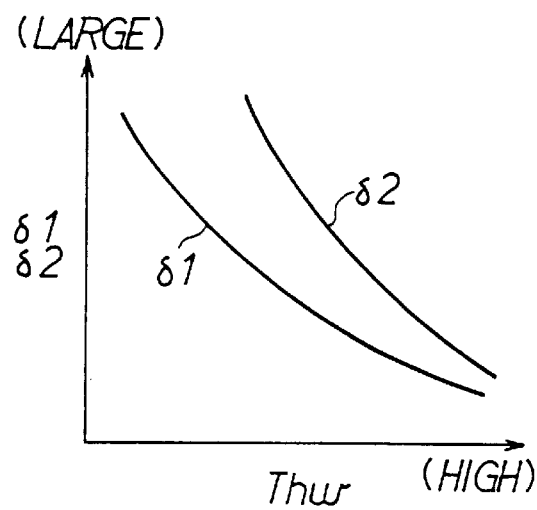
FIG. 45 is a graph for setting the abnormality deciding values $\delta 1$ and $\delta 2$ variables in other embodiments.

(6) At the variable settings of the abnormality deciding values ($\alpha$, $\beta 1$, $\beta 2$, $\gamma$, $\delta 1$ and $\delta 2$), in the foregoing individual embodiments, the abnormality deciding values are changed to increase the more for the larger loading quantities of state $\Sigma$PM and $\Sigma$Ne, but these settings may be modified, as follows. As shown in FIG. 44, for example, the abnormality deciding value $\alpha$ (or $\beta 1$, $\beta 2$ or $\gamma$) may become smaller for a larger cooling water temperature Thw. As shown in FIG. 45, moreover, the abnormality deciding values $\delta 1$ and $\delta 2$ for setting the normal region may become smaller for a larger cooling water temperature Thw.

(7) In the foregoing eighth through eleventh embodiments, the filtering operations of Steps 1603 and 1606 of FIG. 29 are executed to eliminate the dispersion of the air/fuel ratio $\lambda$ and the FAF value among the engine cylinders. These operations may be modified into other smoothing operations such as smoothing operations of n times (n=16, 64 or the like). Moreover, these filtering (or smoothing) operations are not necessarily essential and may be omitted while still embodying the present abnormality diagnosing system.

(8) In the routine of FIGS. 29 and 30, the counters CDG1 to CDG4 are used to execute the abnormality decision but may be simplified. Specifically, the continuous normality deciding counter CDG4 may be omitted to keep the state which is established once the abnormality decision flag XDGAF was set. Moreover, the specific values of the predetermined values KX1 to KX4 for deciding the counted values of the individual counters CDG1 to CDG4 should not be limited to the above-specified values but can be arbitrarily changed. In order to improve the sensor abnormality diagnosing accuracy, it is effective to elongate the counted time period of the accumulated time counter CDG1 (or the counter CDGO of FIG. 39) or to increase the number of times of the abnormality diagnosis executing counter CDG2 and the abnormality deciding counter CDG3.

(9) Moreover, the predetermined individual values KX1 to KX4 may be set variable at each time according to the engine running state such that they are set to relatively small values for a steady run of the engine whereas they are set to relatively large value ues for a transient run of the engine.

(10) In the embodiment where the abnormality diagnosis is executed depending upon whether or not the abnormality diagnosing parameter is within the predetermined normal range, as described in the twelfth embodiment, the abnormality diagnosing parameter may be modified into the amplitude of the air/fuel ratio fluctuation or the ratio of the amplitudes of the FAF fluctuation.

(11) In the foregoing eighth through twelfth embodiments, the abnormality diagnosis is executed for the air/fuel ratio sensor (i.e., the A/F sensor 26) made of a limit current type oxygen sensor. An abnormality diagnosis similar to those of the foregoing embodiments can be applied to an air/fuel ratio sensor made of a pumping current type oxygen sensor.

(12) In the foregoing eighth through eleventh embodiments, the sensor abnormality diagnosis of the present invention is embodied by the air/fuel ratio control system which realizes the air/fuel ratio feedback control by using the modern control theory. However, the present invention may naturally be embodied by a system according to another control (e.g., the PID control).

Figure 59:
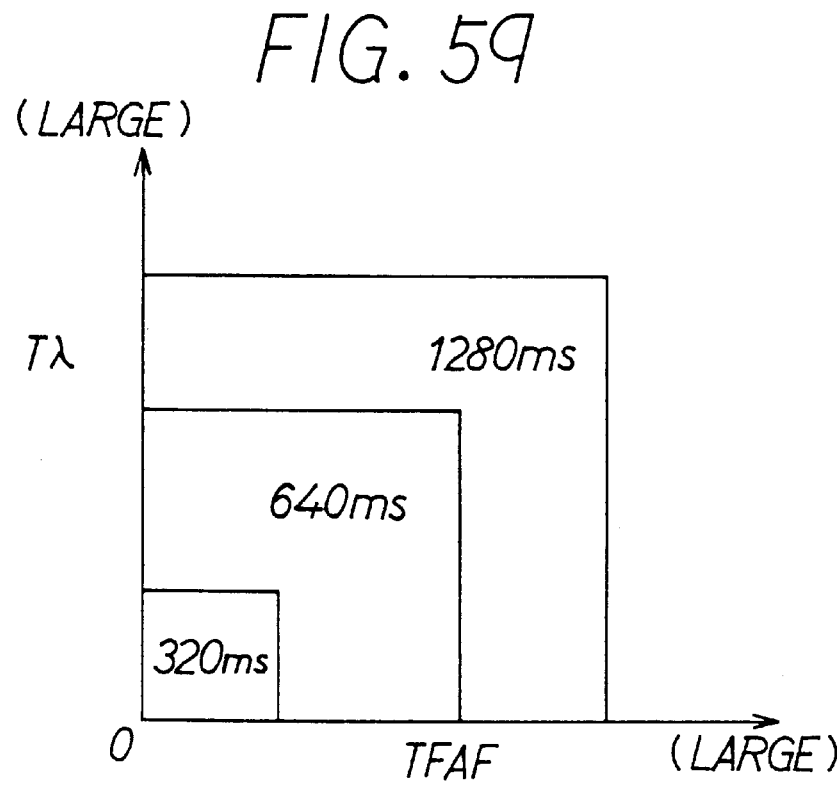
FIG. 59 is a graph for determining the accumulated time durations of the values T$\lambda$ and TFAF according to the $\lambda$ accumulated value and the FAF accumulated value in the fourteenth embodiment.

(13) In the foregoing thirteenth and fourteenth embodiments, the $\lambda$ accumulated value T$\lambda$ and the FAF accumulated value TFAF for the time period of 1,280 ms are calculated so that the abnormality decision is executed by using the calculation results. However, the time period for calculating the λ accumulated value Tλ and the FAF accumulated value TFAF may be shortened or elongated. As illustrated in FIG. 59, for example, the time period for calculating the λ accumulated value Tλ and the FAF accumulated value TFAF may be changed (as illustrated by 320 ms, 640 ms and 1,280 ms) according to these accumulated values. Then, for the longer λ accumulated value Tλ and FAF accumulated value TFAF, it is more likely that the engine running state is transient, so that the accumulation time period is elongated.

Figure 60:
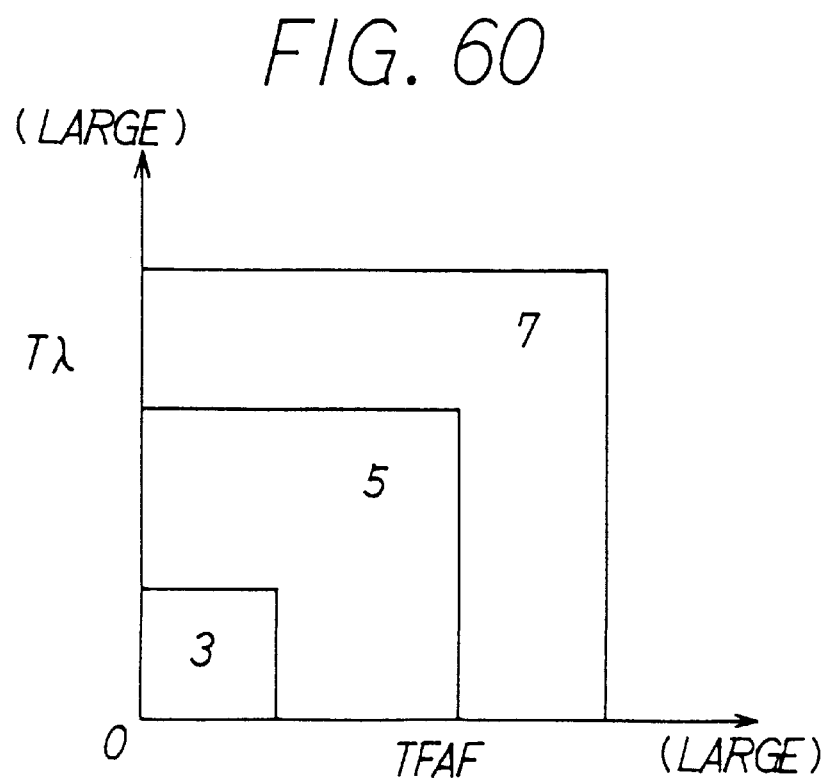
FIG. 60 shows a graph for determining the number of abnormality decisions in accordance with the $\lambda$ accumulated value and the FAF accumulated value in the fourteenth embodiment.

(14) In the foregoing thirteenth and fourteenth embodiments, the number of executions of the abnormality decision is 5 (as should be referred to the routine of FIG. 47). If the abnormality is decided three times or more for the five executions, it is finally decided that the air/fuel ratio feedback control system is abnormal. The number of executions of the abnormality decision may be changed as illustrated in FIG. 60. In FIG. 60, the number of executions are set to 3, 5 and 7 times according to the λ accumulated value Tλ and the FAF accumulated value TFAF. For the larger values Tλ and TFAF, it is estimated that the engine running state is the more transient so that the number of executions is made larger. In this modification, the number of decisions (of Steps 2056 and 2062 of FIG. 47) of the λ abnormality and the FAF abnormality at the final decision that the air/fuel ratio feedback control system is abnormal may be left at three times or changed.

(15) In the foregoing thirteenth and fourteenth embodiments, the λ accumulated value Tλ and the FAF accumulated value TFAF are used as the first and second abnormality deciding elements but may be changed. For example, the difference between the air/fuel ratio λ, as detected by the A/F sensor 26, and the target λTG and the difference between the air/fuel-ratio correction coefficient FAF and its average value FAFAV are calculated and are employed as the first and second abnormality deciding elements. In accordance with these individual abnormality deciding elements, moreover, the abnormality of the air/fuel ratio feedback control system may be diagnosed. In this modification, the abnormality may be decided according to the threshold values as in the thirteenth aembodiment or on the equation as in the fourteenth embodiment.

(16) In the foregoing thirteenth and fourteenth embodiments, the threshold values for deciding the normality/abnormality are prepared in a plurality for each of the λ accumulated value Tλ and the FAF accumulated value TFAF but may be reduced to one. The same threshold values are provided individually for the λ accumulated value Tλ and the FAF accumulated value TFAF, but different numbers of threshold values may be provided.

(17) In the fourteenth embodiment, the number of threshold values for defining the regions of the normality/ abnormality deciding graph can be changed to increase or decrease the number of regions to be defined. If the region number is decreased, for example, the decision accuracy becomes more or less rough, but the memory capacity can be reduced.

(18) Once the final abnormality decision flag XDG is determined, the abnormality deciding routine need not be executed any more to lighten the load on the operations of the CPU 42. In this case, there is added to the abnormality deciding conditions of FIG. 47 a condition to confirm that the final abnormality decision flag XDG is not determined. If this final abnormality decision flag XDG is determined, moreover, the present routine is ended without any action while bypassing the subsequent routine.

(19) In the foregoing thirteenth and fourteenth embodiments, the sensor abnormality diagnosis of the present invention is embodied by the air/fuel ratio control system which realizes the air/fuel ratio feedback control by using the control theory at present. However, the present invention may naturally be embodied by another control technique (e.g., PID control).

Such changes and modifications are to be understood as being included within the scope of the present invention as defined by the appended claims.

What is claimed is:

1. An air/fuel ratio controller comprising:

an air/fuel ratio sensor for generating a signal representative of a detected air/fuel ratio of an internal combustion engine;

air/fuel ratio correction coefficient generating means for generating an air/fuel ratio correction coefficient according to a difference between the detected air/fuel ratio and a target air/fuel ratio;

air/fuel ratio control means for controlling an amount of fuel to be supplied to the engine using the air/fuel ratio correction coefficient set by the air/fuel ratio correction coefficient generating means; and sensor diagnostic means for checking an abnormality of the air/fuel ratio sensor based on behavior of the detected air/fuel ratio and behavior of the air/fuel ratio correction coefficient, wherein the sensor diagnostic means is for checking for an abnormality of the air/fuel ratio sensor by comparing behavior of the detected air/fuel ratio and behavior of the air/fuel ratio correction coefficient.

2. An air/fuel ratio controller comprising:

an air/fuel ratio sensor for generating a signal representative of a detected air/fuel ratio of an internal combustion engine;

air/fuel ratio correction coefficient generating means for generating an air/fuel ratio correction coefficient according to a difference between the detected air/fuel ratio and a target air/fuel ratio;

air/fuel ratio control means for controlling an amount of fuel to be supplied to the engine using the air/fuel ratio correction coefficient set by the air/fuel ratio correction coefficient generating means;

sensor diagnostic means for checking an abnormality of the air/fuel ratio sensor based on behavior of the detected air/fuel ratio and behavior of the air/fuel ratio correction coefficient, first amplitude calculating means for calculating an amplitude of the air/fuel ratio detected by the air/fuel ratio sensor; and second amplitude calculating means for calculating an amplitude of the air/fuel ratio correction coefficient set by the air/fuel ratio correction coefficient generating means;

wherein the sensor diagnostic means is for checking for an abnormality of the air/fuel ratio sensor based on a comparison between the amplitude of the air/fuel ratio calculated by the first amplitude calculating means and the amplitude of the air/fuel ratio correction coefficient calculated by the second amplitude calculating means.

3. A controller accrding to claim 2, further comprising:

air/fuel ratio period calculating means for calculating an oscillation period of the air/fuel ratio detected by the air/fuel ratio sensor;

wherein the sensor diagnostic means further includeds means for checking for an abnormality of the air/fuel ratio sensor based on the oscillation period detected by the air/fuel ratio period calculating means.

4. A controller according to claim 2, further comprising:

correction coefficient period calculating means for calculating an oscillation period of the air/fuel ratio correction coefficient set by the air/fuel ratio correction coefficient generating means;

wherein the sensor diagnostic means further includes means for checking for an abnormality of the air/fuel ratio sensor based on the oscillation period detected by the correction coefficient period calculating means.

5. An air/fuel ratio controller comprising:

an air/fuel ratio sensor for generating a signal representative of a detected air/fuel ratio of an internal combustion engine;

air/fuel ratio correction coefficient generating means for generating an air/fuel ratio correction coefficient according to a difference between the detected air/fuel ratio and a target air/fuel ratio;

air/fuel ratio control means for controlling an amount of fuel to be supplied to the engine using the air/fuel ratio correction coefficient set bv the air/fuel ratio correction coefficient generating means;

sensor diagnostic means for checking an abnormality of the air/fuel ratio sensor based on behavior of the detected air/fuel ratio and behavior of the air/fuel ratio correction coefficient, phase difference calculating means for calculating a phase difference between a phase of the air/fuel ratio detected by the air/fuel ratio sensor and a phase of the air/fuel ratio correction coefficient set by the air/fuel ratio correction coefficient generating means;

wherein the sensor diagnostic means is for checking for abnormality of the air/fuel ratio sensor based on the phase difference calculated by the phase difference calculating means.

6. A controller according to claim 5, wherein the phase difference calculating means is for calculating a phase difference by detecting a period between a time when one of the air/fuel ratio and the air/fuel ratio correction coefficient indicates a stoichiometric air/fuel ratio and a time when the other one of the air/fuel ratio and the air/fuel ratio correction coefficient indicates the stoichiometric air/fuel ratio.

7. A controller according to claim 5, wherein the phase difference calculating means is for calculating a phase difference by detecting a period between a time when one of the air/fuel ratio and the air/fuel ratio correction coefficient indicates a peak value and a time when the other one of the air/fuel ratio and the air/fuel ratio correction coefficient indicates a peak value.

8. A controller according to claim 5, wherein the phase difference calculating means includes means for detecting the phase difference based on whether when one of the air/fuel ratio and the air/fuel ratio correction coefficient indicates a stoichiometric air/fuel ratio, and the other one of the air/fuel ratio and the air/fuel ratio correction coefficient indicates the stoichiometric air/fuel ratio.

9. A controller according to claim 5, further comprising:

air/fuel ratio period calculating means for calculating an oscillation period of the air/fuel ratio detected by the air/fuel ratio sensor;

wherein the sensor diagnostic means further includes means for checking for an abnormality of the air/fuel ratio sensor based on the oscillation period detected by the air/fuel ratio period calculating means.

10. A controller according to claim 5, further comprising:

correction coefficient period calculating means for calculating an oscillation period of the air/fuel ratio correction coefficient set by the air/fuel ratio correction coefficient generating means;

wherein the sensor diagnostic means further includes means for checking for an abnormality of the air/fuel ratio sensor based on the oscillation period detected by the correction coefficient period calculating means.

11. An air/fuel ratio controller comprising:

an air/fuel ratio sensor for generating a signal representative of a detected air/fuel ratio of an internal combustion engine;

air/fuel ratio correction coefficient generating means for generating an air/fuel ratio correction coefficient according to a difference between the detected air/fuel ratio and a target air/fuel ratio;

air/fuel ratio control means for controlling an amount of fuel to be supplied to the engine using the air/fuel ratio correction coefficient set bv the air/fuel ratio correction coefficient generating means;

sensor diagnostic means for checking an abnormality of the air/fuel ratio sensor based on behavior of the detected air/fuel ratio and behavior of the air/fuel ratio correction coefficient, first difference accumulating means for accumulating differences between the air/fuel ratio detected by the air/fuel ratio sensor and the target air/fuel ratio; and second difference accumulating means for accumulating differences between the air/fuel ratio correction coefficient set by the air/fuel ratio correction coefficient generating means and a reference value of the air/fuel ratio correction coefficient;

wherein the sensor diagnostic means is for checking for an abnormality of the air/fuel ratio sensor based on comparison between differences accumulated by the first difference accumulating means and differences accumulated by the second difference accumulating means.

12. An air/fuel ratio controller comprising:

an air/fuel ratio sensor for generating a signal representative of a detected air/fuel ratio of an internal combustion engine;

air/fuel ratio correction coefficient generating means for generating an air/fuel ratio correction coefficient according to a difference between the detected air/fuel ratio and a target air/fuel ratio;

air/fuel ratio control means for controlling an amount of fuel to be supplied to the engine using the air/fuel ratio correction coefficient set bv the air/fuel ratio correction coefficient generating means;

sensor diagnostic means for checking an abnormality of the air/fuel ratio sensor based on behavior of the detected air/fuel ratio and behavior of the air/fuel ratio correction coefficient, air/fuel ratio change calculating means for calculating a change rate of the detected air/fuel ratio; and correction coefficient change calculating means for calculating a change rate of the air/fuel ratio correction coefficient;

wherein the sensor diagnostic means includes abnormality diagnosing means for diagnosing an abnormality of the air/fuel ratio sensor based on the air/fuel ratio change rate and the correction coefficient change rate.

13. A controller according to claim 12, wherein the air/fuel ratio change calculating means is for determining the change rate of the air/fuel ratio based on a second derivative of the air/fuel ratio.

14. A controller according to claim 12, wherein the correction coefficient change calculating means is for determining the change rate of the air/fuel ratio correction coefficient based on a second derivative of the correction coefficient.

15. A controller according to claim 12, wherein:
the air/fuel ratio change calculating means is for calculating the change rate of the air/fuel ratio based on an amplitude of the air/fuel ratio change rate; and
the correction coefficient change calculating means is for calculating the change rate of the air/fuel ratio correction coefficient based on an amplitude of the correction coefficient change rate.

16. A controller according to claim 12, wherein:
the air/fuel ratio change calculating means includes means for accumulating a second derivative of the air/fuel ratio for a predetermined time period to determine the accumulated value as the air/fuel ratio change rate;
the correction coefficient change calculating means includes means for accumulating the second derivative of the air/fuel ratio correction coefficient for a predetermined time period to determine the accumulated value as the correction coefficient change rate; and
the abnormality diagnosing means includes means for comparing a ratio between the accumulated second derivative of the air/fuel ratio and the accumulated second derivative of the air/fuel ratio correction coefficient with a predetermined abnormality deciding value to diagnose an abnormality of the air/fuel ratio sensor.

17. A controller according to claim 12, wherein:
the air/fuel ratio change calculating means includes means for accumulating the amplitude of the air/fuel ratio change for a predetermined time period to determine the accumulated value as the air/fuel ratio change rate;
the correction coefficient change calculating means includes means for accumulating the amplitude of the air/fuel ratio correction coefficient change for a predetermined time period to determine the accumulated value as the correction coefficient change rate; and
the abnormality diagnosing means includes means for comparing a ratio between the accumulated amplitude of the air/fuel ratio change and the accumulated amplitude of the air/fuel ratio correction coefficient change with a predetermined abnormality deciding value to diagnose an abnormality of the air/fuel ratio sensor.

18. A controller according to claim 12, further comprising abnormality deciding value generating means for determining the abnormality deciding value variably with an engine running state.

19. A controller according to claim 12, wherein the abnormality diagnosing means is for diagnosing that the sensor is normal when the ratio between the change rate of the air/fuel ratio and the change rate of the air/fuel ratio correction coefficient is less than a predetermined abnormality deciding value.

20. A controller according to claim 12, wherein the abnormality diagnosing means is for diagnosing that the sensor is normal when the ratio between the change rate of the air/fuel ratio and the change rate of the air/fuel ratio correction coefficient is greater than a first abnormality deciding value and less than a second abnormality deciding value.

21. A controller according to claim 12, wherein:
the air/fuel ratio change calculating means is for calculating the change rate of the air/fuel ratio by smoothing the air/fuel ratio and using the smoothed air/fuel ratio $\lambda SM$ to calculate the air/fuel change ratio; and
the correction coefficient change calculating means is for calculating the change rate of the correction coefficient by smoothing the correction coefficient and using the smoothed correction coefficient to calculate the correction coefficient change ratio.

22. An air/fuel ratio controller comprising:
an air/fuel ratio sensor for generating a signal representative of a detected air/fuel ratio of an internal combustion engine;
air/fuel ratio correction coefficient generating means for generating an air/fuel ratio correction coefficient according to a difference between the detected air/fuel ratio and a target air/fuel ratio;
air/fuel ratio control means for controlling an amount of fuel to be supplied to the engine using the air/fuel ratio correction coefficient set by the air/fuel ratio correction coefficient generating means;
sensor diagnostic means for checking an abnormality of the air/fuel ratio sensor based on behavior of the detected air/fuel ratio and behavior of the air/fuel ratio correction coefficient,
first element calculating means for calculating a first abnormality deciding element based on the detected air/fuel ratio; and
second element calculating means for calculating a second abnormality deciding element based on the air/fuel ratio correction coefficient;
wherein the sensor diagnostic means includes abnormalilty diagnosing means for diagnosing an abnormality of the air/fuel ratio feedback control system in accordance with a plurality of normality/abnormality deciding regions, as individually defined by at least one threshold value, by correlating the first and second abnormality deciding elements with the normality/abnormality deciding regions.

23. A controller according to claim 22, wherein:
the first element calculating means is for calculating the first abnormality deciding element as the difference between the detected air/fuel ratio and the target air/fuel ratio; and
the second element calculating means is for calculating as the second abnormality deciding element the difference between the air/fuel ratio correction coefficient determined by the air/fuel ratio correction coefficient determining means and an average value of the correction coefficient.

24. A controller according to claim 22, wherein:
the first element calculating means is for calculating the first abnormality deciding element by sequentially accumulating the difference between the detected air/fuel ratio and the target air/fuel ratio; and
the second element calculating means is for calculating the second abnormality deciding element by sequentially accumulating the difference between the air/fuel ratio correction coefficient determined by the air/fuel ratio correction coefficient determining means and the average value of the correction coefficient.

25. A controller according to claim 22, wherein the abnormality diagnosing means is for diagnosing that the air/fuel ratio feedback control system is abnoral if the first and second abnormality deciding elements belong to the abnormality deciding regions by a predetermined number or more within a preset number of abnormality decisions.

26. A controller according to claim 22, wherein the abnormality diagnosing means is for inhibiting the regions in which the fluctuations of the air/fuel ratio with respect to the target air/fuel ratio and the air/fuel ratio correction coefficient with respect to its average value are less than predetermined values from deciding whether or not the air/fuel ratio feedback control system is normal.

27. A controller according to claim 22, wherein a plurality of normality/abnormality deciding regions corresponding to the first and second abnormality deciding elements are stored and held as an equation in memory so that the abnormality diagnosing means executes the abnormality diagnosis with the normality/abnormality deciding regions of the equation.

28. A controller according to claim 27, wherein the equation includes a multiplicity of regions which are equally divided into a plurality of groups according to the first and second abnormality deciding elements and individually stored with at least one of data of normality and data of abnormality.

29. A controller according to claim 22, further comprising decision region learning means for learning normality/abnormality deciding regions corresponding to the first and second abnormality deciding elements based on predetermined learning conditions.

30. A controller according to claim 29, wherein the decision region learning means is for learning the normality/abnormality deciding regions to enlarge a normality deciding region relating to the air/fuel ratio correction coefficient if an abnormality is detected based on the first abnormality deciding element, and to enlarge the normality deciding region relating to the air/fuel ratio if an abnormality is detected based on the second abnormality deciding element.

31. An air/fuel ratio controller comprising:
an air/fuel ratio sensor which can vary its output linearly when detecting an air/fuel ratio in an internal combustion engine;
air/fuel ratio correction coefficient generating means for generating an air/fuel ratio correction coefficient in accordance with a difference between the air/fuel ratio detected by the air/fuel ratio sensor and a target air/fuel ratio;
air/fuel ratio control means for controlling amount of fuel to be supplied to the engine by using the air/fuel ratio correction coefficient set by the air/fuel ratio correction coefficient generating means;
air/fuel ratio period calculating means for calculating an oscillation period of the air/fuel ratio detected by the air/fuel ratio sensor; and
sensor diagnostic means for checking for an abnormality of the air/fuel ratio sensor based on the oscillation period of the air/fuel ratio.

32. A controller according to claim 31, further comprising:
first amplitude calculating means for calculating an amplitude of the air/fuel ratio detected by the air/fuel ratio sensor;
second amplitude calculating means for calculating an amplitude of the air/fuel ratio correction coefficient set by the air/fuel ratio correction coefficient generating means; and
phase difference calculating means for calculating a phase difference between a phase of the air/fuel ratio detected by the air/fuel ratio sensor and a phase of the air/fuel ratio correction coefficient set by the air/fuel ratio correction coefficient generating means;
wherein the sensor diagnostic means further includes means for checking for an abnormality of the air/fuel ratio sensor based on a comparison between the amplitude of the air/fuel ratio calculated by the first amplitude calculating means and the amplitude of the air/fuel ratio correction coefficient calculated by the second amplitude calculating means, and means for checking for an abnormality of the air/fuel ratio sensor based on the phase difference calculated by the phase difference calculating means.

33. An air/fuel ratio controller comprising:
an air/fuel ratio sensor which can vary its output linearly when detecting an air/fuel ratio in an internal combustion engine;
air/fuel ratio correction coefficient generating means for generating an air/fuel ratio correction coefficient in accordance with a difference between the air/fuel ratio detected by the air/fuel ratio sensor and a target air/fuel ratio;
air/fuel ratio control means for controlling an amount of fuel to be supplied to the engine by using the air/fuel ratio correction coefficient set by the air/fuel ratio correction coefficient generating means;
correction coefficient period calculating means for calculating an oscillation period of the air/fuel ratio correction coefficient set by the air/fuel ratio correction coefficient generating means; and
sensor diagnostic means for checking for an abnormality of the air/fuel ratio sensor based on the oscillation period of the air/fuel ratio correction coefficient.

34. A controller according to claim 33, further comprising:
first amplitude calculating means for calculating an amplitude of the air/fuel ratio detected by the air/fuel ratio sensor;
second amplitude calculating means for calculating an amplitude of the air/fuel ratio correction coefficient set by the air/fuel ratio correction coefficient generating means; and
phase difference calculating means for calculating a phase difference between a phase of the air/fuel ratio detected by the air/fuel ratio sensor and a phase of the air/fuel ratio correction coefficient set by the air/fuel ratio correction coefficient generating means;
wherein the sensor diagnostic means further includes means for checking for an abnormality of the air/fuel ratio sensor based on a comparison between the amplitude of the air/fuel ratio calculated by the first amplitude calculating means and the amplitude of the air/fuel ratio correction coefficient calculated by the second amplitude calculating means, and means for checking for an abnormality of the air/fuel ratio sensor based on the phase difference calculated by the phase difference calculating means.

* * * * *